United States Patent
Matyjaszewski et al.

(10) Patent No.: US 9,982,070 B2
(45) Date of Patent: May 29, 2018

(54) AQUEOUS ATRP IN THE PRESENCE OF AN ACTIVATOR REGENERATOR

(71) Applicant: Carnegie Mellon University, Pittsburgh, PA (US)

(72) Inventors: Krzysztof Matyjaszewski, Pittsburgh, PA (US); Pawel Chmielarz, Pittsburgh, PA (US); Dominik Konkolewicz, West Chester, OH (US); Pawel Krys, Pittsburgh, PA (US); Xiangcheng Pan, Pittsburgh, PA (US); Valerie Williams, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 0 days. days.

(21) Appl. No.: 14/993,632

(22) Filed: Jan. 12, 2016

(65) Prior Publication Data

US 2016/0200840 A1    Jul. 14, 2016

Related U.S. Application Data

(60) Provisional application No. 62/230,167, filed on May 29, 2015, provisional application No. 62/125,276, (Continued)

(51) Int. Cl.
*C08F 4/40* (2006.01)
*C08F 4/50* (2006.01)
(Continued)

(52) U.S. Cl.
CPC ......... *C08F 120/28* (2013.01); *C08F 220/54* (2013.01); *C08F 4/40* (2013.01); *C08F 4/50* (2013.01); *C08F 2438/01* (2013.01)

(58) Field of Classification Search
CPC ........... C08F 4/40; C08F 4/50; C08F 2438/01
See application file for complete search history.

(56) References Cited

U.S. PATENT DOCUMENTS 3,037,004 A    5/1962    Simone et al.
3,096,312 A    7/1963    Henry
(Continued)

FOREIGN PATENT DOCUMENTS

CA    2209061    2/1998
CN    1084199 A    3/1994
(Continued)

OTHER PUBLICATIONS

Simakova et al. Macromolecules 2012, 45, 6371-6379.*
(Continued)

*Primary Examiner* — Rip A Lee
(74) *Attorney, Agent, or Firm* — K&L Gates LLP

(57) ABSTRACT

A process for polymerizing radically (co)polymerizable monomers at a temperature between −10° C. and 110° C. in an aqueous system comprising one or more radically (co) polymerizable monomer(s) is disclosed, and includes a molar excess of a ligand forming a soluble transition metal complex with an added transition metal salt that participates in a reversible reduction-oxidation cycle with one of an added site specific functional initiator and a dormant polymer chain having a radically transferable atom or group. The initial soluble catalyst complex concentration in the higher oxidation state is less than or equal to 2500 ppm. The reaction is conducted in the presence of an activator regenerator. The mole fraction of the soluble lower activator oxidation state transition metal formed by action of the activator regenerator, to transition metal in a higher deactivator oxidation state is less than 10%. The formed polymer chains have a dispersity of less than 1.5.

21 Claims, 20 Drawing Sheets

Related U.S. Application Data filed on Jan. 16, 2015, provisional application No. 62/125,080, filed on Jan. 12, 2015.

(51) Int. Cl.
*C08F 120/28* (2006.01)
*C08F 220/54* (2006.01)

(56) References Cited

U.S. PATENT DOCUMENTS

| | | |
|---|---|---|
| 3,183,217 A | 5/1965 | Serniuk et al. |
| 3,350,374 A | 10/1967 | Fetscher et al. |
| 3,397,186 A | 8/1968 | Edward et al. |
| 3,472,826 A | 10/1969 | Potts et al. |
| 3,546,083 A | 12/1970 | Ort et al. |
| 3,573,180 A | 3/1971 | Hodes et al. |
| 3,716,550 A | 2/1973 | Gilligan et al. |
| 3,753,956 A | 8/1973 | Tuites et al. |
| 3,862,978 A | 1/1975 | Decker et al. |
| 3,953,305 A | 4/1976 | Connolly |
| 3,959,225 A | 5/1976 | Kuntz |
| 3,963,491 A | 6/1976 | Marsh |
| 4,007,165 A | 2/1977 | MacLeay et al. |
| 4,073,870 A | 2/1978 | Saji et al. |
| 4,145,486 A | 3/1979 | Haag et al. |
| 4,302,553 A | 11/1981 | Frisch et al. |
| 4,374,751 A | 2/1983 | Dudgeon |
| 4,384,093 A | 5/1983 | Culbertson et al. |
| 4,581,429 A | 4/1986 | Solomon et al. |
| 4,728,706 A | 3/1988 | Farnham et al. |
| 4,806,605 A | 2/1989 | Hertler |
| 4,925,765 A | 5/1990 | Madeleine |
| 4,940,648 A | 7/1990 | Geiger |
| 4,940,760 A | 7/1990 | Boettcher et al. |
| 4,954,416 A | 9/1990 | Wright et al. |
| 4,978,498 A | 12/1990 | Yoshihiro et al. |
| 5,026,813 A | 6/1991 | Meder |
| 5,089,135 A | 2/1992 | Yoneyama et al. |
| 5,102,967 A | 4/1992 | Meder |
| 5,169,914 A | 12/1992 | Kaszas et al. |
| 5,210,109 A | 5/1993 | Tateosian et al. |
| 5,212,043 A | 5/1993 | Yamamoto et al. |
| 5,248,746 A | 9/1993 | Shimokawa et al. |
| 5,254,651 A | 10/1993 | Alexanian et al. |
| 5,281,681 A | 1/1994 | Austin |
| 5,294,678 A | 3/1994 | Tse et al. |
| 5,312,871 A | 5/1994 | Mardare et al. |
| 5,322,912 A | 6/1994 | Georges et al. |
| 5,324,879 A | 6/1994 | Hawthorne |
| 5,331,088 A | 7/1994 | Meister et al. |
| 5,346,954 A | 9/1994 | Wu et al. |
| 5,362,813 A | 11/1994 | Antonelli et al. |
| 5,401,804 A | 3/1995 | Georges et al. |
| 5,405,913 A | 4/1995 | Harwood et al. |
| 5,451,647 A | 9/1995 | Faust et al. |
| 5,459,222 A | 10/1995 | Rodgers et al. |
| 5,470,928 A | 11/1995 | Harwood et al. |
| 5,506,312 A | 4/1996 | Arjunan |
| 5,508,353 A | 4/1996 | Liu et al. |
| 5,510,212 A | 4/1996 | Delnick et al. |
| 5,510,307 A | 4/1996 | Narayanan et al. |
| 5,543,158 A | 8/1996 | Gref et al. |
| 5,558,954 A | 9/1996 | Morrison |
| 5,610,250 A | 3/1997 | Veregin et al. |
| 5,630,906 A | 5/1997 | Boe et al. |
| 5,656,708 A | 8/1997 | Meister |
| 5,668,188 A | 9/1997 | Whinnery et al. |
| 5,700,844 A | 12/1997 | Liao et al. |
| 5,705,577 A | 1/1998 | Rossi et al. |
| 5,708,102 A | 1/1998 | Fryd et al. |
| 5,763,546 A | 6/1998 | Jung et al. |
| 5,763,548 A | 6/1998 | Matyjaszewski et al. |
| 5,767,210 A | 6/1998 | Lecomte et al. |
| 5,773,538 A | 6/1998 | Feiring |
| 5,789,487 A | 8/1998 | Matyjaszewski et al. |
| 5,807,937 A | 9/1998 | Matyjaszewski et al. |
| 5,811,500 A | 9/1998 | Dubois et al. |
| 5,833,320 A | 11/1998 | Kaneko et al. |
| 5,854,364 A | 12/1998 | Senninger et al. |
| 5,886,118 A | 3/1999 | Percec |
| 5,891,971 A | 4/1999 | Keoshkerian et al. |
| 5,910,549 A | 6/1999 | Matyjaszewski et al. |
| 5,945,491 A | 8/1999 | Matyjaszewski et al. |
| 5,998,537 A | 12/1999 | Good et al. |
| 6,031,017 A | 2/2000 | Waki et al. |
| 6,054,507 A | 4/2000 | Funaki et al. |
| 6,057,042 A | 5/2000 | Shimotsu |
| 6,083,524 A | 7/2000 | Sawhney et al. |
| 6,111,022 A | 8/2000 | Matyjaszewski et al. |
| 6,114,448 A | 9/2000 | Derbes |
| 6,114,482 A | 9/2000 | Senninger et al. |
| 6,121,371 A | 9/2000 | Matyjaszewski et al. |
| 6,124,411 A | 9/2000 | Matyjaszewski et al. |
| 6,126,919 A | 10/2000 | Stefely et al. |
| 6,143,848 A | 11/2000 | Lee et al. |
| 6,162,882 A | 12/2000 | Matyjaszewski et al. |
| 6,183,866 B1 | 2/2001 | Yamazaki et al. |
| 6,191,197 B1 | 2/2001 | Wang et al. |
| 6,235,822 B1 | 5/2001 | Whetten et al. |
| 6,254,854 B1 | 7/2001 | Edwards et al. |
| 6,255,448 B1 | 7/2001 | Grimaldi et al. |
| 6,288,186 B1 | 9/2001 | Matyjaszewski et al. |
| 6,310,149 B1 | 10/2001 | Haddleton |
| 6,319,988 B1 | 11/2001 | Barkac et al. |
| 6,326,455 B2 | 12/2001 | Vassiliou et al. |
| 6,342,563 B1 | 1/2002 | McGinniss et al. |
| 6,407,187 B1 | 6/2002 | Matyjaszewski et al. |
| 6,451,580 B1 | 9/2002 | Takagi et al. |
| 6,512,060 B1 | 1/2003 | Matyjaszewski et al. |
| 6,534,610 B1 | 3/2003 | Wilson et al. |
| 6,538,091 B1 | 3/2003 | Matyjaszewski et al. |
| 6,541,580 B1 | 4/2003 | Matyjaszewski et al. |
| 6,545,095 B1 | 4/2003 | Solomon et al. |
| 6,565,763 B1 | 5/2003 | Asakawa et al. |
| 6,592,991 B1 | 7/2003 | Wiesner et al. |
| 6,598,721 B2 | 7/2003 | Schmidl |
| 6,620,927 B2 | 9/2003 | Bulpitt et al. |
| 6,624,262 B2 | 9/2003 | Matyjaszewski et al. |
| 6,624,263 B2 | 9/2003 | Matyjaszewski et al. |
| 6,627,314 B2 | 9/2003 | Matyjaszewski et al. |
| 6,664,312 B2 | 12/2003 | Devonport |
| 6,670,299 B1 | 12/2003 | Marks et al. |
| 6,672,717 B2 | 1/2004 | Smith |
| 6,683,120 B2 | 1/2004 | Munro |
| 6,686,432 B2 | 2/2004 | Coca et al. |
| 6,692,914 B1 | 2/2004 | Klaerner et al. |
| 6,737,488 B2 | 5/2004 | Vanhoorne et al. |
| 6,759,491 B2 | 7/2004 | Matyjaszewski et al. |
| 6,784,247 B2 | 8/2004 | Rechenberg et al. |
| 6,784,248 B2 | 8/2004 | Coca et al. |
| 6,784,260 B2 | 8/2004 | Yeager et al. |
| 6,790,919 B2 | 9/2004 | Matyjaszewski et al. |
| 6,828,025 B2 | 12/2004 | Ali et al. |
| 6,872,266 B1 | 3/2005 | Ciaramitaro |
| 6,887,962 B2 | 5/2005 | Matyjaszewski et al. |
| 6,991,652 B2 | 1/2006 | Burg |
| 6,992,156 B2 | 1/2006 | Parker et al. |
| 7,018,655 B2 | 3/2006 | Lele et al. |
| 7,019,082 B2 | 3/2006 | Matyjaszewski et al. |
| 7,034,079 B2 | 4/2006 | Visger et al. |
| 7,037,992 B2 | 5/2006 | Wilson et al. |
| 7,049,373 B2 | 5/2006 | Matyjaszewski et al. |
| 7,049,378 B2 | 5/2006 | Ittel et al. |
| 7,056,455 B2 | 6/2006 | Matyjaszewski et al. |
| 7,064,151 B1 | 6/2006 | Berge et al. |
| 7,064,166 B2 | 6/2006 | Matyjaszewski et al. |
| 7,105,579 B2 | 9/2006 | Adam et al. |
| 7,125,938 B2 | 10/2006 | Matyjaszewski et al. |
| 7,157,530 B2 | 1/2007 | Matyjaszewski et al. |
| 7,167,354 B2 | 1/2007 | Dietz et al. |
| 7,186,419 B2 | 3/2007 | Petersen |
| 7,241,502 B2 | 7/2007 | Anselmann et al. |
| 7,332,550 B2 | 2/2008 | Matyjaszewski et al. |
| 7,407,995 B2 | 8/2008 | Ok |

(56) References Cited

U.S. PATENT DOCUMENTS

| | | |
|---|---|---|
| 7,498,456 B2 | 3/2009 | Lai |
| 7,566,410 B2 | 7/2009 | Song et al. |
| 7,572,874 B2 | 8/2009 | Matyjaszewski et al. |
| 7,678,869 B2 | 3/2010 | Matyjaszewski et al. |
| 7,691,997 B2 | 4/2010 | Khvorova et al. |
| 7,786,213 B2 | 8/2010 | Maynard et al. |
| 7,795,355 B2 | 9/2010 | Matyjaszewski et al. |
| RE41,897 E | 10/2010 | Loveday et al. |
| 7,825,199 B1 | 11/2010 | Matyjaszewski et al. |
| 7,893,173 B2 | 2/2011 | Matyjaszewski et al. |
| 7,893,174 B2 | 2/2011 | Matyjaszewski et al. |
| 7,968,085 B2 | 6/2011 | Hersel et al. |
| 8,048,982 B2 | 11/2011 | Higashimura et al. |
| 8,114,803 B2 | 2/2012 | Yuasa et al. |
| 8,252,880 B2 | 8/2012 | Matyjaszewski et al. |
| 8,273,823 B2 | 9/2012 | Matyjaszewski et al. |
| 8,318,856 B2 | 11/2012 | Oh et al. |
| 8,349,410 B2 | 1/2013 | Huang et al. |
| 8,361,302 B2 | 1/2013 | Grassl et al. |
| 8,367,051 B2 | 2/2013 | Matyjaszewski et al. |
| 8,404,788 B2 | 3/2013 | Matyjaszewski et al. |
| 8,445,610 B2 | 5/2013 | Kwak et al. |
| 8,497,225 B2 | 7/2013 | Zhamu et al. |
| 8,637,051 B2 | 1/2014 | Clancy et al. |
| 8,652,849 B2 | 2/2014 | Childs et al. |
| 8,729,173 B2 | 5/2014 | Wang et al. |
| 8,865,797 B2 | 10/2014 | Matyjaszewski et al. |
| 8,871,831 B2 | 10/2014 | Huang et al. |
| 8,962,764 B2 | 2/2015 | Matyjaszewski et al. |
| 9,093,693 B2 | 7/2015 | Zhamu et al. |
| 2002/0169290 A1 | 11/2002 | Bornaes et al. |
| 2003/0004293 A1 | 1/2003 | Dvornic et al. |
| 2003/0216528 A1 | 11/2003 | Matyjaszewski et al. |
| 2004/0044152 A1 | 3/2004 | Matyjaszewski et al. |
| 2004/0152821 A1 | 8/2004 | Saegusa et al. |
| 2004/0171779 A1 | 9/2004 | Matyjaszewski et al. |
| 2005/0090632 A1 | 4/2005 | Matyjaszewski et al. |
| 2006/0008490 A1 | 1/2006 | Russell et al. |
| 2006/0258867 A1 | 11/2006 | Gibson et al. |
| 2007/0106012 A1 | 5/2007 | Matyjaszewski et al. |
| 2007/0155926 A1 | 7/2007 | Matyjaszewski et al. |
| 2007/0287681 A1 | 12/2007 | Jeong et al. |
| 2008/0002146 A1 | 1/2008 | Stachowski |
| 2008/0004398 A1 | 1/2008 | Durrieu et al. |
| 2008/0114128 A1 | 5/2008 | Destarac et al. |
| 2008/0176040 A1 | 7/2008 | Ilfrey et al. |
| 2009/0169725 A1 | 7/2009 | Zhamu et al. |
| 2009/0171024 A1 | 7/2009 | Jakubowski et al. |
| 2010/0196277 A1 | 8/2010 | DeSimone et al. |
| 2011/0060107 A1 | 3/2011 | Matyjaszewski et al. |
| 2011/0065875 A1 | 3/2011 | Matyjaszewski et al. |
| 2011/0091957 A1 | 4/2011 | Lele et al. |
| 2012/0213986 A1 | 8/2012 | Matyjaszewski et al. |
| 2013/0011441 A1 | 1/2013 | Hollinger et al. |
| 2013/0131278 A1 | 5/2013 | Huang et al. |
| 2014/0183055 A1* | 7/2014 | Matyjaszewski ......... C08F 2/38 205/414 |
| 2014/0275420 A1 | 9/2014 | Matyjaszewski et al. |
| 2015/0005452 A1 | 1/2015 | Matyjaszewski et al. |
| 2015/0087795 A1 | 3/2015 | Matyjaszewski et al. |
| 2017/0113934 A1 | 4/2017 | Kowalewski et al. |

FOREIGN PATENT DOCUMENTS

| | | |
|---|---|---|
| CN | 1110681 A | 10/1995 |
| CN | 1165828 A | 11/1997 |
| EP | 0265091 A1 | 4/1988 |
| EP | 0329873 B1 | 11/1989 |
| EP | 0341012 A2 | 11/1989 |
| EP | 0434438 A | 6/1991 |
| EP | 0457916 A | 11/1991 |
| EP | 0789036 A1 | 8/1997 |
| EP | 0816385 A1 | 1/1998 |
| EP | 0824110 A1 | 2/1998 |
| EP | 0824111 A1 | 2/1998 |
| EP | 0826698 A1 | 3/1998 |
| EP | 0832902 A2 | 4/1998 |
| EP | 0870809 A2 | 10/1998 |
| EP | 0872493 A | 10/1998 |
| EP | 0879832 A1 | 11/1998 |
| EP | 0947527 A1 | 6/1999 |
| EP | 0518225 B2 | 10/1999 |
| EP | 1386935 A | 2/2004 |
| EP | 1469020 A | 10/2004 |
| EP | 1555273 A1 | 7/2005 |
| EP | 2147067 | 11/2008 |
| FR | 2777091 A1 | 10/1999 |
| JP | 64-11114 A | 1/1989 |
| JP | 6322171 A | 11/1994 |
| JP | 2003-238609 A | 8/2003 |
| JP | 2011-246620 A | 12/2011 |
| WO | WO 88/00603 A3 | 1/1988 |
| WO | WO 94/13706 A | 6/1994 |
| WO | WO 96/30421 A1 | 10/1996 |
| WO | WO 97/18247 | 5/1997 |
| WO | WO 97/47661 A1 | 12/1997 |
| WO | WO 98/01480 | 1/1998 |
| WO | WO 98/06758 A1 | 2/1998 |
| WO | WO 98/20050 A2 | 5/1998 |
| WO | WO 98/40415 A | 9/1998 |
| WO | WO 99/28352 A | 6/1999 |
| WO | WO 00/22051 A1 | 4/2000 |
| WO | WO 00/47634 A1 | 8/2000 |
| WO | WO 00/56795 A1 | 9/2000 |
| WO | WO 00/75198 | 12/2000 |
| WO | WO 01/77197 A3 | 10/2001 |
| WO | WO 01/92359 A1 | 12/2001 |
| WO | WO 2002/081372 A2 | 10/2002 |
| WO | WO 2003/097107 A1 | 11/2003 |
| WO | WO 2004/041972 A | 5/2004 |
| WO | WO 2004/060928 A | 7/2004 |
| WO | WO 2004/087777 A2 | 10/2004 |
| WO | WO 2005/056621 A1 | 6/2005 |
| WO | WO 2005/087819 A1 | 9/2005 |
| WO | WO 2005/116097 A1 | 12/2005 |
| WO | WO 2007/021142 A1 | 2/2007 |
| WO | WO 2007/025086 A2 | 3/2007 |
| WO | WO 2007/025310 A1 | 3/2007 |
| WO | WO 2007/059350 A2 | 5/2007 |
| WO | WO 2007/075817 A1 | 7/2007 |
| WO | WO 2008/009997 A1 | 1/2008 |
| WO | WO 2008/057163 A2 | 5/2008 |
| WO | WO 2008/148000 A1 | 12/2008 |
| WO | WO 2009/023353 A9 | 2/2009 |
| WO | WO 2009/065077 A1 | 5/2009 |
| WO | WO 2009/108822 A1 | 9/2009 |
| WO | WO 2009/111725 A1 | 9/2009 |
| WO | WO 2009/132206 A1 | 10/2009 |
| WO | WO 2009/132884 A1 | 11/2009 |
| WO | WO 2010/096422 A1 | 8/2010 |
| WO | WO 2010/111708 A1 | 9/2010 |
| WO | WO 2010/131907 A2 | 11/2010 |
| WO | WO 2012/034043 A1 | 3/2012 |
| WO | WO 2012/091965 A1 | 7/2012 |
| WO | WO 2013/063772 A1 | 5/2013 |

OTHER PUBLICATIONS

Konkolewicz et al. Macromolecules 2014, 47, 560-570.*
Acar et al., Macromolecules 2000, 33, 7700-7706.
Anderegg et al., "Pyridine Derivatives as Complexing Agents XI. Thermodynamics of Metal Complex Formation with Bis-, Tris- and Tetrakisl(2-pyridyl)methyl]-amines", Helvetica Chimica Acta, 1977, 60(1), pp. 123-140.
Annenkov et al., Poly-C-vinyltetrazoles: A New Type of Polyacid, Journal of Polymer Science Part A: Polymer Chemistry, 1993, pp. 1903-1906, vol. 31(7).
Ashford et al., "First example of the atom transfer radical polymerisation of an acidic monomer: direct synthesis of methacrylic acid copolymers in aqueius media", Chemical Communications—Chemcom, Royal Society of Chemistry, GB (1999), pp. 1285-1286.

(56) References Cited

OTHER PUBLICATIONS

Asscher et al., Chlorine-Activation by Redox-Transfer, Part IV, The Addition of Sulphonyl Chlorides to Vinylic Monomers and Other Olefins, Journal of the Chemical Society, 1964, pp. 4962-4971.
Bamford, Comprehensive Polymer Science (First Supplement), eds., Pergamon: Oxford vol. 3., p. 123-139 (1991).
Baumann et al., Macromolecular Materials and Engineering (2000), 280/281, 1-6.
Bellus, Pure & Appl. Chem. 57, 1827 (1985).
Bledzki et al., Makromol. Chem. 184, 745 (1983).
Braunecker et al., Macromolecules 2005, 38, 4081.
Braunecker et al., Organometal Chem. 2005, 690, 916.
Brittain et al., Makromol. Chem., Macromol. Symp. 67, pp. 373-386 (1993), "Termination Processes in Group Transfer Polymerization".
Buback et al. (1995) Macromol. Chem. Phys. 196, 3267-80.
Buback et al. (2002) Macromol. Chem. Phys. 203, 2570-2582.
Bywater, Makromol. Chem., Macromol. Symp. 67, pp. 339-350 (1993), "Group Transfer Polymerization—A Critical Overview".
Carnahan et al., Synthesis and Characterization of Poly(glycerol—succinic acid) Dendrimers, Macromolecules, 2001, pp. 7648-7655, vol. 34(22).
Carter et al., Polyimide Nanofoams From Phase-Separated Block Copolymers, Electrochemical Society Proceedings, 1997, pp. 32-43, vol. 97(8), Electrochemical Society, Pennington, NJ, US.
Caruso, Nanoengineering of Particle Surfaces—Adv. Mater. 2001, 13, No. 1, Jan. 5, 11-22—Wiley—VCH Verlag GmbH.D-69469 Weinheim, 2001.
Catala, et al., Macromolecules, 1995, 28, 8441.
Chemical Abstracts, vol. 85, 1976, pp. 20.
Chen et al., Pryolytic Behavior and In-Situ Paramagnetism of Star-like C60(CH3)x(PAN)xcopolymers, European Polymer Journal, 1998, pp. 421-429, vol. 34(3-4), Elsevier Science Ltd., Oxford, GB.
Coca et al., Polymerization of Acrylates by Atom Transfer Radical Polymerization. Homopolymerization of 2-Hydroxyethyl Acrylate, Journal of Polymer Science, Part A: Polymer Chemistry, 1998, pp. 1417-1424, vol. 36.
Cohen et al., Inorg. Chem. 13, 2434 (1974).
Collman et al., "Clicking" Functionality onto Electrode Surfaces, Langmuir, 2004, pp. 1051-1053, vol. 20.
Curran, et al., "Radical Addition Reactions", Comprehensive Organic Synthesis, Pergamon: Oxford vol. 4, p. 715-777 (1991).
Curran et al., J. Am. Chem. Soc. 116, 4279 (1994).
Curran et al., J. Org. Chem., 54, 3140 (1989).
Curran, "The Design and Application of Free Radical Chain Reactions in Organic Synthesis Part 2," Synthesis, pp. 489-513 (1988).
Darkow et al., "Synthesis, Photomodification and Characterization of Homo- and Copolymers with 2,5-bisaryltetrazolyl Pendant Groups", Reactive and Functional Polymers, 1997, pp. 195-207, vol. 32(2).
Davies, "Reactions of L-ascorbic acid with transition metal complexes," Polyhedron, 1992, 11, 285-321.
De Vries et al., "The Effect of Reducing Monosaccharides on the Atom Transfer Radical Polymerization of Butyl Methacrylate," Macromol. Chem. Phys., 2001, 202, 1645-1648.
Demko et al., A Click Chemistry Approach to Tetrazoles by Huisgen 1,3-Dipolar Cycloaddition: Synthesis of 5-Acyltetrazoles from Azides and Acyl Cyanides, Angewandte Chemie, International Edition, 2002, pp. 2113-2116, vol. 41(12).
Desmarquest et al., Electrochim. Acta (1968), 13, 1109-1118.
Dreezen et al., "Nano-Structured Polymer Blends: Phase Structure, Crystallisation Behaviour and Semi-Crystalline Morphology of Phase Separated Binary Blends of Poly(ethyleneoxide) and Poly(ether sulphone)", Polymer, Elsevier Science Publishers B.V., GB, vol. 41, No. 4, Feb. 2000, pp. 1395-1407.
Druliner, Macromolecules, 24, 6079-6082 (1991).
Endo et al., Macromolecules, 25, 5554-5556 (1992).
Feng, "Synthesis and Free Radical Polymerization of 2-oxo-3-methylene-5-phenyl-1,4-dioxan", Chinese Journal of Polymer Science, 1993, 11, 2, pp. 153-157.

Fischer et al., Acc. Chem. Res. 20, 200-206 (1987).
Fischer, H., Chem. Rev. 2001, 101, 3581-3610.
Frackowiak et al., "Supercapacitor electrodes from multiwalled carbon nanotubes", Applied Physics Letters, 77, pp. 2421-2423 (2000).
Fukuda et al, Chem. Letters, 1996, 4, 293.
Fukuda et al., Macromolecules, 1996, 29, 3050.
Gabaston et al., "Synthesis of water soluble homopolymers and block copolymers by living free-radical polymerization", Polymr Preprints (American Chemical Society, Division of Polymer Chemistry), 38(1), pp. 719-720 (1997).
Gaynor et al., Polym. Prep. (Am. Chem. Soc. Polym. Chem. Div.), 36(1), 467 (1995).
Georges et al., Macromolecules 1993, 26, 2987.
Georges et al., Macromolecules 1994, 27, 7228.
Georges et al., Macromolecules 1993, 26, 5316.
Gilbert & Williams, Reactivity Ratios of Conjugated Dienes Copolymerized in Emulsion at 5°, J. Am. Chem. Soc. 74, (1952), pp. 4114-4118.
Gnanou et al., "Effect of Phenol and Derivatives on Atom Transfer Radical Polymerization in the Presence of Air," Journal Polymer Science, Part A: Polymer Chemistry, 2004, 42, 351-359.
Granel et al., Controlled Radical Polymerization of Methacrylic Monomers in the Presence of Bis(ortho-chelated) Arylnickel (II) Complex and Different Activated Alkyl Halides, Macromolecules, 1996, pp. 8576-8582, vol. 29(27).
Grayson et al., Convergent Dendrons and Dendrimers: From Synthesis to Applications, Chemical Reviews, 2001, pp. 3819-3867, vol. 101(12).
Greszta et al., Gradient Copolymers of Styrene and Acrylonitrille Via Atom Transfer Radical Polymerization, Polymer Preprints, 1997, pp. 709-710, vol. 38(1).
Greszta et al., Macromolecules, 27, 638-644 (1994).
Gromada et al., Simultaneous Reverse and Normal Initiation in Atom Transfer Radical Polymerization, Macromolecules, 2001, pp. 7664-7671, 34(22).
Haddleton et al., "Copper-mediated living radical polymerization utilizing biological and end group modified poly(ethylene-co-butylene) macroinitiators", ACS Symposium Series, 768, (Controlled/Living Radical Polymerization), pp. 182-196 (2000).
Hawker, "Molecular Weight Control by a Living Free Radical Polymerization Process", Journal American Chem. Society, 1994, vol. 116, pp. 11185-11186.
Hawker et al., Macromolecules, 1996, 29, 2686.
Hayes et al., J. Am. Chem. Soc. 110, 5533 (1988).
Hedrick et al., (Dendrimer-like Star Block and Amphiphlic Copolymers by Combination of Ring Opening and Atom Transfer Radicat Polymerization. Macromolecules, 1998, 31, 8671-8705.
Helms et al., Dendronized Linear Polymers via "Click Chemistry", Journal of the American Chemical Society, 2004, pp. 15020-15021, vol. 126(46).
Heuts et al., "Atom transfer radical polymerization in the presence of a thiol more evidence supporting radical intermediates," Macromol. Chem. Phys., 1999, 200, 1380-1385.
Hirao et al., J. Synth. Org. Chem. (Japan), 52(3), 197 (1994).
Hirao et al., Syn. Lett. 217 (1990).
Hong et al., "Synthesis of water-soluble fluorine-containing block copolymers by atom transfer radical polymerization", 25(4), 302 (2001).
Hovestad et al., Macromolecules 2000, 33, 4048-4052.
Ihre et al., Fast and Convenient Divergent Synthesis of Aliphatic Ester Dendrimers by Anhydride Coupling, Journal of the American Chemical Society, 2001, pp. 5908-5917, vol. 123(25).
Iqbal et al., Chem. Rev. 94, 519 (1994).
Jakubowski et al., "Activators Regenerated by Electron Transfer for Atom Transfer Radical Polymerization of Styrene," Macromolecules, 2006, 39, 39-45.
J-F Lutz et al,. Synthesis and Properties of Copolymers with Tailored Sequence Distribution by Controlled/Living Radical Polymerization, in ACS Symposium Series, Advances in Controlled/living Radical Polymerizations, American Chemical Society Division of Polymer Chemistry, 2003, Chapter 19, pp. 268-282, vol. 854.

(56) References Cited

OTHER PUBLICATIONS

Jian et al., Mesoporous carbons with self-assembled high-activity surfaces, Air Force Research Laboratory [Report], Jul. 7, 2006. [Retrieved from http://www.dtic.mil, Search ADA461480].
Jo et al., Effects of Various Copper Salts and Additives on Polymerization of Acrylonitrile by Atom Transfer Radical Polymerization, Polymer Preprints, 1997, pp. 699-700, vol. 38(1).
Jo et al., Polyacrylonitrile with Low Polydispersities by Atom Transfer Radical Polymerization, Polymer Preprints, 1997, pp. 697-698, vol. 38(1).
Kamigata et al., Novel Perfluoroalkylation of Alkenes with Perfluoroalkanesulphonyl Chlorides Catalysed by a Ruthenium (II) Complex, Journal of the Chemical Society, Perkins Transactions 1, 1991, pp. 627-633.
Kato et al., Macromolecules, 28, 1721 (1995).
Kawaguchi et al., "Dispersion Polymerization", in Polymer Particles, Masayoshi Okubo, ed., Adv. Polym. Sci., 2005, 175, 299-328.
Kizhnyaev et al., Vinyltetrazoles: Synthesis and Properties, Russian Chemical Reviews, 2003, pp. 143-164, vol. 72(2).
Kolb et al., Click Chemistry: Diverse Chemical Function from a Few Good Reactions, Angewandte Chemie, International Edition, 2001, pp. 2004-2021, vol. 40(11).
Kosower, E.M., Acc Chem. Res. (1971), 4, 193-198.
Kowalewski et al., Advances in Nanostructured Carbons from Block Copolymers Prepared by Controlled Radical Polymerization Techniques, in Controlled Radical Polymerization: From Synthesis to Materials, American Chemical Society Division of Polymer Chemistry, 2005, Chapter 21, pp. 295-310, vol. 944.
Kwak et al., "ARGET ATRP of methyl methacrylate in the presence of nitrogen-based ligands as reducing agents," Polym. Int. 2009, 58, 242-247.
Lazzari et al., Macromolecular Chemistry and Physics (2005), 206, 1382-1388.
Leduc et al., Dendritic initiators for "Living" Radical Polymerizations: A Versatile Approach to the Synthesis of Dendritic-Linear Block Copolymers, J. Am. Chem. Soc. Jun. 26, 1996, 118, 11111.
Lee et al., "Synthesis of carboxylic acid functionalized nanoparticles by reversible addition-fragmentation chain transfer (RAFT) miniemulsion polymerization of styrene", Polymer, Elsevier Science Publishers B.V., GB, vol. 46, No. 11, pp. 3661-3668 (2005).
Lewis et al., Copolymerization VII, Copolymerization of Some Further Monomer Pairs, Apr. 1948, pp. 1527-1529.
Li et al., "Highly ordered carbon nanotube arrays for electronics applications", Applied Physics Letters, 75 pp. 367-369 (1999).
Li et al., ASC Polym. Preprints, 1995, 36(1), 469.
Lingane, "Interpretation of the Polarographic Waves of Complex Metal Ions," Chem. Rev. 1941, 29, 1.
Liu et al., "Poly(N-isopropylacrylamide) hydrogels with improved shrinking kinetics by RAFT polymerization", Mar. 22, 2006, Polymer Elsevier Science Publishers, B.V., GB, pp. 2330-2336.
Majoral et al., Dendrimers Containing Heteroatoms (Si, P, B, Ge, or Bi), Chemical Reviews, 1999, pp. 845-880, vol. 99(3).
Makino et al., Controlled Atom Transfer Radical Polymerizations of Methyl Methacrylate Under Micellar Conditions, Polymer Preprints, 1988, pp. 288-289, vol. 39(1).
Mao et al., "Controlled polymerizations of 2-(dialkylamino)ethyl methacrylates and their block copolymers in protic solvents at ambient temperature via ATRP", Journal of Polymer Science, Part A Polymer Chemistry, 42(20), pp. 5161-5169 (2004).
Maraval et al., "Lego" Chemistry for the Straightforward Synthesis of Dendrimer, Journal of Organic Chemistry, 2003, pp. 6043-6046, vol. 68(15).
Mardare et al., ACS Polymer Preprints 35(1), 778 (1994).
Mardare et al., Macromolecules, 27, 645 (1994).
Mardare et al., Polym. Prep. (ACS), 36(1), 700-701 (1995).
Marestin et al., Nitroxide Mediated Living Radical Polymerization of Styrene in Emulsion, Macromolecules, 1998, pp. 4041-4044, vol. 31(12).
Matsumoto et al., Synth. Commun. (1985) 15, 515.

Matthews et al., Dendrimers-Branching out from Curiosites into New Technologies, Progress in Polymer Science, 1998, pp. 1-56, vol. 23.
Wang et al., Matyjaszewski ed., Controlled/"Living" Radical Polymerization. Progress in ATRP, NMP, and RAFT, in: ACS Symposium Ser., 2000, Chapter 19, Reverse Atom Transfer Radical Polymerization Using AIBN or BPO as Initiator, pp. 263-275.
Matyjaszewski et al., (Structural Control of Poly(Methyl Methacrylate)-g-poly(Lactic Acid) Graft Copolymers by Atom Transfer Radical Polymerization (ATRP). Macromolecules 2001, 34, 6243-6248.
Matyjaszewski et al., "Controlled/'Living Radical Polymerization. Kinetics of the Homogeneous Atom Transfer Radical Polymerization of Styrene," J. Am. Chem. Soc., 1997, 119, 674-680.
Matyjaszewski et al., "Atom transfer radical polymerization", *Chemical Reviews*, 2001, 101, (9), 2921-2990.
Matyjaszewski et al., Controlled/"Living" Radical Polymerization of Styrene and Methly Methacrylate Catalyzed by Iron Complexes1, Macromolecules, 1997, pp. 8161-8164, vol. 30(26).
Matyjaszewski et al., Controlled/Living Radical Polymerization: State of the Art in 2002, in ACS Symposium Series, Advances in Controlled/living Radical Polymerizations, American Chemical Society Division of Polymer Chemistry, 2003, Chapter 1, pp. 2-9, vol. 854.
Matyjaszewski et al., Controlled/Living Radical Polymerization: State of the Art in 2005, in Controlled Radical Polymerization: From Synthesis to Materials, American Chemical Society Division of Polymer Chemistry, 2006, Chapter 1, pp. 2-12, vol. 944.
Matyjaszewski et al., Zerovalent Metals in Controlled/"Living" Radical Polymerization, Macromolecules, 1997, pp. 7348-7350, vol. 30(23).
Matyjaszewski, "The Importance of Exchange Reactions in the Controlled/Living Radical Polymerization in the Presence of Alkoxyamines and Transition Metals", Macromolecule Symposium, 1996, vol. 111, pp. 47-61.
Matyjaszewski, "Radical Nature of Cu-Catalyzed Controlled Radical Polymerizations (Atom Transfer Radical Polymerization)," Macromolecules, 1998, 31, 4710-4717.
Matyjaszewski, K., "Overview: Fundamentals of Controlled/Living Radical Polymerization," American Chemical Society, publication date: Jan. 8, 1998, pp. 2-30, downloaded on Sep. 2, 2009, http://pubs.acs.org.
Matyjaszewski et al., Macromolecules 34, 5125 (2001).
Matyjaszewski et al., Tetrahedron (1997), 53, 15321-15329.
McCarthy et al., Grafting Chromatographic Stationary Phase Substrates by Atom Transfer Radical Polymerization, in Controlled Radical Polymerization: From Synthesis to Materials, American Chemical Society Division of Polymer Chemistry, 2005, Chapter 18, pp. 252-268, vol. 944.
Min et al, "Atom Transfer Radical Dispersion Polymerization of Styrene in Ethanol", Macromolecules, ACS, Washington, DC, US, vol. 40, No. 20, (Oct. 2, 2007), pp. 7217-7221.
Mitani et al., J. Am Chem. Soc. 105, 6719 (1983).
Nagashima, J. Org. Chem. 57, 1682 (1992).
Nagashima, J. Org. Chem. 58, 464 (1993).
Navon et al., Inorg. Chem. 1999, 38, 3484.
Nishikawa et al., Evidence for Living Radical Polymerization of Methyl Methacrylate with Ruthenium Complex: Effects of Protic and Radical Compounds and Reinitiation from the Recovered Polymers, Macromolecules, 1997, pp. 2244-2248, vol. 30(8).
Odell et al., Macromolecules, 1995, 28, 8453.
Odian, Principles of Polymerization, Third Edition, John Wiley & Sons, p. 205-233 (1991).
Orochov et al., Redox-Transfer, Part VI, Determination of Hammet's P-Constant for the Oxidation of Cuprous Chloride by Aromatic Sulphonyl Chlorides, Journal of the Chemical Society (B), (1969), pp. 255-259.
Orochov et al., J. Chem. Soc., Perkin II, 1000 (1973).
Orr, Thermochemical Aspects of Butadiene-Styrene Copolymerization, 1960, pp. 74-82.
Otsu et al., Chem. Express 5(10), 801 (1990).

(56) References Cited

OTHER PUBLICATIONS

Otsu et al., Synthesis, Reactivity, and Role of —Vinylbenzyl N,N-Diethyldithiocarbamate as a Monomer-Iniferter in Radical Polymerization, Macromolecules, 1986, pp. 287-290, vol. 19(2).
Pakula et al., Polymers, Particles, and Surfaces with Hairy Coatings: Synthesis, Structure, Dynamics, and Resulting Properties, in ACS Symposium Series, Advances in Controlled/living Radical Polymerizations, American Chemical Society Division of Polymer Chemistry, 2003, Chapter 26, pp. 366-382, vol. 854.
Paoletti et al., Inorg. Chem. 1967, 6, 64.
Paoletti et al., Inorg. Chim. Acta Rev. 1973, 7, 43.
Patten et al., Atom Transfer Radical Polymerization and the Synthesis of Polymeric Materials, Advanced Materials, 1998, pp. 901-915, vol. 10(12).
Patten et al., "Polymers with very low polydispersities from atom transfer radical polymerization", Science (Washington, D. C.), 1996, 272, (5263), 866-868.
Percec et al., "Living" Radical Polymerization of Styrene Initiated by Arenesulfonyl Chlorides and Cu1 (bpy)nCl, Macromolecules, 1995, pp. 7970-7972, vol. 28(23).
Percec et al., Metal-Catalyzed "Living" Radical Polymerization of Styrene Initiated with Arenesulfonyl Chlorides. From Heterogeneous to Homogeneous Catalyses, Macromolecules, 1996, pp. 3665-3668, vol. 29(10).
Pintauer et al., Toward Structural and Mechanistic Understanding of Transition Metal-Catalyzed Atom Transfer Radical Processes, in ACS Symposium Series, Advances in Controlled/living Radical Polymerizations, American Chemical Society Division of Polymer Chemistry, 2003, Chapter 10, pp. 130-147, vol. 854.
Punna et al., Click Chemistry in Polymer Synthesis, Polymer Preprints, 2004, pp. 778-779, vol. 45(1).
Puts et al., Macromolecules, 1996, 29, 3323.
Qiu et al., Cyclic Voltammetric Studies of Copper Complexes Catalyzing Atom Transfer Radical Polymerization, Macromolecular Chemistry and Physics, 2000, pp. 1625-1631, vol. 201(14).
Queffelec et al., Optimization of Atom Transfer Radical Polymerization Using Cu(I)/Tris(2-(dimethylamino)ethyl)amine as a Catalyst, Macromolecules, 2000, pp. 8629-8639, vol. 33.
Quirk et al., Makromol. Chem., Macromol. Symp. 67, pp. 351-363 (1993), "Mechanistic Aspects of Group Transfer Polymerization".
Richard et al., Acrylate-Based Block Copolymers Prepared by Atom Transfer Radical Polymerization as Matrices for Drug Delivery Applications, in Controlled Radical Polymerization: From Synthesis to Materials, American Chemical Society Division of Polymer Chemistry, 2005, Chapter 17, pp. 234-251, vol. 944.
S.A.F. Bon et al., Controlled Radical Polymerization in Emulsion, Macromolecules, 1997, pp. 324-326, vol. 30(2).
Samuni et al., "On the cytotoxicity of vitamin C and metal ions," European Journal of Biochemistry, 1983, 137. 119-124.
Schubert et al., Design of Effective Systems for Controlled Radical Polymerization of Styrene: Application of 4,4'-Dimethyl and 5,5'-Dimethyl 2,2'-Bipyridine Copper(ii) Complexes, Macromolecular Rapid Communication, 1999, pp. 351-355, vol. 20.
Schulz & Milkovich, Relative Reactivities and Graft Distributions of Polystyrene Macromers in Vinyl Chloride Copolymerization, Polymer International, 1994, pp. 141-149, Great Britain.
Seijas et al., Tetrahedron, 48(9), 1637 (1992).
Shen et al., Supported Atom Transfer Radical Polymerization of Methyl Methacrylate Mediated by CuBr-Tetraethyldiethylenetriamine Grafted onto Silica Gel—Journal of Polymer Science: Part A: Polymer Chemistry, vol. 39, 1051-1059 (2001); John Wiley & Sons, Inc.
Srivastava et al., J. Inorg. Nucl. Chem. (1980), 42, 47.
Stille et al., Synthesis and Copolymerization of Styryl-Substituted Tetrazoles. Thermal Cross-Linking of Copolymers Containing Dipolarophiles and the Tetrazoles as Nitrile Imine Dipole Precursors, Macromolecules, 1972, pp. 377-384, vol. 5(4).
Sumerlin et al., Click Functionalization of Well-Defined Copolymers Prepared by Atom Transfer Radical Polymerization, in Controlled Radical Polymerization: From Synthesis to Materials, American Chemical Society Division of Polymer Chemistry, 2005, Chapter 11, pp. 140-152, vol. 944.
Takeichi et al., Preparation of Porous Carbon Films by the Pyrolysis of Poly(Urethane-imide) Films and Their Pore Characteristics, Carbon, 2001, pp. 257-265, vol. 39(2).
Tang, et al., J. Am. Chem. Soc., 128, 1598-1604.
Tsarevesky et al., Factors Determining the Performance of Copper-Based Atom Transfer Radical Polymerization Catalysts and Criteria for Rational Catalyst Selection, in Controlled Radical Polymerization: From Synthesis to Materials, American Chemical Society Division of Polymer Chemistry, 2005, Chapter 5, pp. 56-70, vol. 944.
Tsarevsky et al., Well-Defined (Co)polymers with 5-Vinyltetrazole Units via Combination of Atom Transfer Radical (Co)polymerization of Acrylonitrile and "Click Chemistry"—Type Postpolymerization Modification, Macromolecules, 2004, pp. 9308-9313, vol. 37(25).
Udding et al., J. Org. Chem. 59, 1993 (1994).
Van Gaal et al., "Trends in Redox Potentials of Transition Metal Complexes," Coord. Chem. Rev. 1982, 47, 41.
Veregin et al., Macromolecules, 1996, 29, 4161.
Vidts et al., "Design of water-soluble block copolymers containing poly(4-vinylpyridine) by atom transfer radical polymerization", European Polymer Journal, Pergamon Press Ltd, Oxford, GB, vol. 42, No. 1, pp. 43-50 (2006).
Vlcek, "Ligand Based Redox Series," Coord. Chem. Rev. 1982, 43, 39.
Von Werne et al., Preparation of Structurally Well-Defined Polymer—Nanoparticle Hybrids with Controlled/living Radical Polymerizations—J. Am. Chem. Soc. 1999, 121, 7409-7410.
Wang et al., "Living"/Controlled Radical Polymerization, Transition-Metal-Catalyzed Atom Transfer Radical Polymerization in the Presence of a Conventional Radical Initiator, Macromolecules, 1995, pp. 7572-7573, vol. 28.
Wang et al., Controlled/"Living" Radical Polymerization. Atom Transfer Radical Polymerization in the Presence of Transition-Metal Complexes, Journal of the American Chemical Society, 1995, pp. 5614-5615, vol. 117(20).
Wang et al., Controlled/"Living" Radical Polymerization. Halogen Atom Transfer Radical Polymerization Promoted by a Cu(I)/Cu(II) Redox Process, Macromolecules, 1995, pp. 7901-7910, vol. 28(23).
Wang et al., ESR Study and Radical Observation in Transition Metal-Mediated Polymerization: Unified View of Atom Transfer Radical Polymerization Mechanism, in ACS Symposium Series, Advances in Controlled/living Radical Polymerizations, American Chemical Society Division of Polymer Chemistry, 2003, Chapter 12, pp. 161-179, vol. 854.
Wang et al., "Facile Synthesis of Acidic Copolymers Via Atom Transfer Radical Polymerization in Aqueous Media at Ambient Temperature", Macromolecules, ACS, Washington, DC, vol. 33, No. 2, (Jan. 25, 2000), pp. 255-257.
Wang et al., J. Am. Chem. Soc. (1992), 114, 248-255.
Wang et al., Polym. Prep. (Am. Chem. Soc. Polym. Chem. Div.), 36(1), 465 (1995).
Wayland et al., Am. Chem. Soc., 116, 7943 (1994).
Webster, Living Polymerization Methods, Science, 1991, pp. 887-893, vol. 25.
Webster, Makromol. Chem., Macromol. Symp. 67, pp. 365-371 (1993), "Mechanism of GTP: Can all of the Available Data be Accommodated?".
Wei et al., Atom Transfer Radical Polymerization of Styrene in the Presence of Iron Complexes, Polymer Preprints, 1997, pp. 231, vol. 38(2).
Wu et al., Efficiency and Fidelity in a Click-Chemistry Route to Triazole Dendrimers by the Copper(I)-Catalyzed Ligation of Azides and Alkynes, Angewandte Chemie, International Edition, 2004, pp. 3928-3932, vol. 43(30).
Xia et al., Controlled/"Living" Radical Polymerization. Homogenous Reverse Atom Transfer Radical Polymerization Using AIBN as the Initiator, Macromolecules, 1997, pp. 7692-7696, vol. 30.
Xia et al., "Atom Transfer Radical Polymerization of 4-Vinylpyridine", Macromolecules, pp. 3531-3533 (1999).

(56) References Cited

OTHER PUBLICATIONS

Zeng et al., "Synthesis and Characterization of Comb-Branched Polyelectrolytes. 1. Preparation of Cationic Macromonomer of 2-(Dimethylamino)ethyl Methacrylate by Atom Transfer Radical Polymerization", Macromolecules, 33(5), pp. 1628-1635 (2000).
Gaynor et al., Macromolecules 1998, 31, 5951-5954.
Chambard et al., Macromol. Symp. 2000, 150, 45-51.
Li et al., Macromolecules 2004, 37, 2106-2112.
Min et al., J. Am. Chem. Soc. 2005, 127, 3825-3830.
Min et al., J. Polym. Sci., Part A: Polym. Chem. 2005, 43, 3616-3622.
Antonietti et al., Macromolecules, 1991, 24: 6636-6643.
Feng et al., "The Preparation of Micropolystyrene Particles by Controlled Microemulsion Polymerization", Polymer Materials Science and Engineering, Jul. 2005, vol. 21, No. 4, 117-120.
Feng, et al., J. Appl. Polym. Sci., 2006, 99 1093-1099.
Min et al., Macromolecules 2005, 38, 8131-8134.
Nicolas et al., Macromolecules 2005, 38, 9963-9973.
Ferguson et al., Macromolecules 2005, 38, 2191-2204.
Gilbert et al., Macromolecular Symposia 2006, 231, 84-93.
Chow et al., Adv. Polym. Sci. 2005, 175, 257-298.
Chow et al., Langmuir 1999, 15, 3202-3205.
El-Safty et al., Chem. Mater. 2005, 17, 3137-3145.
Stoffer et al., J. Polym. Sci. Polym. Chem. Ed. 1980, 18, 2641-2648.
Ferrick et al., Macromolecules 1989, 22, 1515-1517.
Kuo et al., Photoinitiated Polymerization of Styrene in Microemulsions, Macromolecules, 1987, 20, pp. 1216-1221.
Jakubowski et al., Macromolecules 2005, 38, 4139-4146.
Antonietti et al., Macromol. Chem. Phys. 1995, 196, 441-466.
Guo et al., J. Polym. Sci., Part A: Polym. Chem. 1989, 27, 691-710.
Cramer, W. Proc. Chem. Soc. 1914, 30, 293.
Reiner et al., Baskerville Chemical Journal 1953, 4, 15-17.
Singh et al., Zeitschrift fuer Physikalische Chemie (Leipzig) 1957, 207, 198-204.
Parris et al., Discussions of the Faraday Society 1960, 240-247.
Weiss et al., Inorg. Chem. 1964, 3, 1344-1348.
Maeda et al., J. Adv. Polym. Sci. 2006, 193, 103-121.
Brown et al., Nature Rev. Cancer 2004, 4, 437-447.
Khelfallah et al., "Synthesis of New PHEMA/PEO Enzymatically Biodegradable Hydrogel", Macromolecular Rapid Communications, 2006, 27, 1004-1008.
Huang, X and T. L. Lowe, "Biodegradable Thermoresponsive Hydrogels for Aqueous Encapsulation and Controlled Release of Hydrophilic Model Drugs", Biomacromolecules, 2005, 6, 2131-2139.
Houk, J. and G. M. Whitesides, "Structure-Reactivity Relations for Thiol-Disulfide Interchance", J. Am. Chem. Soc., 1987, 109, 6825-6836.
Tsarevsky et al., Chapter VI: Synthesis of Well-Defined Polymeric Materials with Diuslfide and Thiol Groups, Their Further Functionalization, and Reversible Cleavage/Coupling Via Redox Processes: Towards functional (Bio)Degradable Materials, Thesis, Carnegie Mellon University, pp. 249-311 (2005).
Li et al., Angew Chem. Int. Ed. 2006, 45, 3510-3513.
Li et al., "Synthesis of Reversible Shell Cross-Linked Micelles for Controlled Release of Bioactive Agents", Macromolecules, 2006, 39, 2726-2728.
Gao et al., "Synthesis of Degradable Miktoarm Star Sopolymers via Atom Transfer Radical Polymerization", Macromolecules, vol. 38, pp. 5995-6004 (2005).
Schafer et al., Free Radical Biol. Med. 2001, 30, 1191-1212.
Medicinal Research Reviews, 2002, 22, 225-250.
Tsarevsky et al., "Combining Atom Transfer Radical Polymerization and Disulfide/Thiol Redox Chemistry: A Route to Well-Defined (Bio)degradable Polymeric Materials", Macromolecules, 2005, 38, 3087-3092.
Oh et al., "Inverse Miniemulsion ATRP: A New Method for Synthesis and Functionalization of Well-Defined Water-Soluble/Cross-Linked Polymeric Particles", Journal of the American Chemical Society, 2006, 128, 5578-5584.
Oh et al., "Biodegradable Nanogels Prepared by Atom Transfer Radical Polymerization as Potential Drug Delivery Carriers: Synthesis, Biodegradation, in Vitro Release, and Bioconjugation", Journal of the American Chemical Society, 2007, 129 (18): 5939-5945.
Barrett, K.E. et al., J. Polym. Sci., Polym. Chem. Ed. 1969, 7, 2621.
Tseng, C.M. et al., J. Polym. Sci., Part A: Polym. Chem. 1986, 24, 2995.
El-Aasser, M.S. et al., J. Polym. Sci., Part A: Polym. Chem. 1996, 34, 2633.
Kawaguchi et al., Adv. Polym. Sci., 2005, 175, 299.
LaMER, V.K. et al., J. Am. Chem. Soc. 1950, 72, 4847.
Yang, W. et al., J. Polym. Sci., Part A: Polym. Chem. 2001, 39, 555.
Song, J. et al., J. Am. Chem. Soc. 2004, 126, 6562.
Song, J. and M. A. Winnik, "Cross-Linked, Monodisperse, Micro-Sized Polystyrene Particles by Two-Stage Dispersion Polymerization," Macromolecules, vol. 38, pp. 8300-8307 (2005).
Song, J. et al., 2006, 39, 8318-8325.
Hölderle, M. et al., Macromolecules 1997, 30, 3420.
Gabaston et al., Macromolecules 1998, 31, 2883.
Shim, S.E. et al., S. Polymer 2003, 44, 5563.
Min, K. et al., "Development of an ab Initio Emulsion Atom Transfer Radical Polymerization: From Microemulsion to Emulson." J. Am. Chem. Soc. 2006, 128(32), 10521-10526.
Min, K. et al., "Atom Transfer Radical Dispersion Polymerization of Styrene in Ethanol" Polymer Preprints, 2007, 48 (2), 260-261.
Patil et al., Surface-modified and Internally cationic polyamidoamine dendrimers for efficient siRNA delivery, 2008, Bioconjugate Chemistry, vol. 19, pp. 1396-1403.
Zhang, Chi, Transcriptional regulation of bone formation by the osteoblast-specific transcription factor Osz, 2010, Journal of Orthopaedic Surgery and Research, vol. 5:37, pp. 1-8.
Yan et al., Axin2 controls bone remodeling through the beta-catenin-BMP signaling pathway in adult mice, 2009, Journal of Cell Science, vol. 122, pp. 3566-3578.
Akhtar et al., "Toxicogenomics of non-viral drug delivery systems for RNAi: Potential impact on siRNA-mediated gene silencing activity and specificity", Adv. Drug Delivery Rev., 2007, 59, (2-3), 164-182.
Bencherif et al., "End-group effects on the properties of PEG-co-PGA hydrogels", Acta Biomater, 2009, 5(6): 1872-1883.
Bencherif et al., "Influence of cross-linker chemistry on release kinetics of PEG-co-PGA hydrogels", J. Biomed. Mater. Res., Part A, 2009, 90A(1): 142-153.
Bencherif et al., "Cell-Adhesive Star Polymers Prepared by ATRP", Biomacromolecules, 2009, (10), 1795-1803.
Bencherif et al., "Influence of the degree of methacrylation on hyaluronic acid hydrogels properties", Biomaterials, 2008, 29, (12), 1739-1749.
Bencherif et al., "Nanostructured hybrid hydrogels prepared by a combination of atom transfer radical polymerization and free radical polymerization", Biomaterials, 2009, 30, (29), 5270-5278.
Bencherif et al., "Synthesis by AGET ATRP of Degradable Nanogel Precursors for in Situ Formation of Nanostructured Hyaluronic Acid Hydrogel", Biomacromolecules, 2009, 10, (9), 2499-2507.
Birukova et al., "ALK5 and Smad4 are involved in TGF-beta1-induced pulmonary endothelial permeability", FEBS Letters, 2005, 579(18): 4031-4037.
Bober et al., "Delivery of siRNA using cationic star polymers to suppress runt related transcription factor 2 and osterix in vitro", 34th Annual Meeting of the Society for Biomaterials 2010, Giving Life to a World of Materials, Seattle, Washington, USA, Apr. 21-24, 2010, vol. 2 of 2, 579.
Braunecker, W. A. and K. Matyjaszewski, "Controlled/living radical polymerization: Features, developments, and perspectives". [Erratum to document cited in CA147:486671], Progress in Polymer Science, 2008, 33, (1), 165.
Braunecker, W. and K. Matyjaszewski, "Controlled/living radical polymerization: Features, developments, and perspectives", Progress in Polymer Science, 2007, 32, (1), 93-146.
Brekke, J. H., and Kipling Thacker, "Hyaluronan as a Biomaterial", An Introduction to Biomaterials, The Biomedical Engineering Series, 2006, 219-240.

(56) References Cited

OTHER PUBLICATIONS

Chaturvedi, et al., "Noggin maintains pluripotency of human embryonic stem cells grown on Matrigel", Cell Prolif, Aug. 2009, 42, (4), 425-433.
Cho et al., "Synthesis of Biocompatible PEG-Based Star Polymers with Cationic and Degradable Core for siRNA Delivery", Biomacromolecules: 12(10): 3478-3486.
Cho et al., "Preparation of Poly(ethylene glycol) Star Copolymers with a Cationic Core for siRNA Delivery by ATRP", Polym. Prepr., (Am. Chem. Soc., Div. Polym. Chem.), 2011, 52(2): 608-609.
Cho et al., "Rapid Cellular Internalization of Multifunctional Star Polymers Prepared by Atom Transfer Radical Polymerization", Biomacromolecules, 2010, 11 (9): 2199-2203.
Coessens et al., "Functional polymers by atom transfer radical polymerization", Progress in Polymer Science, 2001, 26, (3), 337-377.
Colla et al., "Human myeloma cells express the bone regulating gene Runx2/Cbfa1 and produce osteopontin that is involved in angiogenesis in multiple myeloma patients", Leukemia, 2005, 19, (12), 2166-2176.
Demetriou, et al., "Fetuin/alpha2-HS glycoprotein is a transforming growth factor-beta type II receptor mimic and cytokine antagonist", J Biol Chem, 1996, 271, (22), 12755-12761.
Dong, Hongchen and Krzysztof Matyjaszewski, "ARGET ATRP of 2-(Dimethylamino)ethyl Methacrylate as an Intrinsic Reducing Agent", Macromolecules, 2008, 41, 6868-6870.
Duncan et al., "Dendrimer biocompatibility and toxicity", Adv. Drug Delivery Rev., 2005, 57, (15), 2215-2237.
Duncan et al., "Polymer therapeutics: polymers as drugs, drug and protein conjugates and gene delivery systems: past, present and future opportunities", Adv. Polym. Sci., 2006, 192, (Polymer Therapeutics I), 1-8.
El-Aneed, A., "An overview of current delivery systems in cancer gene therapy", J. Controlled Release, 2004, 94, (1), 1-14.
Fukuda et al., Generation of a mouse with conditionally activated signaling through the BMP receptor, ALK2, Genesis, 2006, 44, (4), 159-167.
Gao, H. and K. Matyjaszewski, "Synthesis of functional polymers with controlled architecture by CRP of monomers in the presence of cross-linkers: From stars to gels", Prog. Polym. Sci., 2009, 34, (4), 317-350.
Gilmore et al., "The design and exogenous delivery of siRNA for post-transcriptional gene silencing", Journal of Drug Targeting, 2004, 12, (6), 315-340.
Goldring, M. B. and S. R. Goldring, "Skeletal tissue response to cytokines", Clin Orthop Relat Res, 1990, (258), 245-278.
Guimaraes, M. and P. Mourao, "Urinary excretion of sulfated polysaccharides administered to Wistar rats suggests a renal permselectivity to these polymers based on molecular size", Biochim. Biophys. Acta, Gen. Subj., 1997, 1335, (1-2), 161-172.
Gupta et al., "Hydrogels: from controlled release to pH-responsive drug delivery", Drug Discov Today, 2002, 7, (10), 569-579.
Hammond, et al., "An RNA-directed nuclease mediates post-transcriptional gene silencing in *Drosophila* cells", Nature, 2000, 404, (6775), 293-296.
Hartwell, R. et al., "A Novel Nydrogel-Collagen Composite Improves Functionality of an Injectable Extracellular Matrix", Acta Biomaterialia, 7, 2011, 3060-3069.
Hawker et al., "New polymer synthesis by nitroxide mediated living radical polymerizations", Chem Rev, 2001, 101, (12), 3661-3688.
Heath et al., "Charged polymers via controlled radical polymerization and their implications for gene delivery", Macromol. Chem. Phys., 2007, 208, (12), 1243-1249.
Heggli et al., "Michael-type addition as a tool for surface functionalization", Bioconjugate Chem., 2003, 14, (5), 967-973.
Heldin et al, "TGF-beta signalling from cell membrane to nucleus through SMAD proteins", Nature, 1997, 390, (6659), 465-471.
Hiemstra et al., "Rapidly in situ-forming degradable hydrogels from dextran thiols through michael addition", Biomacromolecules, 2007, 8, (5), 1548-1556.

Hong et al., "TAZ, a transcriptional modulator of mesenchymal stem cell differentiation", Science, 2005, 309, (5737), 1074-1078.
Hong, et al., "Post-transcriptional gene silencing using siRNA delivered from star nanostructured polymer", Abstracts/Bone, 46, S9-S83, accepted for society for Biomaterials, Seattle, WA, Apr. 21-24, 2010, S49-S50.
Ikeda et al., "The promyelotic leukemia zinc finger promotes osteoblastic differentiation of human mesenchymal stem cells as an upstream regulator of CBFA1", J. Biol. Chem., 2005, 280(9): 8523-8530.
Ikeda et al., "Identification of FAZF as a novel BMP2-induced transcription factor during osteoblastic differentiation", J Cell Biochem, 2007, 101, (1), 147-154.
Iorio, R. et al., "Heterotopic ossification after hip and knee arthroplasty: risk factors, prevention, and treatment", J Am Acad Orthop Surg, 2002, 10, (6), 409-416.
Jazag et al., "Single small-interfering RNA expression vector for silencing multiple transforming growth factor-beta pathway components", Nucleic Acids Research, 2005, 33(15): e131, 1-9.
Kim et al., "Inhibition of ocular angiogenesis by siRNA targeting vascular endothelial growth factor pathway genes: therapeutic strategy for herpetic stromal keratitis", Am J Pathol, 2004, 165, (6), 2177-2185.
Li et al., "A New Class of Biochemically Degradable, Stilumus-Responsive Triblock Copolymer Gelators", Agnew. Chem. Int. Ed., 2006, 45, 3510-3513.
Lowe, A. and C. McCormick, "Reversible addition-fragmentation chain transfer (RAFT) radical polymerization and the synthesis of water-soluble (co)polymers under homogeneous conditions in organic and aqueous media", Prog. Polym. Sci., 2007, 32, (3), 283-351.
Ma et al., "Structural basis for overhang-specific small interfering RNA recognition by the PAZ domain", Nature (London, U. K.), 2004, 429, (6989), 318-322.
Matyjaszewski et al., "Simple and Efficient Synthesis of Various Alkoxyamines for Stable Free Radical Polymerization", Macromolecules, 1998, 31, (17), 5955-5957.
McCarthy, E.F. and M. Sundaram, "Heterotopic ossification: a review", Skeletal Radiol, 2005, 34: 609-619.
Merkel et al., "Stability of siRNA polyplexes from poly(ethylenimine) and poly(ethylenimine)-g-poly(ethylene glycol) under in vivo conditions: Effects on pharmacokinetics and biodistribution measured by Fluorescence Fluctuation Spectroscopy and Single Photon Emission Computed Tomography (SPECT) imaging", J. Controlled Release, 2009, 138, (2), 148-159.
Murakami et al., "A WW domain protein TAZ is a critical coactivator for TBX5, a transcription factor implicated in Holt-Oram syndrome", PNAS, USA, 2005, 102(50): 18034-18039.
Naik et al., "Gene delivery to the retina: focus on non-viral approaches", Drug Discovery Today, 2009, 14, (5/6), 306-315.
Nakao et al. "Identification of Smad7, a TGFβ-inducible antagonist of TGF-β signalling", Nature, vol. 389, Oct. 9, 1997, 631-635.
Oh et al., "Synthesis and Biodegradation of Nanogels as Delivery Carriers for Carbohydrate Drugs", Biomacromolecules, 2007, 8, (11), 3326-3331.
Oh et al., "The development of microgels/nanogels for drug delivery applications", Progress in Polymer Science, 2008, 33, (4), 448-477.
Ohyama et al., "Spaciotemporal association and bone morphogenetic protein regulation of sclerostin and osterix expression during embryonic osteogenesis", Endocrinology, 2004, 145, (10), 4685-4692.
Park et al., "Photo-Cross-Linkable Thermoresponsive Star Polymers Designed for Control of Cell-Surface Interactions", Biomacromolecules, 2010, 11(10): 2647-2652.
Parkinson et al., "Radiation therapy in the prevention of heterotopic ossification after total hip arthroplasty", Hip, 1982, 211-227.
Reddi, et al., "Biochemical sequences in the transformation of normal fibroblasts in adolescent rats", Proc Natl Acad Sci USA, 1972, 69, (6), 1601-5.
Saina et al., "BMPs and chordin regulate patterning of the directive axis in a sea anemone", Proc Natl Acad Sci USA, 2009, 106, (44), 18592-18597.

(56) References Cited

OTHER PUBLICATIONS

Shen, Y., "Advances in the development of siRNA-based therapeutics for cancer", IDrugs, 2008, 11(8): 572-578.
Shore et al., "A recurrent mutation in the BMP type I receptor ACVR1 causes inherited and sporadic fibrodysplasia ossificans progressiva", Nature Genetics, 2006, 38, (5), 525-527.
Shore et al., "Insights from a rare genetic disorder of extra-skeletal bone formation, fibrodysplasia ossificans progressiva (FOP)", Bone, 2008, 43, (3), 427-433.
Sieber et al., "Recent advances in BMP receptor signaling", Cytokine Growth Factor Rev, 2009, 20, (5-6), 343-355.
Siegwart et al., "Solvent induced morphologies of poly(methyl methacrylate-b-ethylene oxide-b-methyl methacrylate) triblock copolymers synthesized by atom transfer radical polymerization," Polymer, 2007, 48(25): 7279-7290.
Siegwart et al., "Biotin-, Pyrene-, and GRGDS-functionalized polymers and nanogels via ATRP and end group modification", Macromol. Chem. Phys., 2008, 209, (21), 2179-2193.
Siegwart et al., "Cellular uptake of functional nanogels prepared by inverse miniemulsion ATRP with encapsulated proteins, carbohydratesmand gold nanoparticles, Biomacromolecules", 2009, 10, (8), 2300-2309.
Siegwart et al., "Synthesis, characterization, and in vitro cell culture viability of degradable poly(N-isopropylacrylamide-co-5,6-benzo-2- methylene-1,3-dioxepane)-based polymers and crosslinked gels", Journal of Biomedical Materials Research, Part A, 2008, 87 A, (2), 345-358.
Srinivasan et al., "Delivery of siRNA Using Cationic Nanostructured Star Polymers to Prevent Myoblast Cell Differentiation to Bone", Carnegie Mellon University, Pittsburgh, Pennsylvania, Dec. 2010, 1 page.
Thomas et al., "Progress and problems with the use of viral vectors for gene therapy", Nat. Rev. Genet., 2003, 4, (5), 346-358.
Turner et al., "RNA targeting with peptide conjugates of oligonucleotides, siRNA and PNA", Blood Cells Mol Dis, 2007, 38, (1), 1-7.
Urist, M. R., "The search for and discovery of bone morphogenetic protein (BMP)," Bone Grafts, Derivatives and Substitutes, Butterworth: London, 1994, 315-362.
van Ooij et al., "Surgical removal of debilitating neurogenic heterotopic ossifications of the hip". Ned Tijdschr Geneeskd, 2005, 149, (1), 37-41. English abstract.
Vanden Bossche, L. and G. Vanderstraeten, "Heterotopic ossification: a review", J Rehabil Med, 2005, 37, (3), 129-136.
Wang et al., "Delivery of siRNA Therapeutics: Barriers and Carriers", The AAPS Journal, 2010, 12(4): 492-503.
Wang et al., "p53 functions as a negative regulator of osteoblastogenesis, osteoblast-dependent osteoclastogenesis, and bone remodeling", J Cell Biol, 2006, 172(1): 115-125.
Wordinger et al., "Focus on molecules: gremlin", Exp Eye Res, 2008, 87, (2), 78-79.
Xia et al., "Repulsive guidance molecule RGMa alters utilization of bone morphogenetic protein (BMP) type II receptors by BMP2 and BMP4", J Biol Chem, 2007, 282(25): 18129-18140.
Yagi et al., "Bcl-2 positively regulates Sox9-dependent chondrocyte gene expression by suppressing the MEK-ERK1/2 signaling pathway", J Biol Chem, 2005, 280, (34), 30517-30525.
Yan et al., "Regulation of TGF-beta signaling by Smad7", Acta Biochim Biophys Sin (Shanghai), 2009, 41, (4), 263-272.
Yu et al., "BMP type I receptor inhibition reduces heterotopic [corrected] ossification", Nat Med, 2008, 14, (12), 1363-1369.
Zelikin et al., "Disulfide Cross-Linked Polymer Capsules: En Route to Biodeconstructible Systems", Biomacromolecules, 2006, 7, 27-30.
Zhang, et al., "The bone morphogenetic protein signaling pathway is upregulated in a mouse model of total parenteral nutrition", J Nutr, 2009, 139, (7), 1315-1321.
Pyun et al., "Synthesis of Well-Defined Block Copolymers Tethered to Polysilsequioxane Nanoparticles and their Nanoscale Morphology on Surfaces", J. Am. Chem. Soc. 123, 9445-9446 (2001).
Pyun et al., Supporting Information, J. Am. Chem. Soc., 51-58 (2001).
Pyun et al., "Synthesis of Nancomposite Organic/Inorganic Hybrid Materials Using Controlled/'Living' Radical Polymerization," Chem. Mater. 13, 3436-3448 (2001).
Pyun et al., "Synthesis of Polymer Brushes Using Atom Transfer Radical Polymerization", Macromol. Rapid Commun. 24, 1043-1059 (2003).
Pyun et al., "Synthesis and Characterization of Organic/Inorganic Hybrid Nanoparticles: Kinetics of Surface-Initiated Atom Transfer Radical Polymerization and Morphology of Hybrid Nanoparticle Ultrathin Films", Macromolecules 36, 5094-5104 (2003).
Matyjasewski et al., Chapter 17 Organic-Inorganic Hybrid Polymers from Atom Transfer Radical Polymerization and Poly(dimethylsiloxane), Am. Chemical Soc. Symposia. 270-283 (2000).
Pyun et al. "Organic/Inorganic Hybrid Materials from Polysiloxanes and Polysilsesquioxanes Using Controlled/Living Radical Polymerization", Manuscript submitted for Publication 1-12 (2007).
Bombalski et al., "Quasi-transparent Hybrid Particles Using Atom Transfer Radical Polymerization", Polymeric Materials: Science & Engineering 97, 327 (2007).
Bockstaller et al., "Block Copolymer Nanocomposites: Perspectives for Tailored Functional Materials", Adv. Mater. 17, 1331-1349 (2005).
Bombalski et al., "Null-Scattering Hybrid Particles Using Controlled Radical Polymerization", Adv. Mater. 19, 4486-4490 (2007).
Bouvier-Fontes et al., "Seeded Semicontinuous Emulsion Copolymerization of Butyl Acrylate with Cross-Linkers", Macromolecules 38, 1164-1171 (2005).
Kirsch et al., "Control of Particle Morphology and Film Structures of Carboxylated Poly(Methyl Methacrylate)/Poly(n-Butylacrylate) Composite Latex Particles", Journal of Appliled Polymer Science, vol. 91, 2610-2623 (2004).
Kirsch et al., "Control of Particle Morphology and Film Structures of Carboxylated Poly(N-Butylacrylate)/Poly(methyl) Composite Latex Particles", Colloids and Surfaces, A Physicochemical and Engineering Aspects, 183-185, 725-737 (2001).
Garnett, "Colours in Metal Glasses and in Metallic Films", Phil. Trans. R. Soc. Lond. A. 203, 385-420 (1904).
Garnett, "Colours in Metal Glasses, in Metallic Films, and in Metal Solutions II", Phil. Trans. R. Soc. Lond. A. 205, 237-288 (1906).
Baysal, et al., Styrene Polymerization with a Macroinitiator Having Siloxane Units, Journal of Applied Polymer Science, May 31, 1996, vol. 60, 1369-1378.
Gaynor et al., "Synthesis of Branched and Hyperbranched Polystyrenes", Macromolecules, 1996, 29, 1079-1081.
Ando et al., "Living Radical Polymerization of Methyl Methacrylate with Ruthenium Complex: Formation of Polymers with Controlled Molecular Weights and Very Narrow Distributions", Macromolecules, 1996, 29, 1070-1072.
Ishizu et al., "Synthesis of star polymers by organized polymerization of macromonomers", *Polymer*, vol. 36, pp. 4155-4157 (1995).
Mirica et al., "Structure and Spectroscopy of Copper-Dioxygen Complexes", Chem. Rev. 2004, 104, 1013-1045.
Bouix et al., "Synthesis of amphiphilic polyelectrolyte block copolymers using "living" radical polymerization, Application as stabilizers in emulsion polymerization", Macromol. Rapid Commun., 1998, 19, 209-213.
Burguiere et al., "Amphiphilic Block Copolymers Prepared via Controlled Radical Polymerization as Surfactants for Emulsion Polymerization", Macromol. Symp. 2000, 150, 39-44.
Nicolay et al., "Dibromotrithiocarbonate Iniferter for Concurrent ATRP and RAFT Polymerization. Effect of Monomer, Catalyst, and Chain Transfer Agent Structure on the Polymerization Mechanism," Macromolecules, 2008, 41, 4585-4596.
Nicolay et al., "Synthesis of poly(vinyl acetate) block copolymers by successive RAFT and ATRP with a bromoxanthate iniferter," Chem. Commun., 2008, 5336-5338.
Kwak, et al., "Effect of Initiator and Ligand Structures on ATRP of Styrene and Methyl Metacrylate Initiated by Alkyl Dithiocarbamate," Macromolecules, 2008, 41, 6627-6635.

(56) References Cited

OTHER PUBLICATIONS

Kwak, et al., "Concurrent ATRP/RAFT of Strene and Methyl Methacrylate with Dithioesters Catalyzed by Copper(I) Complexes," Macromolecules, 2008, 41, 6602-6604.

Wager et al., "A simple method to convert atom transfer radical polymerization (ATRP) Initiators into reversible addition fragmentation chain-transfer (RAFT) mediators." Eur. Polym. J., 2004, 40, 641-645.

Kabachii, et al., "Dithioesters in Atom-Transfer Radical Polymerization," Polym. Sci, Ser. B, 2006, 48, 32-36.

Zhang, et al., "Atom Transfer Radical Polymerizations of Methyl Methacrylate and Styrene with an Iniferter Reagent as the Initiator," J. Appl. Polym. Sci., 2007, 106, 230-237.

Zhang, et al., "Synthesis of Well-Defined Naphthalene and Photolabile Group-Labeled Polystyrene via ATRP," J. Polym. Sci.: Part A: Polym. Chem., 2006, 44, 510-518.

Kwak, et al., "Photoirradiated Atom Transfer Radical Polymerization with an Alkyl Dithiocarbamate at Ambient Tempterature", Macromolecules, 2010, 43, 5180-5183.

Matsuzaki et al., "Stereoregularity of Polystyrene and Mechanism of Polymerization", Die Makromolekulare Chemie, 1975, 176, 3051-3064.

Haddleton et al., "Identifying the Nature of the Active Species in the Polymerization of Methacrylates: Inhibition of Methyl Methacrylate Homopolymerizations and Reactivity Ratios for Copolymerization of Methyl Methacrylate/n-Butyl Methacrylate in Classical Anionic, Alkyllithium/Trialkylaluminum-Initiated, Group Transfer Polymerization, Atom Transfer Radical Polymerization, Catalytic Chain Transfer, and Classical Free Radical Polymerization", Macromolecules, 1997, 30, 3992-3998.

Webster, Owen W., "Group Transfer Polymerization: Mechanism and Comparison with Other Methods for Controlled Polymerization of Acrylic Monomers", Adv Polym Sci, 2004, 167, 1-34.

Azari et al., "Bone morphogenetic proteins: A review for cranial and maxillofacial surgery," Oral and Maxillo. Surg. Clin. of N.A., 14:1-14, 2002.

Jadlowiec et al., "Bone tissue engineering: recent advances and promising therapeutic agents," Expert Opin. Biol. Ther, 3(3):409-423, 2003.

Kübler et al., "Effect of different factors on the bone forming properties of recombinant BMPs," Mund Kiefer GesichtsChir, 2000; 4(8):465-469 (Abstract).

Zilliox et al., "Preparation of star-shaped macromolecules by anionic copolymerization," Journal of Polymer Science, Polymer Symposia, No. 22 (Pt. 1): 145-56, (1968).

Kanaoka et a., "Synthesis of star-shaped poly-vinyl ethers by living cationic polymerization: pathway for formation of star-shaped polymers via polymer linking reactions," Polymer Bulletin (Berlin) 44(5-6): 485-492, (2000).

Shibata, et al., "Quantitative Synthesis of Star-Shaped Poly(vinyl ether)s with a Narrow Molecular Weight Disribution by Living Cationic Polymerization," Journal of the American Chemical Society, 128(23): 7497-7504, (2006).

Qiu et al., "Controlled/Living Radical Polymerization in Aqueous Media: Homogeneous and Heterogeneous Systems," Prog. Polym. Sci., vol. 26, pp. 2083-2134 (2001).

Ohno, S. and K. Matyjaszewski, "Controlling Grafting Density and Side Chain Length in Poly(n-butyl acrylate) by ATRP (Co)polymerization of Macromonomers," Journal of Polymer Chem. Ed., 2006, 44, 5454-5467 (2006).

Matyjaszewski, K. and J. Xia, "Fundamentals of Atom Transfer Radical Polymerization," Handbook of Radical Polymerization, Chapter 11; John Wiley & Sons, Inc., pp. 523-628 (2002).

Kamigaito et al., Chem. Rev., 101, 3689 (2001).

Gao, H. and K. Matyjaszewski, "Low Polydispersity Star Polymers with Core Functionality by Cross-linking Macromonomers Using Functional ATRP Intiators," Macromolecules, 40, 399-401 (2007).

Gao et al., J. Am. Chem. Soc., Low Polydispersity Star Polymers via Cross-linking Macromonomers by ATRP, 128, 15111-15113 (2006).

Davis, K. A. and K. Matyjaszewski, "Statistical, Gradient, Block, and Graft Copolymers by Controlled/Living Radical Polymerizations," Adv. Polym. Sci., vol. 159 pp. 1-168 (2002).

Furukawa, T. and K. Ishizu, Journal of Colloid and Interface Science, 253(2), 465-469, (2002).

Matyjaszewski, K.,"Comparison and Classification of Controlled/Living Radical Polymerizations," American Chemical Society, publication date: Aug. 15, 2000, pp. 2-26, downloaded on Sep. 2, 2009, http://pubs.acs.org.

Le Droumaguet, B. and K. Velonia, "In Situ ATRP-Mediated Hierarchical Formation of Giant Amphiphile Bionanoreactors", Angew. Chem. Int. Ed., 2008, 47(33), pp. 6263-6266.

Tsarevsky et al., "Factors Determining the Performance of Copper-Based Atom Transfer Radical Polymerization Catalysts and Criteria for Rational Catalyst Selection", ACS Symposium Series, 2006, 944, pp. 56-70.

Duncan, R. and M. Vicent, "Do HPMA copolymer conjugates have a future as clinically useful nanomedicines? A critical overview of current status and fututre opportunities", Advanced Drug Delivery Reviews, 62, 2010, pp. 272-282.

Enoki et al., "Acid Denaturation and Refolding of Green Fluorescent Protein", Biochemistry, 2004, 43, pp. 14238-14248.

Arakawa et al., "Protein precipitation and denaturation by dimethyl sulfoxide", Biophysical Chemistry, 131, 2007, pp. 62-70.

Li et al., "Thermoresponsive Block Copolymer-Protein Conjugates Prepared by Grafting-from via RAFT Polymerization", Macromol. Rapid Commun., 2011, 32, pp. 354-359.

Li et al., "Thermoresponsive Block Copolymer-Protein Conjugates Prepared by Grafting-from via RAFT Polymerization" Supporting Information for Macromol. Rapid Commun., 2011, 32, pp. 354-359.

Lele et al., "Synthesis of Uniform Protein—Polymer Conjugates", Biomacromolecules, 2005, 6, pp. 3380-3389.

Peschke et al., "C-Terminally PEGylated hGH-derivatives", Bioorganic & Medicinal Chemistry, 15, 2007, pp. 4382-4395.

De Paoli et al., "New insights into the mechanism of activation of atom transfer radical polymerization by Cu(I) complexes", Chem. Commun., 2011, 47, pp. 3580-3582.

Pintauer et al., "Atom Transfer radical addition and polymerization reactions catalyzed by ppm amounts of copper complexes", Chem. Soc. Rev., 2008, 37, pp. 1087-1097.

Grover, G. and H. Maynard, "Protein-polymer conjugates: synthetic approaches by controlled radical polymerizations and interesting applications", Current Opinion in Chemical Biology, 2010, 14(6), pp. 818-827.

Peeler et al., "Genetically Encoded Initiator for Polymer Growth from Proteins", JACS Communications, 2010, 132, pp. 13575-13577.

Tang et al., "Understanding atom Transfer Radical Polymerization: Effect of Ligan and Initiator Structures on the Equilibrium Constants", J. Am. Chem. Soc., 2008, 130, pp. 10702-10713.

Bontempo, D. and H. Maynard, "Streptavidin as a Macroinitiator for Polymerization: in Situ Protein-Polymer Conjugate Formation", J. Am. Chem. Soc., 2005, 127, pp. 6508-6509.

Bontempo et al., "Cysteine-Reactive Polymers Synthesized by Atom Transfer Radical Polymerization for Conjugation to Proteins", J. Am. Chem. Soc., 2004, 126, pp. 15372-15373.

Abuchowski et al., "Alteration of Immunological Properties of Bovine Serum Albumin by Covalent Attachment of Polyethylene Glycol", The Journal of Biological Chemistry, 1977, 252, pp. 3578-3581.

Abuchowski et al., "Effect of Covalent Attachment of Polyethylene Glycol on Immunogenicity and Circulating Life of Bovine Liver Catalase", The Journal of Biological Chemistry, 1977, 252, pp. 3582-3586.

Duncan, Ruth, "The Dawning Era of Polymer Therapeutics", Nature Reviews, Drug Discovery, 2003, 2, pp. 347-360.

Tsarevsky et al., "Deactivation Efficiency and Degree of Control over Polymerization in ATRP in Protic Solvents", Macromolecules, 2004, 37, pp. 9768-9778.

Lutz et al., "Biocompatible, Thermoresponsive, and Biodegradable: Simple Preparation of "All-in-One" Biorelevant Polymers," Macromolecules, 2007, 40, pp. 8540-8543.

(56) References Cited

OTHER PUBLICATIONS

Braunecker et al., "Thermodynamic Components of the Atom Transfer Radical Polymerization Equilibrium: Quantifying Solvent Effects", Macromolecules, 2009, 42, pp. 6348-6360.
Bortolamei et al., "Thermodynamic Properties of Copper Complexes Used as Catalysts in Atom Transfer Radical Polymerization", Macromolecules, 2010, 43, pp. 9257-9267.
Al-Abboodi et al., "Three-Dimensional Nanocharacterization of Porous Hydrogel With Ion and Electron Beams", Biotechnology and Bioengineering, vol. 110, No. 1, Jan. 2013, pp. 318-326.
Mathur et al., "Methods for Synthesis of Hydrogel Networks: A Review", 1996, Journal of Macromolecular Science, Part C, 36:2, pp. 405-430.
Dimitrov et al., "Continuous Convective Assembling of Fine Particles into Two-Dimensional Arrays on Solid Surfaces", Langmuir, 1996, 12, pp. 1303-1311.
Salerno et al. "Pore Structure and Swelling Behavior of Porous Hydrogels Prepared via a Thermal Reverse-Casting Technique", Journal of Applied Polymer Science, 2011, vol. 122, pp. 3651-3660.
Simakova et al., "Aqueous ARGET ATRP", Macromolecules, 2012, 45, pp. 6371-6379.
Stein et al., "Morphological Control in Colloidal Crystal Templating of Inverse Opals, Hierarchical Structures, and Shaped Particles", Chem. Mater. 2008, 20, pp. 649-666.
Stein et al., "Colloidal crystal templating of three-dimensionally ordered macroporous solids: materials for photonics and beyond", Current Opinion in Solid State and Materials Science, 5 (2001) pp. 553-564.
Gates et al., "Fabrication and Characterization of Porous Membranes with Highly Ordered Three-Dimensional Periodic Structures", Chem. Mater., 1999, 11, pp. 2827-2836.
Lange et al., "Functional 3D photonic films from polymer beads", phys. stat. sol. (a) 204, No. 11, 2007, pp. 3618-3635.
Shu et al., "Rational Design of Affinity Ligand for the Oriented Immobilization of Trypsin", Acta Phys. Chim. Sin., 2013, 29 (2), pp. 439-448.
Hwang et al., "Fabrication of three-dimensional porous cell-laden hydrogel for tissue engineering", Biofabrication 2 (2010) 12 pages.
Chen et al., "Macroporous Hydrogel Scaffolds and Their Characterization by Optical Coherence Tomography", Tissue Engineering: Part C vol. 17, No. 1, 2011, pp. 101-112.
Seliktar, Dror, "Designing Cell-Compatible Hydrogels for Biomedical Applications", Science, 336, (2012), pp. 1124-1128.
Behravesh et al., "Evaluation of the in Vitro Degradation of Macroporous Hydrogels Using Gravimetry, Confined Compression Testing, and Microcomputed Tomography", Biomacromolecules, 2002, 3, 1263-1270.
Li et al., "Colloidal Assembly: The Road from Particles to Colloidal Molecules and Crystals", Angew. Chem. Int. Ed. 2011, 50, pp. 360-388.
Marlow et al., "Opals: Status and Prospects", Angew. Chem. Int. Ed. 2009, 48, pp. 6212-6233.
Meseguer et al., "Synthesis of inverse opals", Colloids and Surfaces A: Physicochemical and Engineering Aspects, 202 (2002) pp. 281-290.
Xu et al., "Facile Trypsin Immobilization in Polymeric Membranes for Rapid, Efficient Protein Digestion", Anal. Chem., 2010, 82, pp. 10045-10051.
Xu et al., "Facile Trypsin Immobilization in Polymeric Membranes for Rapid, Efficient Protein Digestion", Anal. Chem., 2010, 82, 10045-10051, Supporting Information, 17 pages.
Fudouzi et al., "Photonic Papers and Inks: Color Writing with Colorless Materials", Adv. Mater., 2003, 15, No. 11, pp. 892-896.
Hustoft et al., "A Critical Review of Trypsin Digestion for LC-MS Based Proteomics", Integrative Proteomics, http://www.intechopen.com/books/integrative-proteomics/a-critical-review-of-trypsin-digestion-for-lc-ms-basedproteomics, 2012, pp. 73-92.
Oxley et al., "Macroporous hydrogels for biomedical applications: methodology and morphology", Biomaterials, 1993, vol. 14, No. 14, pp. 1064-1072.
Savina, Irina, "Macroporous hydrogels by cryogelation: biomedical and environmental applications", abstract, School of Pharmacy and Biomolecular Sciences, University of Brighton, 2012, 1 page.
Savina et al., "Biomimetic Macroporous Hydrogels: Protein Ligand Distribution and Cell Response to the Ligand Architecture in the Scaffold", Journal of Biomaterials Science, 20 (2009), pp. 1781-1795.
Shepard et al., "Hydrogel macroporosity and the prolongation of transgene expression and the enhancement of angiogenesis", Biomaterials, 33 (2012) pp. 7412-7421.
Duan et al., "Versatile fabrication of arbitrarily shaped multi-membrane hydrogels suitable for biomedical applications", J. Mater. Chem. B, 2013, 1, pp. 485-492.
Kopeček, Jindřich, "Hydrogel biomaterials: A smart future?", Biomaterials, 28, 2007, pp. 5185-5192.
Lee et al., "Recent Progress in the Synthesis of Porous Carbon Materials", Adv. Mater. 2006, 18, pp. 2073-2094.
Ma et al., "Organic-Inorganic Hybrid Silica Monolith Based Immobilized Trypsin Reactor with High Enzymatic Activity", Anal. Chem., 2008, 80, pp. 2949-2956.
Ma et al., "Monolith-based immobilized enzyme reactors: Recent developments and applications for proteome analysis", J. Sep. Sci., 2007, 30, pp. 3050-3059.
Zhu et al., "Crystallization of hard-sphere colloids inmicrogravity", Nature, vol. 387, 26, Jun. 1997, pp. 883-885.
Pal et al., "Polymeric Hydrogels: Characterization and Biomedical Applications—A mini review", Designed Monomers and Polymers, 12, 2009, pp. 197-220.
Liu et al., "Hydrogels from Biopolymer Hybrid for Biomedical, Food, and Functional Food Applications", Polymers, 2012, 4, pp. 997-1011.
Woodcock, L.V., "Entropy difference between the face-centered cubic and hexagonal close-packed crystal structures", Nature, vol. 385, 9, Jan. 1997, pp. 141-143.
Dainiak et al., "Biomimetic Macroporous Hydrogel Scaffolds in a High-Throughput Screening Format for Cell-Based Assays", Biotechnol. Prog., 2008, 24, pp. 1373-1383.
Ford et al., "A macroporous hydrogel for the coculture of neural progenitor and endothelial cells to form functional vascular networks in vivo", PNAS, Feb. 21, 2006, vol. 103, No. 8, pp. 2512-2517.
Holgado et al., "Electrophoretic Deposition to Control Artificial Opal Growth", Langmuir, 1999, 15, pp. 4701-4704.
Kato et al., "Monolithic Bioreactor Immobilizing Trypsin for High-Throughput Analysis", Anal. Chem., 2005, 77, pp. 1813-1818.
Peppas et al., "Hydrogels in pharmaceutical formulations", European Journal of Pharmaceutics and Biopharmaceutics, 50, 2000, pp. 27-46.
Annabi et al., "Controlling the Porosity and Microarchitecture of Hydrogels for Tissue Engineering", Tissue Engineering: Part B, vol. 16, No. 4, 2010, pp. 371-383.
Davis et al., "Modular enzymatically crosslinked protein polymer hydrogels for in situ gelation", Biomaterials, 31, 2010, pp. 7288-7297.
Dziomkina et al., "Colloidal crystal assembly on topologically patterned templates", Soft Matter, 2005, 1, pp. 265-279.
Velev et al., "Structured Porous Materials via Colloidal Crystal Templating: From Inorganic Oxides to Metals", Adv. Mater., 2000, 12, No. 7, pp. 531-534.
Velev et al., "Colloidal crystals as templates for porous materials", Current Opinion in Colloid & Interface Science 5, 2000, pp. 56-63.
Jiang et al., "Single-Crystal Colloidal Multilayers of Controlled Thickness", Chem. Mater. 1999, 11, pp. 2132-2140.
Jiang et al., "Template-Directed Preparation of Macroporous Polymers with Oriented and Crystalline Arrays of Voids", J. Am. Chem. Soc., 1999, 121, pp. 11630-11637.
Schroden et al., "Hybrid macroporous materials for heavy metal ion adsorption", J. Mater. Chem., 2002, 12, pp. 3261-3267.
Pusey et al., "Structure of Crystals of Hard Colloidal Spheres", Physical Review Letters, Dec. 18, 1989, vol. 63, No. 25, pp. 2753-2756.

(56) References Cited

OTHER PUBLICATIONS

Zhao et al., "Horseradish Peroxidase Immobilized in Macroporous Hydrogel for Acrylamide Polymerization", Journal of Polymer Science: Part A: Polymer Chemistry, 2008, vol. 46, pp. 2222-2232.

Pernites et al., "Patterned Surfaces Combining Polymer Brushes and Conducting Polymer via Colloidal Template Electropolymerization", Adv. Mater., 2011, 23, pp. 1287-1292.

Schroden et al., "Optical Properties of Inverse Opal Photonic Crystals", Chem. Mater., 2002, 14, pp. 3305-3315.

Johnson et al., "Ordered Mesoporous Polymers of Tunable Pore Size from Colloidal Silica Templates", Science, vol. 283, Feb. 12, 1999, pp. 963-965.

Owen et al., "Design of three-dimensional biomimetic scaffolds", Journal of Biomedical Materials Research A, Sep. 15, 2010, vol. 94A, Issue 4, pp. 1321-1331.

Park et al., "Crystallization of Mesoscale Particles over Large Areas", Adv. Mater., 1998, 10, No. 13., pp. 1028-1032.

Park et al., "Macroporous Membranes with Highly Ordered and Three-Dimensionally Interconnected Spherical Pores", Adv. Mater. 1998, 10, No. 13, pp. 1045-1048.

Park et al., "Fabrication of Three-Dimensional Macroporous Membranes with Assemblies of Microspheres as Templates", Chem. Mater., 1998, 10, pp. 1745-1747.

Park et al., "Assembly of Mesoscale Particles over Large Areas and Its Application in Fabricating Tunable Optical Filters", Langmuir, 1999, 15, pp. 266-273.

Ronel et al., "Macroporous hydrogel membranes for a hybrid artificial pancreas. I. Synthesis and chamber fabrication", Journal of Biomedical Materials Research, vol. 17, 1983, pp. 855-864.

Hollister, Scott J., "Porous scaffold design for tissue engineering", Nature Materials, vol. 4, Jul. 2005, 518-524.

Gulrez et al., "Hydrogels: Methods of Preparation, Characterisation and Applications", Progress in Molecular and Environmental Bioengineering—From Analysis and Modeling to Technology Applications, Aug. 2011, pp. 117-150.

Keskar et al., "In Vitro Evaluation of Macroporous Hydrogels to Facilitate Stem Cell Infiltration, Growth, and Mineralization", Tissue Engineering, Part A vol. 15, No. 7, 2009, pp. 1695-1707.

Wu et al., "Design and Preparation of Porous Polymers", Chem. Rev., 2012, 112, pp. 3959-4015.

Wu et al., "A novel organic-inorganic hybrid monolith for trypsin immobilization", Sci China Life Sci, Jan. 2011, vol. 54, No. 1, pp. 54-59.

Zhao et al., "Templating methods for preparation of porous structures", J. Mater. Chem., 2006, 16, pp. 637-648.

Zhang et al., "Gaseous infiltration method for preparation of three-dimensionally ordered macroporous polyethylene", Polymer, 49, 2008, pp. 5446-5451.

Zhang et al., "Inverted-Colloidal-Crystal Hydrohel Matrices as Three-Dimensional Cell Scaffolds", Adv. Funct. Mater., 2005, 15, No. 5, pp. 725-731.

Chung-li et al., "Studies on the preparation and characterisation of monodisperse polystyrene latices", Progr. Colloid & Polymer Sci., 60, 1976, pp. 163-175.

Huang et al., "A novel immobilized cobalt(II)/copper(II) bimetallic catalyst for atom transfer radical polymerization (ATRP) of methyl methacrylate", Applied Catalysis A: General, vol. 332, Issue 2, Nov. 20, 2007, pp. 192-199.

Nasser-Eddine et al., "Copper removal in atom transfer polymerization through electrodeposition", Macromol. Mater. Eng., 2004, 289, pp. 204-207.

Coullerez et al., "Understanding Copper-Based Atom-Transfer Radical Polymerization in Aqueous Media", The Journal of Physical Chemistry A, Sep. 2, 2004, vol. 108, No. 35, pp. 7129-7131.

Hong et al., "An Immobilized/Soluble Hybrid Catalyst System for Atom Transfer Radical Polymerization", Macromolecules, 2001, vol. 34, No. 15, pp. 5099-5102.

Matyjaszewski, Krzysztof, "Mechanistic Aspects of Atom Transfer Radical Polymerization", ACS Symp. Ser., 1998, Chapter 16, 685, pp. 258-283.

Matyjaszewski, Krzysztof, "Bulk Atom Transfer Radical Polymerization", ACS Symp. Ser., 1998, Chapter 6, 713, pp. 96-112.

Matyjaszewski et al. "The Preparation of Wel-Defined Water Soluble-Swellable (Co)Polymers by Atom Transfer Radical Polymerization", ACS Symp. Ser., 2000, Chapter 4, 765, pp. 52-71.

Matyjaszewski, Krzysztof, "Controlled Radical Polymerization: State of the Art in 2008", ACS Symp. Ser., 2009, Chapter 1, 1023, pp. 3-13.

Konkolewicz et al, "Tuning Polymer Properties through Competitive Processes", ACS Symp. Ser. 2012, 1100, pp. 145-170.

Hansch et al., "A Survey of Hammett Substituent Constants and Resonance and Field Parameters", Chem. Rev. 1991, 91, pp. 165-195.

Tsarevsky et al., ""Green" Atom Transfer Radical Polymerization: From Process Design to Preparation of Well-Defined Environmentally Friendly Polymeric Materials", Chem. Rev. 2007, 107, pp. 2270-2299.

Xia et al., "Controlled/"Living" Radical Polymerization Atom Transfer Radical Polymerization of Acrylates at Ambient Temperature", Macromolecules, 1998, 31, pp. 5958-5959.

Xia et al., "Controlled/"Living" Radical Polymerization. Atom Transfer Radical Polymerization Catalyzed by Copper(I) and Picolylamine Complexes", Macromolecules, 1999, 32, pp. 2434-2437.

Braunecker et al., "Origin of Activity in Cu-, Ru-, and Os-Mediated Radical Polymerization", Macromolecules, 2007, 40, pp. 8576-8585.

Seeliger et al., "Temperature Effect on Activation Rate Constants in ATRP: New Mechanistic Insights into the Activation Process", Macromolecules, 2009, 42, pp. 6050-6055.

Magenau et al. "ATRP of Methacrylates Utilizing Cu"X2/L and Copper Wire", Macromolecules, 2010, 43, pp. 9682-9689.

Kwak et al., "ARGET ATRP of Methyl Acrylate with Inexpensive Ligands and ppm Concentrations of Catalyst", Macromolecules, 2011, 44, pp. 811-819.

Zhang et al., "Copper-Mediated CRP of Methyl Acrylate in the Presence of Metallic Copper: Effect of Ligand Structure on Reaction Kinetics", Macromolecules, 2012, 45, pp. 78-86.

Morick et al., "Activation—Deactivation Equilibrium of Atom Transfer Radical Polymerization of Styrene up to High Pressure", Macromol. Chem. Phys., 2011, 212, pp. 2423-2428.

di Lena et al., "Transition metal catalysts for controlled radical polymerization", Progress in Polymer Science, 35, 2010, pp. 959-1021.

Pintauer et al., "Atom Transfer Radical Polymerization (ATRP) and Addition (ATRA) and Applications", Encyclopedia of Radicals in Chemistry, Biology and Materials, 2012, 4, 1851-1894.

Malkov et al., "Synthesis of New Chiral 2,2'-Bipyridyl-Type Ligands, Their Coordination to Molybdenum(0), Copper(II), and Palladium(II), and Application in Asymmetric Allylic Substitution, Allylic Oxidation, and Cyclopropanation", Organometallics, 2001, 20, pp. 673-690.

Montalti et al., "Luminescent Ruthenium(II) Bipyridyl-Phosphonic Acid Complexes: pH Dependent Photophysical Behavior and Quenching with Divalent Metal Ions", Inorg. Chem., 2000, 39, pp. 76-84.

Nitadori et al., "Enhanced Photocatalytic Activity of α-Methylstyrene Oligomerization through Effective Metal-to-Ligand Charge-Transfer Localization on the Bridging Ligand", Inorg. Chem., 2012, 51, pp. 51-62.

Pintauer et al., "Structural aspects of copper catalyzed atom transfer radical polymerization", Coordination Chemistry Reviews, 249, 2005, pp. 1155-1184.

Ding et al., "Atom Transfer Radical Polymerization of N,N-Dimethylacrylamide", Macromol. Rapid Commun., 2004, 25, pp. 632-636.

Kickelbick et al., "Structural comparison of Cu" complexes in atom transfer radical polymerization", New J. Chem., 2002, 26, pp. 462-468.

Magenau et al., "Highly Active Bipyridine-Based Ligands for Atom Transfer Radical Polymerization", ACS Macro Lett., 2012, 1, pp. 508-512.

(56) References Cited

OTHER PUBLICATIONS

Schröder et al., "Substituted Tris(2-pyridylmethyl)amine Ligands for Highly Active ATRP Catalysts", ACS Macro Lett., 2012, 1, 1037-1040.
Abreu et al., "Inorganic Sulfites: Efficient Reducing Agents and Supplemental Activators for Atom Transfer Radical Polymerization", ACS Macro Lett., 2012, 1, pp. 1308-1311.
Eckenhoff et al., "Structural characterization and investigation of iron(III) complexes with nitrogen and phosphorus based ligands in atom transfer radical addition (ATRA)", Inorganica Chimica Acta, 382, 2012, pp. 84-95.
Matyjaszewski et al., "Diminishing catalyst concentration in atom transfer radical polymerization with reducing agents", PNAS, Oct. 17, 2006, vol. 103, No. 42, pp. 15309-15314.
Jakubowski et al. "Activators Regenerated by Electron Transfer for Atom-Transfer Radical Polymerization of (Meth)acrylates and Related Block Copolymers", Angew. Chem., 2006, 118, pp. 4594-4598.
Yasuda, et al., "Stereospecific Polymerization of Acetaldehyde by $R_2AlOR'$ Catalyst," Journal of Polymer Science, vol. 11, 1973, pp. 1421-1434.
Poli, et al., "Iron-mediated reversible deactivation controlled radical polymerization," Progress in Polymer Science 39 (2014), pp. 1827-1845.
Saikia, et al., "Reverse Atom Transfer Radical Polymerization of Stearyl Methacrylate Using 2,2'-Azobisisobutyronitrile as the Initiator,"Journal of Applied Polymer Science, vol. 85 (2002), pp. 1236-1245.
Stoffelbach et al., "Half-sandwich molybdenum(iii) compounds containing diazadiene ligands and their use in the controlled radical polymerization of styrene." Journal of Organometallic Chemistry 663 (2002) 269-276, (2002), p. 270, col. 2.
Park, Sangwoo, et al., "Simplified Electrochemically Mediated Atom Transfer Radical Polymerization using a Sacrificial Anode," Angew. Chem. Int. Ed, 2015, 54, pp. 2388-2392.
Park, Sangwoo, et al., "Star Synthesis Using Macroinitiators via Electrochemically Mediated Atom Transfer Radical Polymerization," Macromolecules, 2013, 46, pp. 5856-5860.
Samal, Seetanshu K., et al., "Electroinitiated Polymerization of Acrylamide in Acetonitrile Medium," Journal of Polymer Science: Part A: Polymer Chemistry, vol. 26, 1988, pp. 1035-1049.
Magenau, Andrew J., et al., "Investigation of Electrochemically Mediated Atom Transfer Radical Polymerization," Macromolecules, 2013, 46, pp. 4346-4353.
Chmielarz, Pawel, et al., "PEO-b-PNIPAM copolymers via SARA ARTP and eATRP in Aqueous Media," Polymer, 71, 2015, pp. 143-147.
Bonometti, Valentina, et al., "Exploring the first steps of an electrochemically-triggered controlled polymerization sequence: Activation of alkyl- and benzyl halide initiators by an electrogenerated $Fe^I_{II}$Salen complex," Journal of Electroanalytical Chemistry 633 (2009) pp. 99-105.
Bortolamei, Nicola, et al., "Controlled Aqueous Atom Transfer Radical Polymerization with Electrochemical Generation of the Active Catalyst," Angew. Chem. Int. Ed., 2011, 50, pp. 11391-11394.
Magenau, Andrew J., et al., "Electrochemically Mediated Atom Transfer Radical Polymerization," Science, vol. 332, Apr. 1, 2011, pp. 81-84.
Fischer, Hanns, et al., "The Persistent Radical Effect in "Living" Radical Polymerization," Macromolecules 1997, 30, pp. 5666-5672.
Haddleton, David M., et al., "Atom Transfer Polymerization of Poly(Ethylene Glycol) Methyl Ether Methacrylate Macromonomer," Polymer Preprints, 2000, 41(1), pp. 415-416.
Abreu C. M. R. et. al.; Polymer Chemistry 2013, 4, 5629-5636.
Alsubaie, F. et. al.; Polym. Chem. 2015 6, 406-417.
Anastasaki, A.; et. al.; Macromol Rapid Comm 2014, 35 (10), 965-970.
C. Andrieux et. al., J. Electroanal. Chem. 1978, 87, 39-53.
C. Andrieux et. al., J. Electroanal. Chem. 1978, 87, 55-65.
C. Andrieux et. al., J. Electroanal. Chem. 1980, 113, 19-40.
Bell C. A. et. al.; "A Rapid Electrochemical Method for Determining Rate Coefficients for Copper-Catalyzed Polymerizations," J. Am. Chem. Soc., 2011, 133 11944-47.
Buback, M. et. al.; "Pressure dependence of propagation rate coefficients in freeradical homopolymerizations of methyl acrylate and dodecyl acrylate," Macromol. Chem. Phys. 1998, 199, 1721-1727.
Buback, M. et. al.; "Termination Kinetics of Methyl Acrylate and Dodecyl Acrylate Free-Radical Homopolymerizations up to High Pressure," Macromol. Chem. Phys. 2002, 203, pp. 1065-1070.
Fisher H. et al., "Factors Controlling the Addition of Carbon-Centered Radicals to Alkenes—An Experimental and Theoretical Perspective," Angew. Chem. Int. Ed. 2001, 40, 1340-1371.
Golub G. et.al.; "The effect of N-methylation of tetra-aza-alkane copper complexes on the axial binding of anions," Inorg. Chim. Acta 1997, 255, 111-115.
Harrisson, S.; et al., "Comproportionation versus Disproportionation in the Initiation Step of Cu(0)-Mediated Living Radical Polymerization," Macromolecules 2012, 45, 7388-7396.
Henderson, et al., "Ionic Effects on the Behavior of Thermoresponsive PEO—PNIPAAm Block Copolymers," J Polym Sci Polym. Phys 2014, 52 (7), 507-516.
Kim K. H.; et al.; "Preparation of hydrogel nanoparticles by atom transfer radical polymerization of N-isopropylacrylamide in aqueous media using PEG macro-initiator," Polymer 2005, 46 (9), 2836-2840.
Konkolewicz, D.; et al.; "Aqueous RDRP in the Presence of $Cu^0$: The Exceptional Activity of $Cu^I$ Confirms the Sara ATRP Mechanism," Macromolecules 2014, 47 (2), 560-570.
Konkolewicz, D.; et. al.; "Visible Light and Sunlight Photoinduced ATRP with ppm of Cu Catalyst," ACS Macro Lett. 2012, 1, 1219-1223.
Konkolewicz, D.; et. al.; "ICAR ATRP with ppm Cu Catalyst in Water," Macromolecules 2012, 45, 4461-4468.
Millard, et al.; "Controlling the Fast ARTP of N-Isopropylacrylamide in Water," ACS Symposium Series 2009, 1023, 127-137.
Matyjaszewski, K.; "Atom Transfer Radical Polymerization (ATRP): Current Status and Future Perspectives," Macromolecules. 2012, 45 (10), 4015-4039.
Miyake et. al., "Perylene as an Organic Photocatalyst for the Radical Polymerization of Functionalized Vinyl Monomers through Oxidative Quenching with Alkyl Bromides and Visible Light," Macromolecules 2014, 47, 8255-8261.
Nguyen. et. al.; The Effect of Ligand on the Rate of Propagation of Cu(0)-Wire Catalyzed SET-LRP of MA in DMSO at 25°C, Polym. Sci., Part A: Polym. Chem. 2009, 47, 5629-5638.
Nguyen. et. al.; "SET-LRP of N,N-Dimethylacrylamide and of N-Isopropylacrylamide at 25°C in Protic and in Dipolar Aprotic Solvents," J Polym Sci Polym. Chem 2010, 48 (8), 1752-1763.
Nicholson R. S., "Theory and Application of Cyclic Voltammetry for Measurement of Electrode Reaction Kinetics," Anal. Chem. 1965, vol. 37, 1351-1355.
Onsager, L., "Reciprocal Relations in Irreversible Processes," Phys. Rev. 1931, vol. 37, 405-426.
Peng, C-H.; et al.; "Reversible-Deactivation Radical Polymerization in the Presence of Metallic Copper. Activation of Alkyl Halides by $Cu^0$," Macromolecules 2013, 46, 3803-3815.
Percec, et al.; "Ultrafast Synthesis of Ultrahigh Molar Mass Polymers by Metal-Catalyzed Living Radical Polymerization of Acrylates, Methacrylates, and Vinyl Chloride Mediated by SET at 25°C," J. Am. Chem. Soc. 2006, 128, 14156-14165.
Treat, Nicolas J., et. al., "Metal-Free Atom Transfer Radical Polymerization," J. Am. Chem. Soc. 2014, 136, 16096-16101.
Waldron C et al.; "Absolut "copper catalyzation perfected"; robust living polymerization of NIPAM: Guinness is good for SET-LRP," Polym. Chem. 2014, 5(1): 57-61.
Wang, Yu et. al.; "Reversible-Deactivation Radical Polymerization in the Presence of Metallic Copper. Comproportionation—Disproportionation Equilibria and Kinetics," Macromolecules 2013, 46, 3793-3802.

(56) References Cited

OTHER PUBLICATIONS

Wei H. et al.; "One-pot ATRP synthesis of a triple hydrophilic block copolymer with dual LCSTs and its thermo-induced association behavior," Soft Matter 2012, 8 (37), 9526-9528.

Wever, et. al., "Polymers for enhanced oil recovery: A paradigm for structure—property relationship in aqueous solution," Prog. Polym. Sci. 2011, 36 (11), 1558-1628.

Williams, et. al., "A Silver Bullet: Elemental Silver as an Efficient Reducing Agent for Atom Transfer Radical Polymerization of Acrylates," *J. Am. Chem. Soc.* 2015, 137, 1428-1431.

Zhang,et al., "Copper-mediated controlled radical polymerization under biological conditions: SET-LRP in blood serum," Chem. Commun. 2013, 49, 6608-6610.

Zhang, et al. "Aqueous Copper-Mediated Living Polymerization: Exploiting Rapid Disproportionation of CuBr with $Me_6TREN$," *J. Am. Chem. Soc.* 2013, 135, 7355-7363.

Zhong, et. al., "Reversible-Deactivation Radical Polymerization in the Presence of Metallic Copper. Kinetic Simulation," *Macromolecules*, 2013, 46, 3816-3827.

Averick, et al., ATRP under Biologically Relevant Conditions: Frafting from a Protein,: *ACS Macro Lett.* 2012, 1, 6-10.

*The chemistry of free radical polymerization*; 2nd Ed. ed.; Elsevier: Amsterdam, 2006 (book not attached).

He, et al., "Three-Dimensionally Ordered Macroporous PolymericnMaterials by Colloidal Crystal Templating for Reversible C02 Capture." Advanced Functional Materials 23(37): 4720-4728, Oct. 2013.

Pal, et al., "Preparation and Characterization of Polyvinyl Alcohol—Gelatin Hydrogel Membranes for Biomedical Applications," AAPS PharmSciTech 2007;8(1): Article 21; E1-E5.

Davis, et al., "Disorder-to-Order Transition in Settling Suspensions of Colloidal Silica: X-ray Measurements," Science 1989, vol. 245, 507-510.

Zhao, et al., Templating Methods for Preparation of Porous Structures, J. Materials Chemistry, 2006;16: 637-648.

Xia, et al., "Monodispersed Colloidal Spheres: Old Materials with New Applications," Adv. Mater. 2000; 12(10): 693-713.

Yue, et al., "Preparation and Characterization of Nanostructured and High Transparent Hydrogel Films with pH Sensitivity and Application," Journal of Applied Polymer Science 2009;112(4):2261-2269.

Hearnden, et al., "New developments and opportunities in oral mucosal drug delivery for local and systemic disease," Advanced Drug Delivery Reviews 2012; 64: 18-23.

Hongkun He, et al., "Multifunctional Hydrogels with Reversible 3D Ordered Macroporous Structures," Advanced Science, 2015, 2, pp. 1-6.

Hongkun He, et al., "Multifunctional Hydrogels with Reversible 3D Ordered Macroporous Structures," Supporting Information for Advanced Science, 2015, 2, pp. S1-S37 (38 pages).

Coca, S., et al., "Block Copolymers by Transformation of "Living" Carbocationic into "Living" Radical Polymerization. II. ABA-Type Block Copolymers Comprising Rubbery Polyisobutene Middle Segment," J. Polym. Sci., Part A: Polym. Chem. 1997, 35, 3595-3601.

Coca S., et al., "Block Copolymers by Transformation of "Living" Carbocationic into "Living" Radical Polymerization," American Chemical Society, Macromolecules, vol. 30, No. 9,1997, pp. 2808-2810.

Matyjaszewski, K., Y. Nakagawa, et al. (1998). "Polymerization of n-butyl acrylate by atom transfer radical polymerization. Remarkable effect of ethylene carbonate and other solvents." Macromolecules 31(5): 1535-1541.

Coca S., et al., "Block Copolymers by Transformation of Living Carbocationic into Living Radical Polymerization," Polymer Preprints, American Chemical Society, Macromolecules, vol. 38, No. 1,1997, pp. 693-694.

Zapata-Gonzalez, "Mathematical Modeling of the Full Molecular Weight Distribution in ATRP Techniques," AlChE Journal, vol. 62, No. 8, Aug. 2016, pp. 2762-2777.

Fantin, et al., "ATRP in Water: Kinetic Analysis of Active and Super-Active Catalysts for Enhanced Polymerization Control," ACS Publications, Macromol 2017, 50, 2696-2705.

Fantin, et al., "Understanding the Fundamentals of Aqueous ATRP and Defining Conditions for Better Control," ACS Publications, Macromol 2015, 48 6862-6875.

Konkolewicz et al, "SARA ATRP or SET-LRP. End of controversy?", Polym. Chem., 2014, 5, 4396-4417.

\* cited by examiner

AQUEOUS ATRP IN THE PRESENCE OF AN ACTIVATOR REGENERATOR

CROSS-REFERENCE TO RELATED APPLICATIONS

This application claims benefit of and priority to U.S. Provisional Application Ser. No. 62/125,080 filed Jan. 12, 2015, U.S. Provisional Application Ser. No. 62/125,276 filed Jan. 16, 2015, and U.S. Provisional Application Ser. No. 62/230,167, filed May 29, 2015, the disclosures of which are incorporated by this reference.

STATEMENT REGARDING FEDERALLY SPONSORED RESEARCH OR DEVELOPMENT

This invention was made with government support under CHE-1026060, CHE-1039870, and CHE-1400052 awarded by the National Science Foundation. The government has certain rights in the invention.

BACKGROUND OF THE TECHNOLOGY

Field of the Technology

An atom or group transfer radical polymerization process conducted in aqueous media in the presence of a low concentration of soluble transition metal catalyst wherein a well-controlled polymerization is augmented by the addition, or in situ formation, of an activator regenerator.

Description of the Background of the Technology

Since its discovery atom transfer radical polymerization (ATRP) has gained increasing attention because ATRP couples the advantages afforded by conventional free radical polymerization (RP) to (co)polymerize a wide range of monomers using various commercially viable processes, including bulk, solution and various bi-phasic processes, with the ability to synthesize polymeric materials with predetermined molecular weight (MW), low polydispersity (PDI), controlled composition, site specific functionality, selected chain topology and selectively incorporate bio- or inorganic species into the final product. ATRP employs a rapid and reversible catalytic activation of alkyl (pseudo) halides by a soluble metal complex in a low oxidation state, exemplified herein, but not limited to the most frequently employed transition metal $Cu^I$, to generate radicals and the transition metal complex in a higher oxidation state, $Cu^{II}$, which rapidly acts to deactivate the growing (co)polymer chain.

Matyjaszewski and coworkers disclosed the fundamental four component ATRP process comprising the addition, or in situ formation, of an initiator, in this case a molecule with a transferable atom or group that is completely incorporated into the final product, a transition metal and a ligand that form, a (partially) soluble transition metal complex that participates in a reversible redox reaction with the added initiator or a dormant polymer to form the active species to (co)polymerize radically polymerizable monomers. The basic ATRP procedure and a number of improvements to the basic ATRP process have been disclosed in a number of commonly assigned patents and patent applications: U.S. Pat. Nos. 5,763,546; 5,807,937; 5,789,487; 5,945,491; 6,111,022; 6,121,371; 6,124,411; 6,162,882; 6,624,262; 6,407,187; 6,512,060; 6,538,091; 6,541,580; 6,624,262; 6,627,314; 6,759,491; 6,790,919; 6,887,962; 7,019,082; 7,049,373; 7,064,166; 7,125,938; 7,157,530; 7,332,550; 7,407,995; 7,572,874; 7,678,869; 7,795,355; 7,825,199; 7,893,173; 7,893,174; 8,252,880; 8,273,823; 8,349,410; 8,367,051; 8,404,788; 8,445,610; U.S. Ser. Nos. 12/451,575; 12/921,296, 13/260,504; 13/390,470; 13/734,747; 13/993,521, 14/065,370; 14/239,181, 14/373,553 and 14/379,418 all of which are herein incorporated by reference in their entirety to provide background and definitions for the present disclosure.

ATRP has also been discussed in numerous publications with Matyjaszewski as co-author and reviewed in several book chapters. [Matyjaszewski, K. et al. *ACS Symp. Ser.* 1998, 685, 258-283; *ACS Symp. Ser.* 1998, 713, 96-112; *ACS Symp. Ser.* 2000, 729, 270-283; *ACS Symp. Ser.* 2000, 765, 52-71; *ACS Symp. Ser.* 2000, 768, 2-26; *ACS Symposium Series* 2003, 854, 2-9; *ACS Symp. Ser.* 2009, 1023, 3-13; *ACS Symp. Ser.* 2012, 1100, 1, and *Chem. Rev.* 2001, 101, 2921-2990; Progress in Polymer Science 2007, 32(1): 93-146.] These publications are incorporated by reference to provide information on the range of suitable transition metals that can participate in the redox reaction and suitable ligands for the different transition metals to form transition metal complexes suitable for polymerizing broad range of exemplified polymerizable (co)monomers. The generally accepted mechanism of an ATRP reaction is shown in Scheme 1.

Scheme 1. General mechanism for the ATRP process

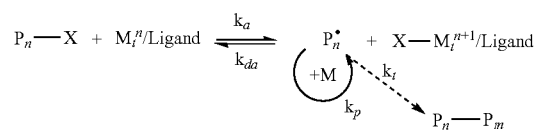

ATRP is the most efficient reversible deactivation radical polymerization (RDRP) method for the preparation of pure segmented copolymers, since generally, unlike RAFT, [Moad, G.; Rizzardo, E.; Thang, S. H. *Australian Journal of Chemistry* 2012, 65, 985-1076.] ATRP does not require addition of a radical initiator to continuously form new polymer chains that do not contain the desired α-functional group in a grafting from/chain extension reaction and unlike NMP [Hawker, C. J.; Bosman, A. W.; Harth, E. *Chemical Reviews* 2001, 101, 3661-3688.] does not require high temperatures to generate the active species by thermally induced homolytic cleavage of the dormant chain end.

ATRP allows the synthesis of novel telechelic multi-segmented copolymers with one or more segments displaying a predetermined degree of polymerization, narrow molecular weight distribution (low $M_w/M$), incorporating a wide range of functional monomers and displaying controllable macromolecular structures under mild reaction conditions. ATRP generally requires addition or formation of an alkyl halide or (pseudo)halide as an initiator (R—X) or dormant polymer chain end ($P_n$-X), and a (partially) soluble transition metal complex (Cu, Fe or Ru, for example) capable of undergoing a one electron redox reaction as a catalyst.

In many cases ATRP has been implemented in non-polar solvents such as anisole, however, more polar solvents such as dimethyl sulfoxide (DMSO) and dimethyl formamide (DMF) increase the activity of an ATRP system. An interesting case is water, which is a very polar reaction medium, and dramatically increases the activity of a $Cu^I$ complex in an ATRP.

Indeed an ATRP with high concentrations of $Cu^{II}/L$ and added $Cu^0$ in the presence of $Me_6TREN$ was first described in U.S. Pat. No. 6,541,580 as was the effect of adding polar solvents. The first aqueous ATRP was performed in 1998, and since then homogeneous and heterogeneous aqueous media have been continuously investigated since the procedures are environmentally benign, and useful for biological applications. While ATRP has been conducted in water the presence of water also presents many challenges, including the very high activity of the $Cu^I/L$ complex, which can lead to a very high radical concentrations and fast radical-radical termination reactions. [Matyjaszewski et. al.; *Macromol.* 2009, 42, 6348-6360, *Angew. Chem.* 2011, 50, 11391-11394, and *ACS Macro Lett.* 2012, 1, 6-10.] Additional challenges in water include dissociation of the halide from the X—$Cu^{II}/L$ deactivator complex, leading to a free halide anion and a $Cu^{II}/L$ complex which cannot deactivate radicals, as well as decomplexation and disproportionation of the $Cu^I/L$ complex. [*Macromol.* 2004, 37, 9768-9778 and 2012, 45, 4461-4468.]

These challenges have made conducting an aqueous Cu mediated polymerization with parts per million ((ppm), expressed as molar ratio of soluble catalyst complex to monomer not to the total volume of the reaction medium) catalyst loadings a continuing challenge.

Recent studies have demonstrated that, when the reaction is conducted in media less polar than water, concentrations of Cu as low as ca. 10 ppm can lead to well-controlled polymerizations. This was accomplished when an excess of halide salt was added to stabilize the $Cu^{II}$ deactivator complex allowing continuous regeneration of the $Cu^I$ activators and when ligands such as tris(pyridylmethyl)amine (TPMA), which form stable non-disproportionating $Cu^I$ complexes, were used and the regeneration of $Cu^I$ activators from $Cu^{II}$ formed by termination events was achieved using free radical initiators in initiators for continuous activator regeneration (ICAR) ATRP, or using a reducing agent through activators regenerated by electron transfer (ARGET) ATRP, or photochemically. [Matyjaszewski, K. Et. Al. *Macromol.* 2012, 45, 4461-4468; *Macromol.* 2012, 45, 6371-6379 and *ACS Macro Lett.* 2012, 1, 1219-1223]

In addition recent work has also demonstrated that very well-controlled polymerizations can be conducted in water, using the Cu complexes with tris[2-(dimethylamino)ethyl] amine ($Me_6TREN$) that is thermodynamically driven to undergo disproportionation in water. This was illustrated when a series of polymerizations were conducted in the presence of ca. 10,000 ppm of a preformed mixture of $Cu^0$ and $Cu^{II}$ formed by pre-polymerization disproportionation of the added $Cu^I/Me_6TREN$ transition metal complex in pure water. [*Chem. Commun.* 2013, 49, 6608-610; *J. Am. Chem. Soc.* 2013, 135, 7355-7363; *Polym. Chem.* 2014, 5(1): 57-61; and *Polym. Chem.* 2015 6, 406-417.] Such high levels of catalyst are undesirable in industry because of the initial cost of the added catalyst complex and the additional cost of removal of the copper catalyst from the final copolymer product. [US Patent Application, 20130197175]

Abbreviations

ATRP atom transfer radical polymerization
ARGET ATRP activators regenerated by electron transfer
eATRP electrochemically mediated ATRP
ICAR ATRP initiators for continuous activator regeneration
SARA ATRP supplemental activator and reducing agent
photoATRP photochemically activated ATRP
NMP nitroxide mediated polymerization
RAFT reversible addition fragmentation transfer
RDRP reversible deactivation radical polymerization
RP conventional free radical polymerization
DMF dimethyl formamide
DMSO dimethylsulfoxide
HEBiB 2-hydroxyethyl α-bromoisobutyrate
OEOA Oligo(ethylene oxide) monomethyl ether acrylate
OEOBrP oligo(ethylene oxide) 2-bromopropionate
$Me_6TREN$ tris(2-(dimethylamino)ethyl)amine
TPMA tris(pyridylmethyl)amine
MW molecular weight
MWD molecular weight distribution
PDI polydispersity index
NIPAM N-isopropylacrylamide
PEO poly(ethylene oxide)
UV-Vis-NIR UV-Visible Near Infra Red Spectroscopy
UV-VIS UV-Visible Spectroscopy

SUMMARY

According to a non-limiting aspect of the present disclosure, a process for polymerizing radically (co)polymerizable monomers at a temperature in a range of −10° C. to 110° C., or optionally between 0° and 100° C., in the presence of an aqueous system is disclosed. The aqueous system may comprise one or more radically (co)polymerizable monomer(s), a molar excess of a ligand that forms a soluble transition metal complex with an added transition metal salt that participates in a reversible reduction-oxidation cycle with at least one of an added site specific functional initiator a dormant polymer chain having a radically transferable atom or group. The concentration of the initial soluble catalyst complex in the higher oxidation state is less than or equal to 2500 ppm, or less than 1000 ppm or less than 600 ppm and the reaction is conducted in the presence of an activator regenerator. The mole fraction of the soluble transition metal in a lower activator oxidation state, formed by in situ reduction by action of the activator regenerator, to transition metal in a higher, deactivator oxidation state is less than 10%, and the formed polymer chains have a dispersity, or Mw/Mn, of less than 1.5.

An activator regenerator, according to a non-limiting aspect of the present disclosure is a solid transition metal in the zero oxidation state. The activator regenerator may be an electrochemical procedure or a photochemical procedure.

The aqueous solution of added soluble organic solvent and monomer, according to a non-limiting aspect of the present disclosure comprises greater than 50% by weight water.

The transition metal salt forming the catalyst complex, according to a non-limiting aspect of the present disclosure is one or more of copper or iron and solid transition metal of claim 1 is one or more of copper, iron, or silver and the reaction is conducted in the presence of an excess of a salt with a (pseudo)halide counterion.

According to a non-limiting aspect of the present disclosure, the added salt has the same counterion as the added or in situ formed transition metal complex. According to another non-limiting aspect of the present disclosure the added salt has a different counterion to that initially present on the added or in situ formed transition metal complex thereby allowing a halogen exchange reaction to occur when the initial added initiator is a (macro)initiator.

According to non-limiting aspects of the present disclosure, the mole fraction of the formed transition metal complex in a lower, activator oxidation state ($Mt^n$) to transition metal complex in a higher, deactivator oxidation state ($Mt^{n+}$) is less than 5% or is less than 2%.

For a non-limiting aspect of the present disclosure the molar ratio of the added ligand to optionally initially added transition metal salt is greater than 1:2

Another non-limiting aspect of the present disclosure includes a controlled ATRP process in aqueous media conducted with the optional addition of ppm levels of a transition metal salt in the presence of a salt comprising a (pseudo) halide counterion, ligand, and one or more pieces of a zero-valent transition metal in contact with the reaction medium as a readily removable solid.

In non-limiting embodiments, the concentration of initial soluble catalyst complex is less than 600 ppm, less than 250 ppm or less than 100 ppm. The aqueous solution of organic solvent and monomer may comprise greater than 75% by weight water. The transition metal complex comprises one or more of copper and iron. The temperature may be in a range of 0° C. to 50° C.

It is understood that the invention disclosed and described in this specification is not limited to the embodiments summarized in this Summary.

BRIEF DESCRIPTION OF THE DRAWINGS

Various features and characteristics of the non-limiting and non-exhaustive embodiments disclosed and described in this specification may be better understood by reference to the accompanying figures, in which.

Figure 3:
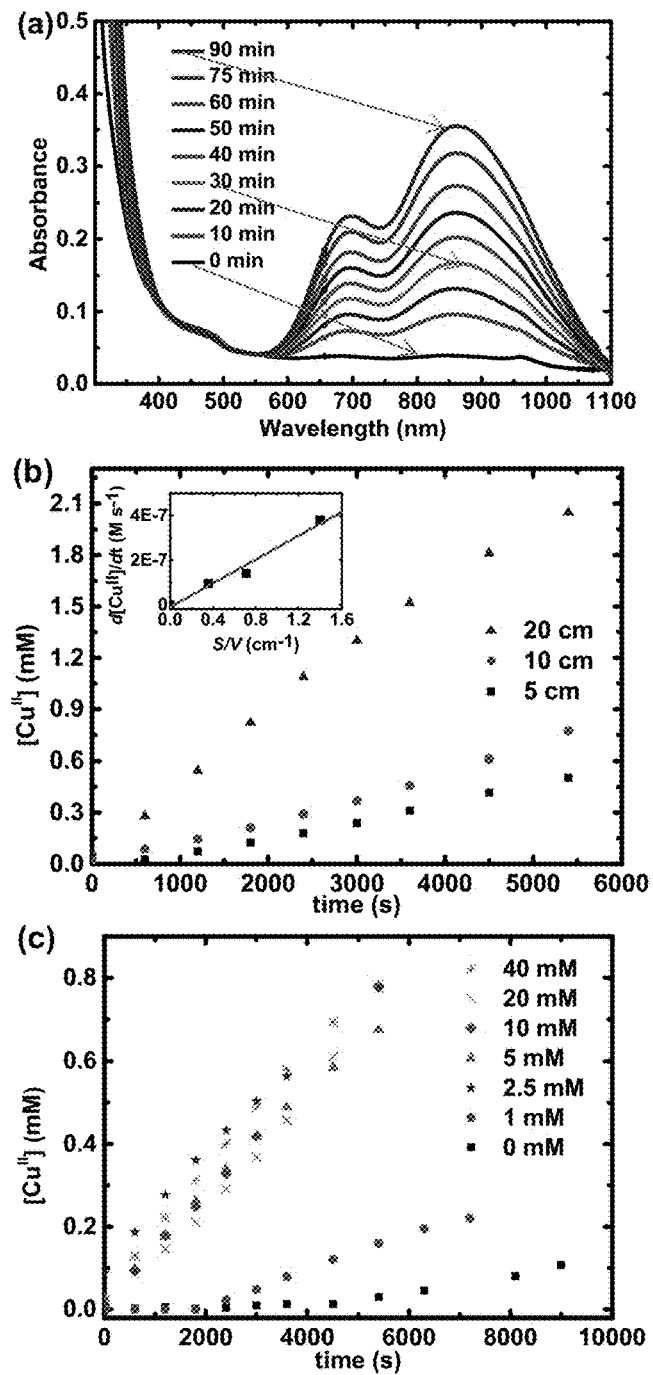
FIG. 3:(a) Evolution of UV-Vis-NIR spectra in an activation experiment under the conditions: $[OEOBrP]_0=20$ mM $[Me_6TREN]_0=40$ mM, 18 wt % OEOA in water, 10 cm $Cu^0$ wire (d=1 mm) in V=4.5 mL at 22° C.
Figure 4:
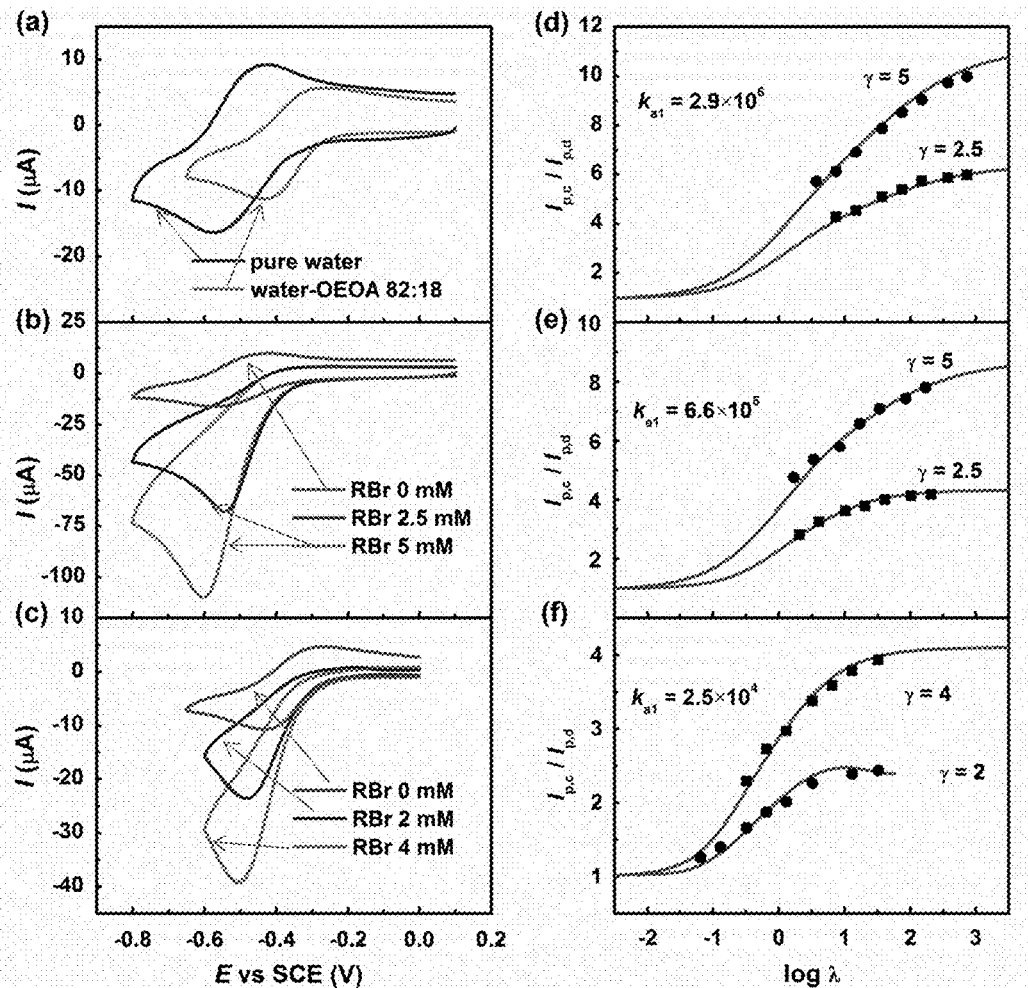
Figure 5:
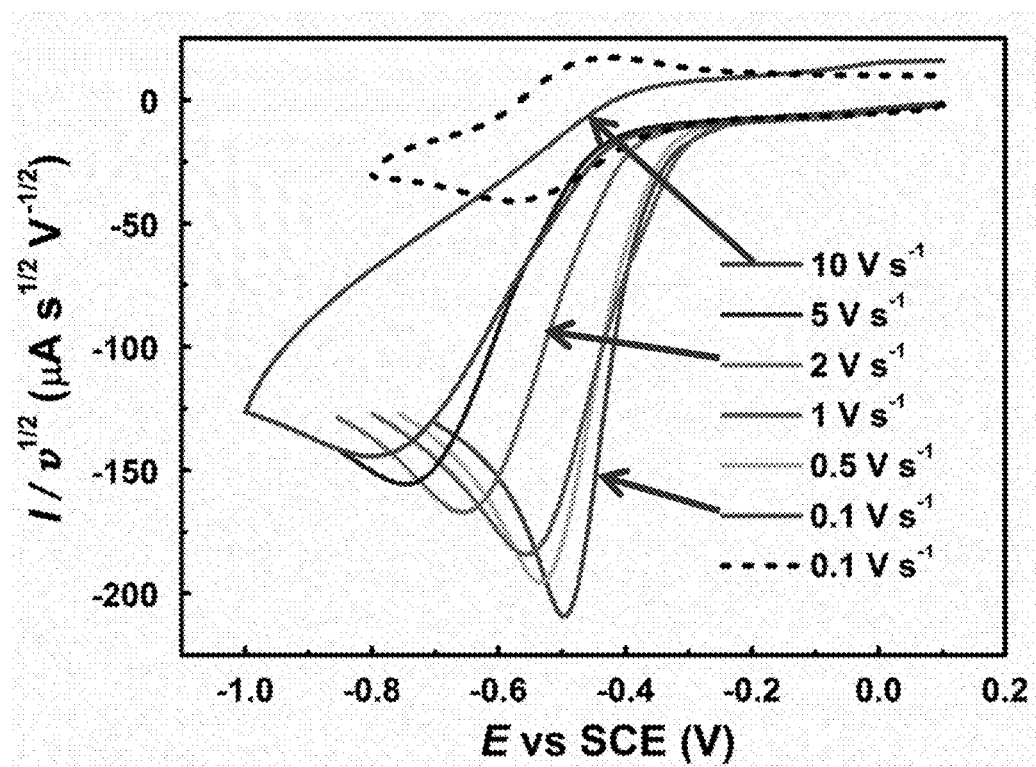
Figure 6:
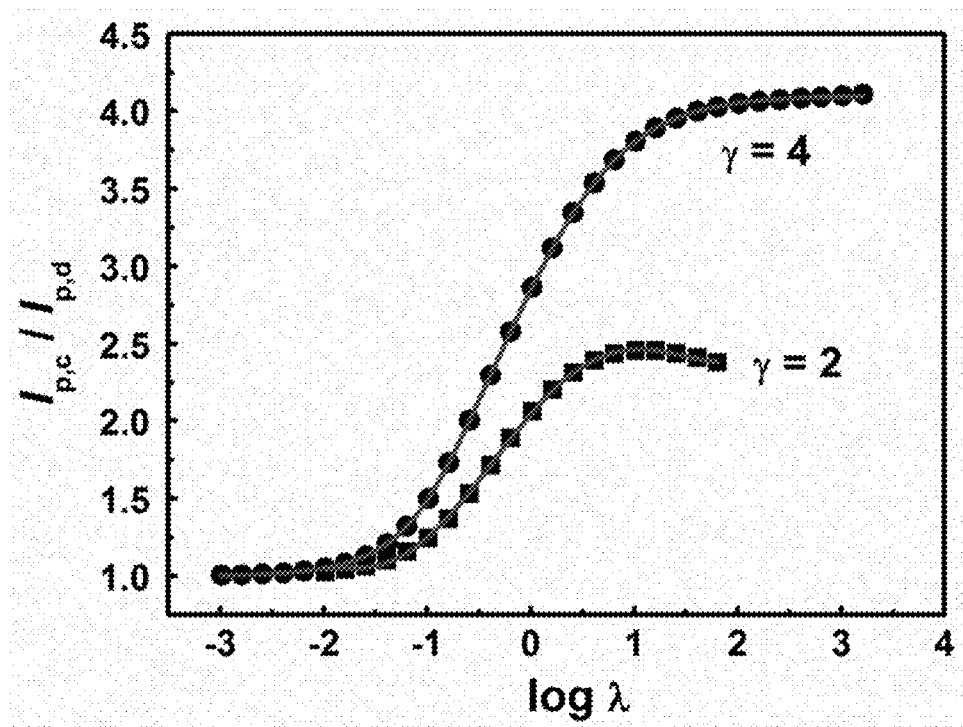
Figure 7:
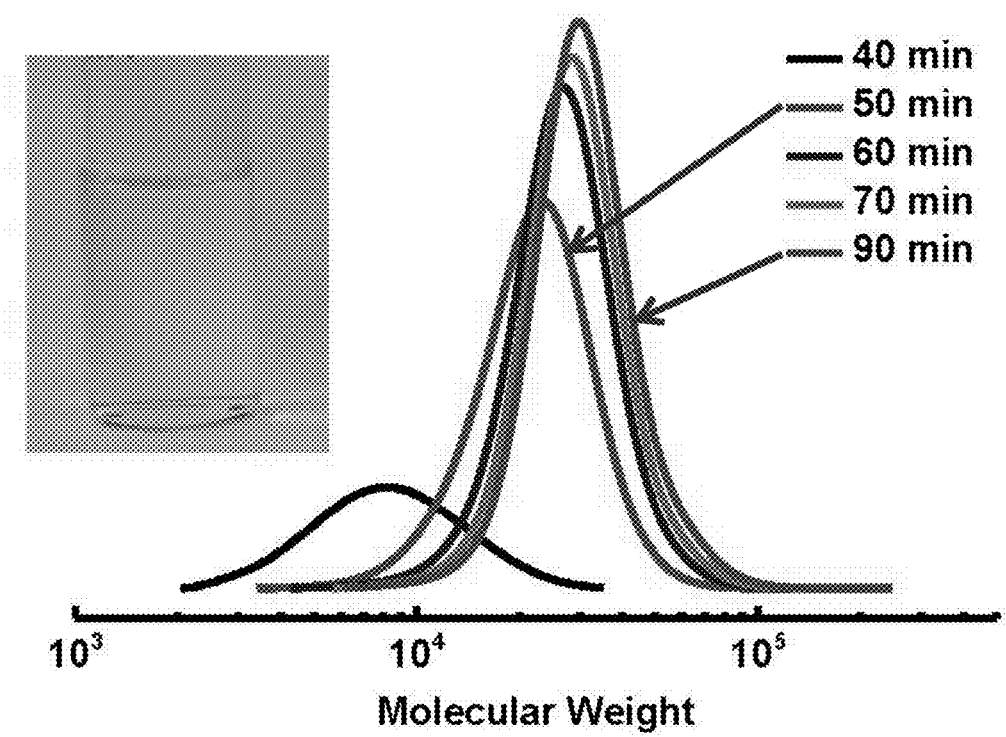
Figure 8:
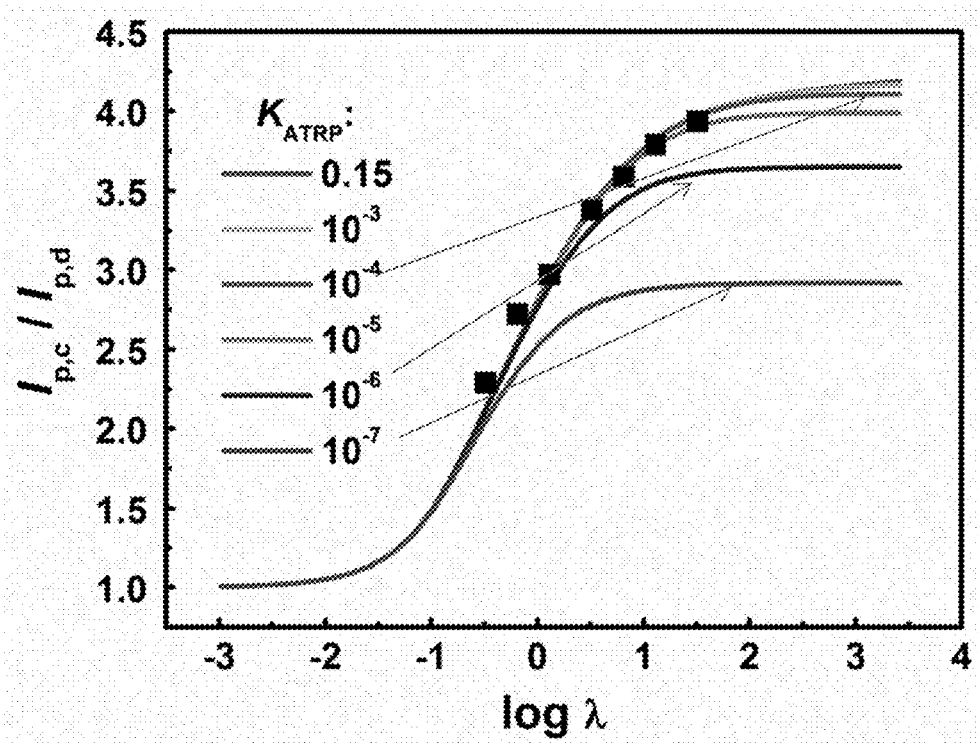
Figure 9:
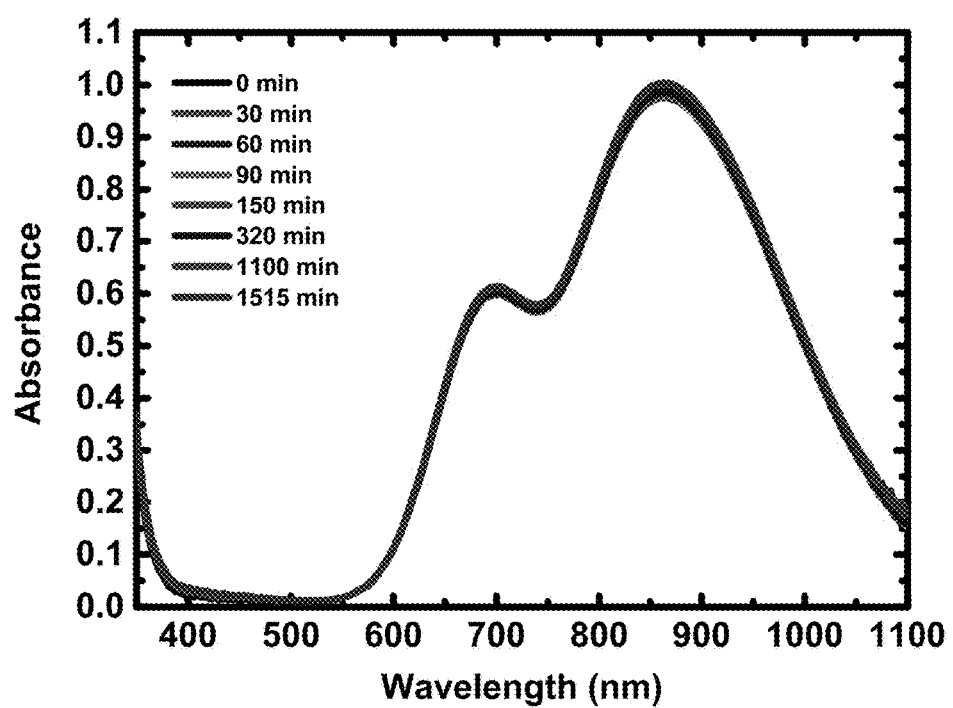
Figure 10:
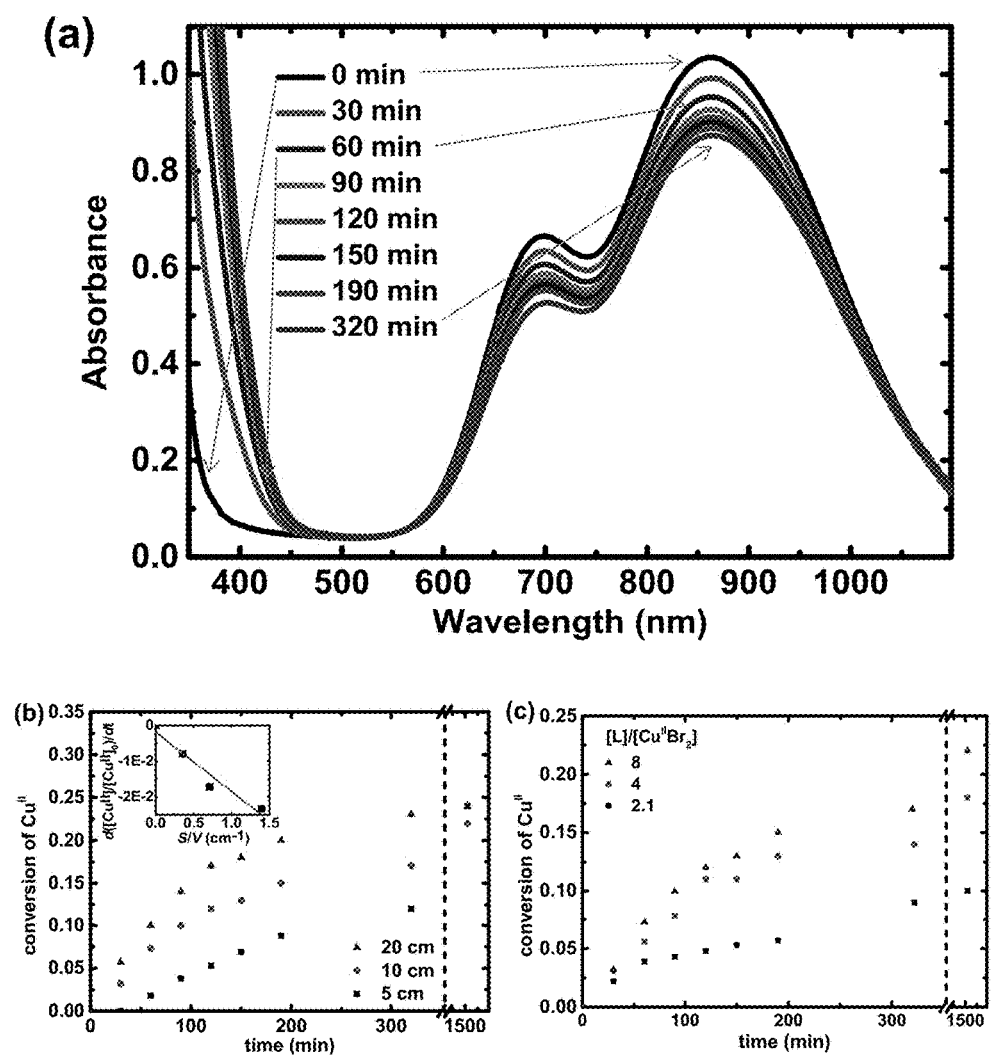
Figure 11:
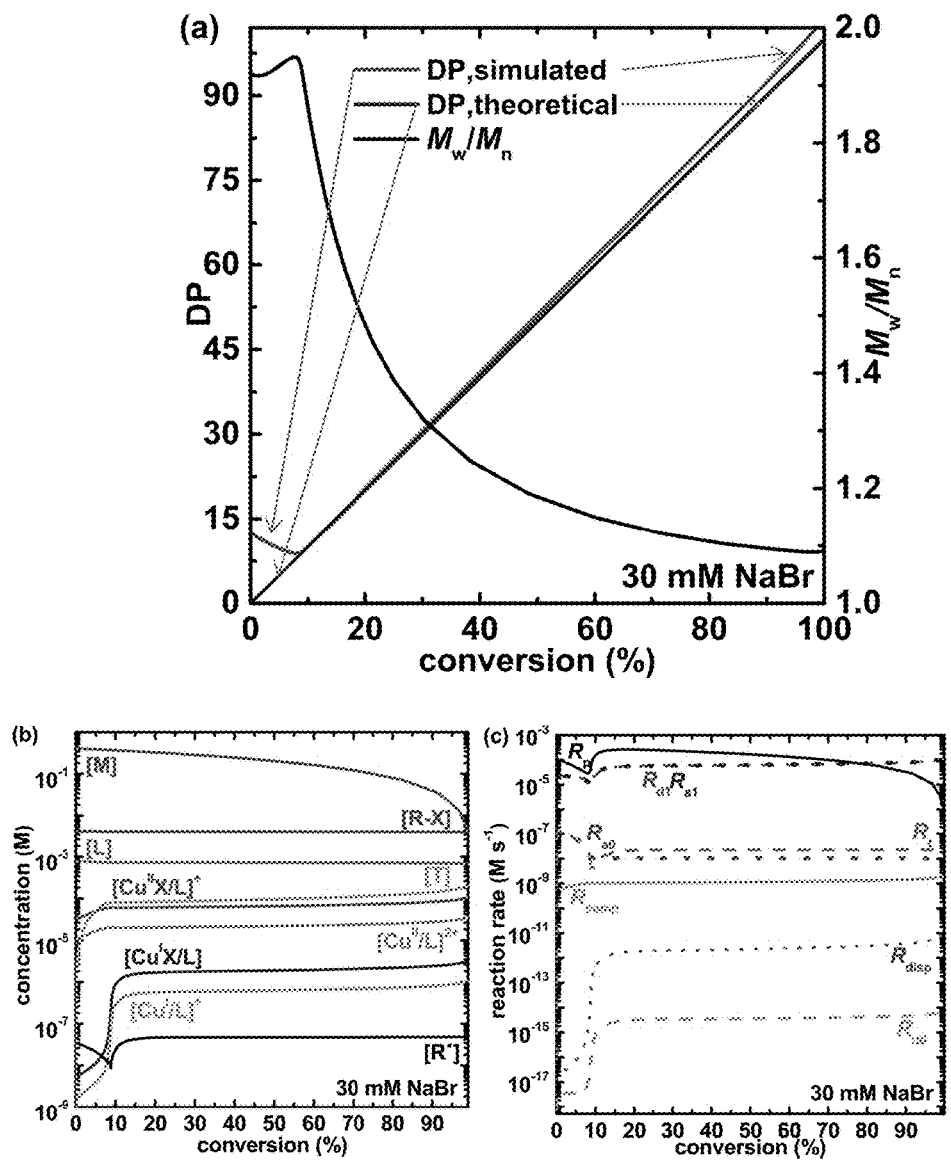
Figure 12:
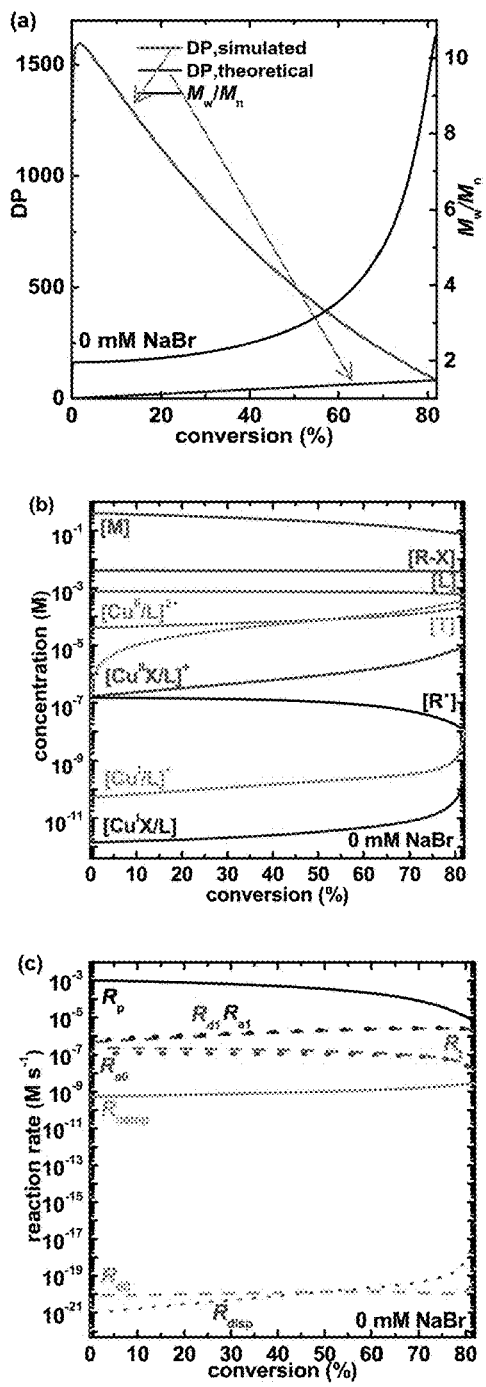
Figure 13:
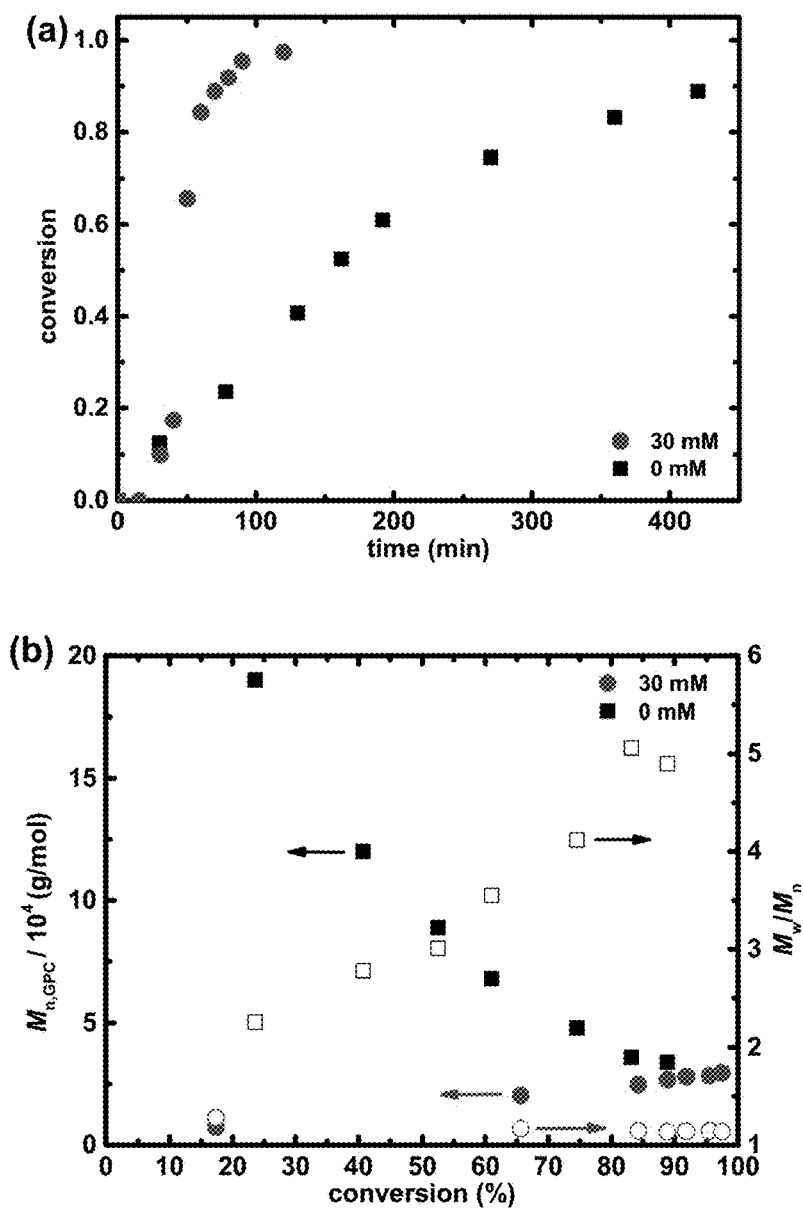
Figure 14:
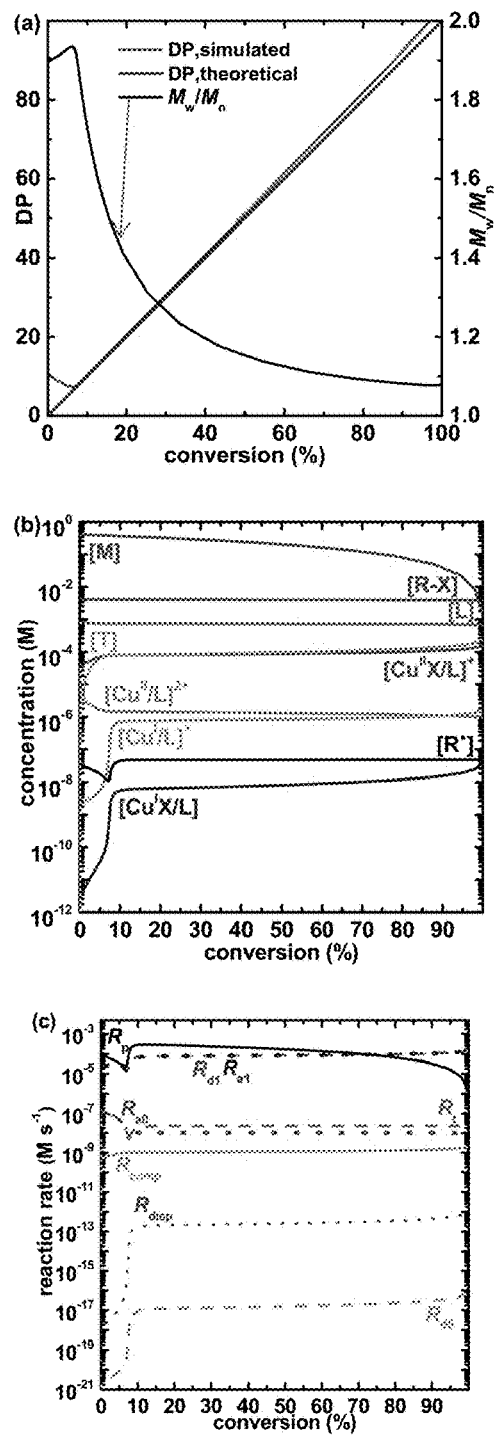
Figure 15:
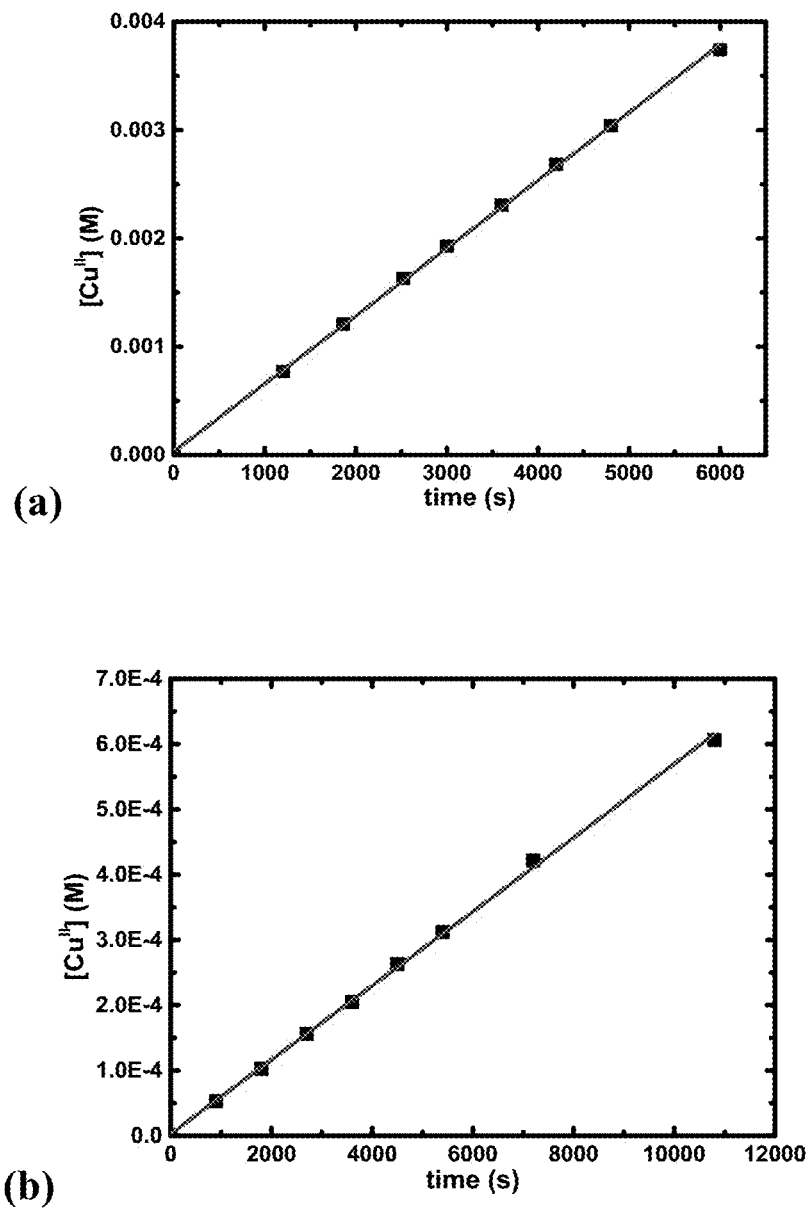

3(b) Evolution of $[Cu^{II}]$ in activation experiments under the conditions: $[OEOBrP]_0=20$ mM, $[Me_6TREN]_0=40$ mM, 18 wt % OEOA in water, in V=4.5 mL at 22° C. with different lengths of $Cu^0$ wire. Inset of FIG. 3(b) shows the slope $d[Cu^{I}]/dt$ for the three lengths of wire; and 3(c) Evolution of $[Cu^{II}]$ in activation experiments under the conditions: $[OEOBrP]_0=20$ mM, 18 wt % OEOA in water, 10 cm $Cu^0$ wire (d=1 mm) in V=4.5 mL at 22° C. with different $[Me_6TREN]_0$;

FIG. 4: Cyclic voltammetry recorded at v=0.2 $Vs^{-1}$ for 1.0 mM $Cu^{II}/Me_6TREN^{2+}$:

(a) in water or in 18 wt % OEOA in water;
(b) in water in the absence and presence of OEOBrP;
(c) in 18 wt % OEOA in water in the absence and presence of OEOBrP; determination of $k_{a1}$ for the reaction of $Cu^{I}/Me_6TREN^{+}$ with
(d) HEBiB in 18 wt % OEOA in water;
(e) OEOBrP in pure water; and
(f) OEOBrP in 18 wt % OEOA in water, by fitting of the experimental data on theoretical working curves at 25° C.;

FIG. 5: Cyclic voltammetry of 1 mM $[Cu^{II}Me_6TREN]^{2+}$ in $H_2O+0.1$ M $Et_4NBF_4$ recorded in the absence (dashed line) and presence of 5 mM OEOBrP (full lines);

FIG. 6: Fitting of the theoretical working curves to eqs. S3 (γ=4) and S4 (γ=2);

FIG. 7: MWDs for the polymerization with 30 mM NaBr. (c) Inset is the picture of the final colorless polymerization mixture;

FIG. 8: Theoretical working curves calculated for $[Cu^{II}Me_6TREN]^{2+}/OEOBrP$ (γ=4) using different $K_{ATRP}$ (lines) values and fitting of experimental data (squares);

FIG. 9: Evolution of UV-Vis-NIR spectra under comproportionation conditions: $[Cu^{II}Br_2]_0=2.5$ mM, $[Me_6TREN]_0=5.2$ mM, in water with 10 cm $Cu^0$ wire (d=1 mm) in 4.5 mL at 22° C.;

FIG. 10: (a) Evolution of UV-Vis-NIR spectra under comproportionation under the conditions: $[Cu^{II}Br_2]_0=2.5$ mM, $[Me_6TREN]_0=20$ mM, 18 wt % OEOA in water, 10 cm $Cu^0$ wire (d=1 mm) in V=4.5 mL at 22° C.;

(b) Conversion of $Cu^{II}$ to $Cu^{I}$ under comproportionation under the conditions: $[Cu^{II}Br_2]_0=2.5$ mM, $[Me_6TREN]_0=20$ mM, 18 wt % OEOA in water, in V=4.5 mL at 22° C. with different lengths of $Cu^0$ wire. Inset of FIG. 10(b) shows the slope of $[Cu^{II}]/[Cu^{I}]_0$ with time for the three lengths of wire; and (c) Conversion of $Cu^{II}$ to $Cu^{I}$ under comproportionation under the conditions: $[Cu^{II}Br_2]_0=2.5$ mM, $[Me_6TREN]_0=20$ mM, 18 wt % OEOA in water, 10 cm $Cu^0$ wire (d=1 mm) in V=4.5 mL at 22° C. with different $[Me_6TREN]_0$;

FIG. 11: Simulations of the (a) DP and $M_w/M_n$ vs. monomer conversion;

(b) concentration of all species vs. monomer conversion; and (c) reaction rates vs. monomer conversion for polymerization under the conditions $[OEOA]_0:[HEBiB]_0:[Cu^{II}Br_2]_0:[Me_6TREN]_0=100:1:0.01:0.2$, $[OEOA]=0.41$ M, 10 cm of $Cu^0$ wire (d=1 mm) in V=6 mL with 30 mM of NaBr added at 22° C. Here $R_p$ is the propagation rate, $R_{a1}$ is the rate of alkyl halide activation by $Cu^{I}$, $R_{d1}$ is the rate of radical deactivation by $Cu^{II}$, $R_{a0}$ is the rate of alkyl halide activation by $Cu^0$, $R_t$ is the rate of termination, $R_{comp}$ is the rate of comproportionation, $R_{disp}$ is the rate of disproportionation, and $R_{d0}$ is the rate of radical deactivation by $Cu^{I}$;

FIG. 12: Simulations of the (a) DP and $M_w/M_n$ vs. monomer conversion;

(b) concentrations of all species vs. monomer conversion; and (c) reaction rates vs. monomer conversion for polymerization under the conditions $[OEOA]_0:[HEBiB]_0:[Cu^{II}Br_2]_0:[Me_6TREN]_0=100:1:0.01:0.2$, $[OEOA]=0.41$ M, 10 cm of $Cu^0$ wire (d=1 mm) in V=6 mL with no NaBr added at 22° C. Here $R_p$ is the propagation rate, $R_{a1}$ is the rate of alkyl halide activation by $Cu^{I}$, $R_{d1}$ is the rate of radical deactivation by $Cu^{II}$, $R_{a0}$ is the rate of alkyl halide activation by $Cu^0$, $R_t$ is the rate of termination, $R_{comp}$ is the rate of comproportionation, $R_{disp}$ is the rate of disproportionation, and $R_{d0}$ is the rate of radical deactivation by $Cu^{I}$;

FIG. 13: Polymerization of OEOA (18 wt %) in water under the conditions: $[OEOA]_0:[HEBiB]_0:[Cu^{I}Br_2]_0:[Me_6TREN]_0=100:1:0.01:0.2$, $[OEOA]=0.41$ M, 10 cm of $Cu^0$ wire (d=1 mm) in V=6 mL with either 0 or 30 mM of NaBr added at 22° C.;

(a) Evolution of conversion vs. time;
(b) evolution of $M_n$ and $M_w/M_n$ with conversion;

FIG. 14: Simulations of the (a) DP and $M_w/M_n$ vs monomer conversion;

(b) concentrations of all species vs monomer conversion;
(c) reaction rates vs monomer conversion and for polymerization under the conditions $[OEOA]_0:[HEBiB]_0:[Cu^{II}Br_2]_0:[Me_6TREN]_0=100:1:0.01:0.2$, $[OEOA]=0.41$ M, 10 cm of $Cu^0$ wire (d=1 mm) in V=6 mL with no NaBr added at 22° C. and with $K_{Br^-}^{II}=10^{6.1}$ $M^{-1}$;

FIG. 15: (a) Evolution of $[Cu^{II}]$ vs time for model reaction between $Cu^0$ wire (d=1 mm, l=10 cm) and 20 mM HEBiB in the presence of 20 mM Me$_6$TREN in 4.5 mL of H$_2$O at room temperature, giving k$_{a0}^{app}$=4.5×10$^{-5}$ cm s$^{-1}$.

(b) Evolution of [Cu$^{II}$] vs time for model reaction between Cu$^0$ wire (d=1 mm, l=10 cm) and 20 mM OEOBrP in the presence of 20 mM Me$_6$TREN in 4.5 mL of H$_2$O at room temperature, giving k$_{a0}^{app}$=4×10$^{-6}$ cm s$^{-1}$.

Figure 16:
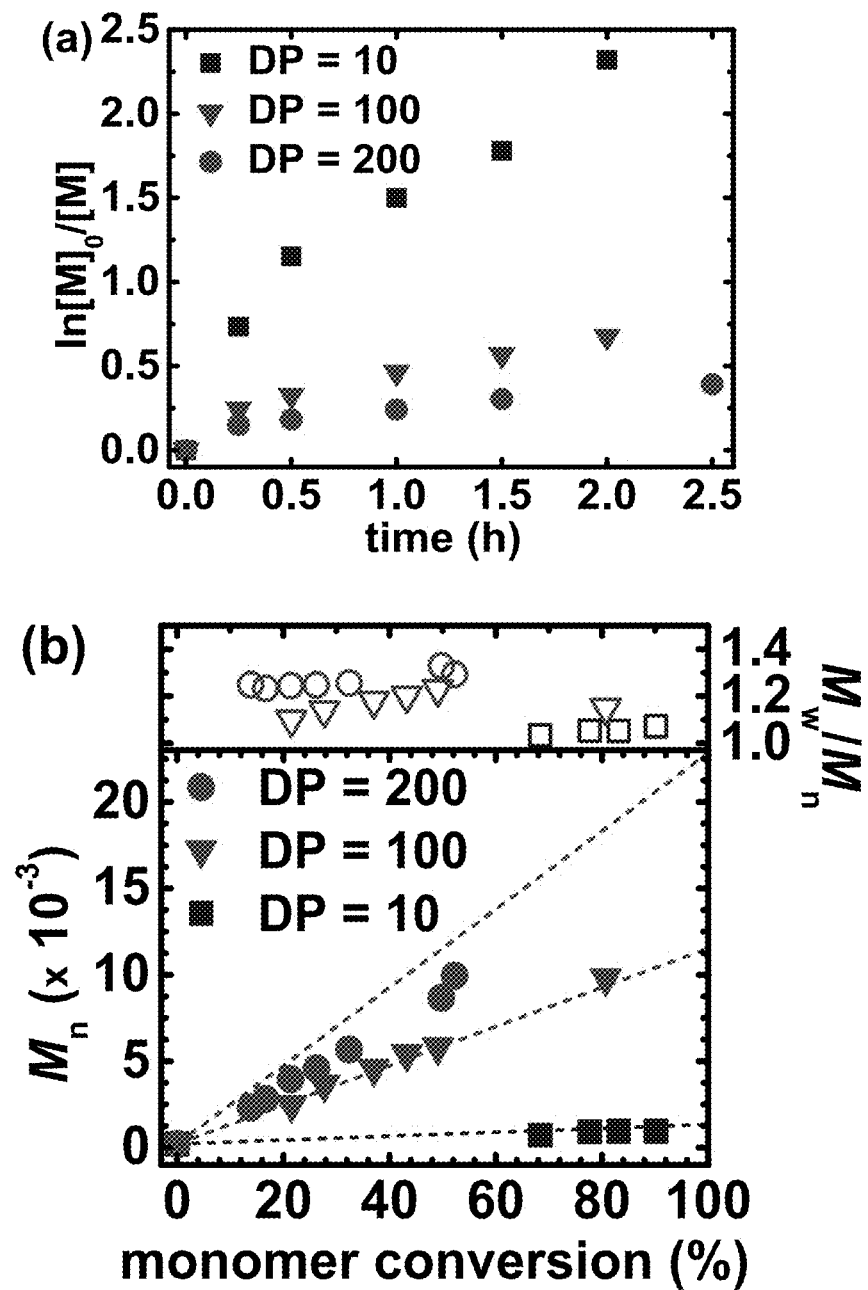

FIG. 16: SARA ATRP of NIPAM as a function of targeted DP (10, 100 and 200).

Figure 17:
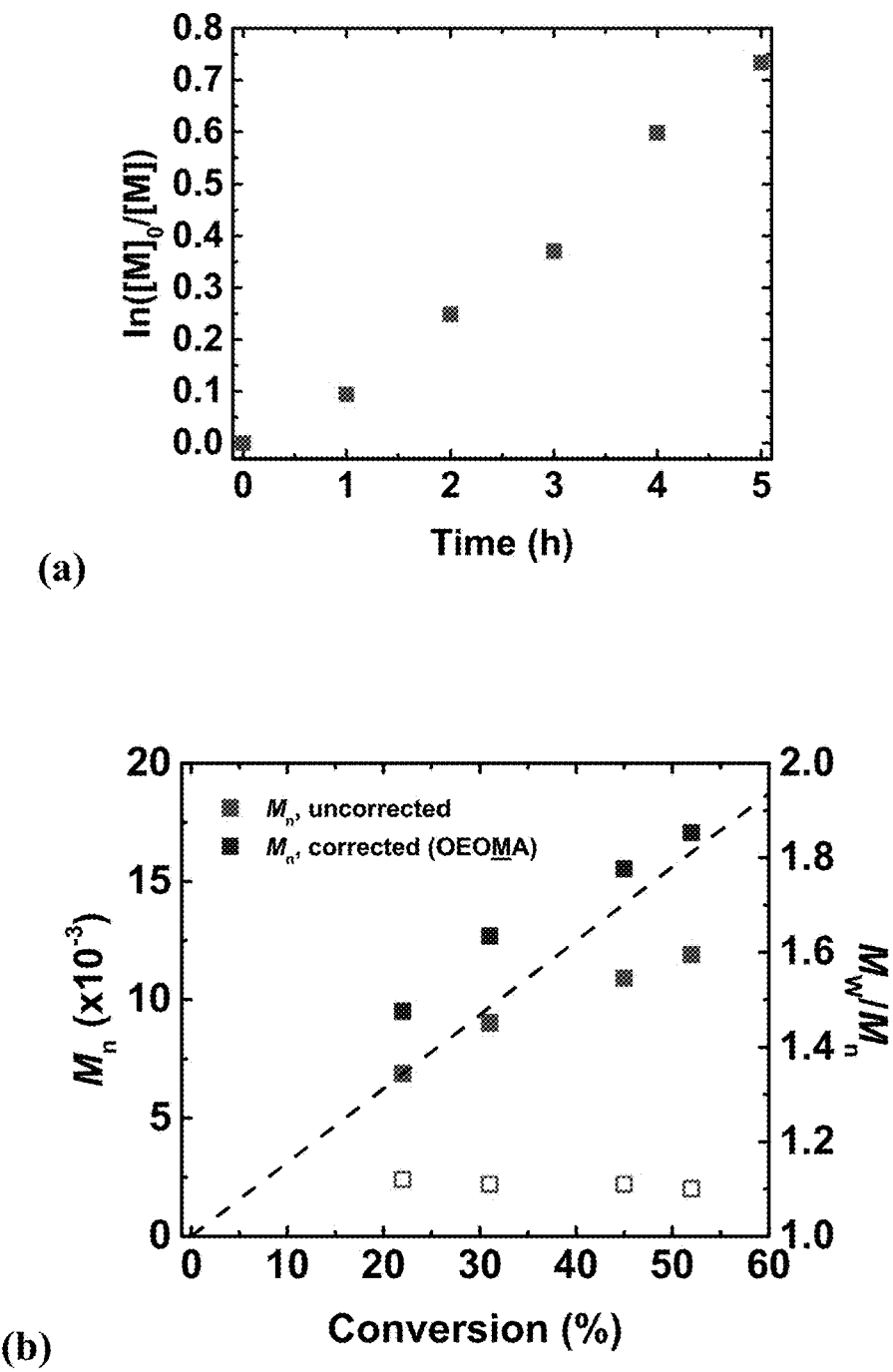
Figure 18:
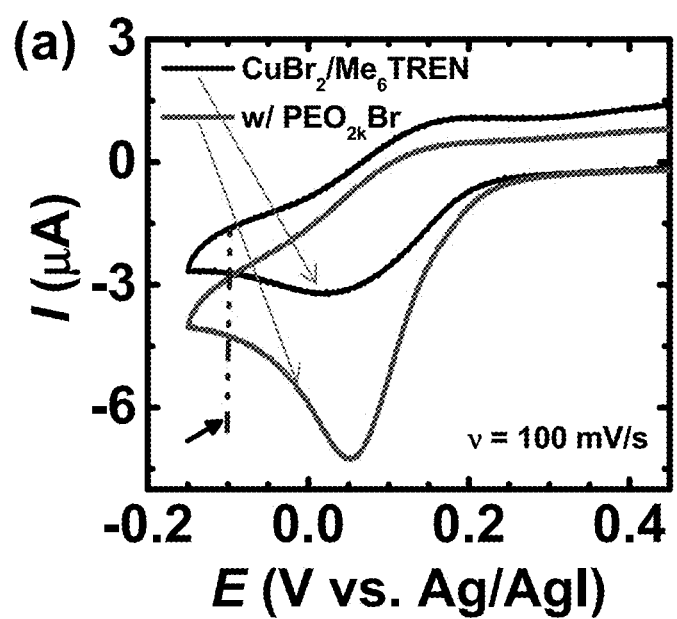
Figure 19:
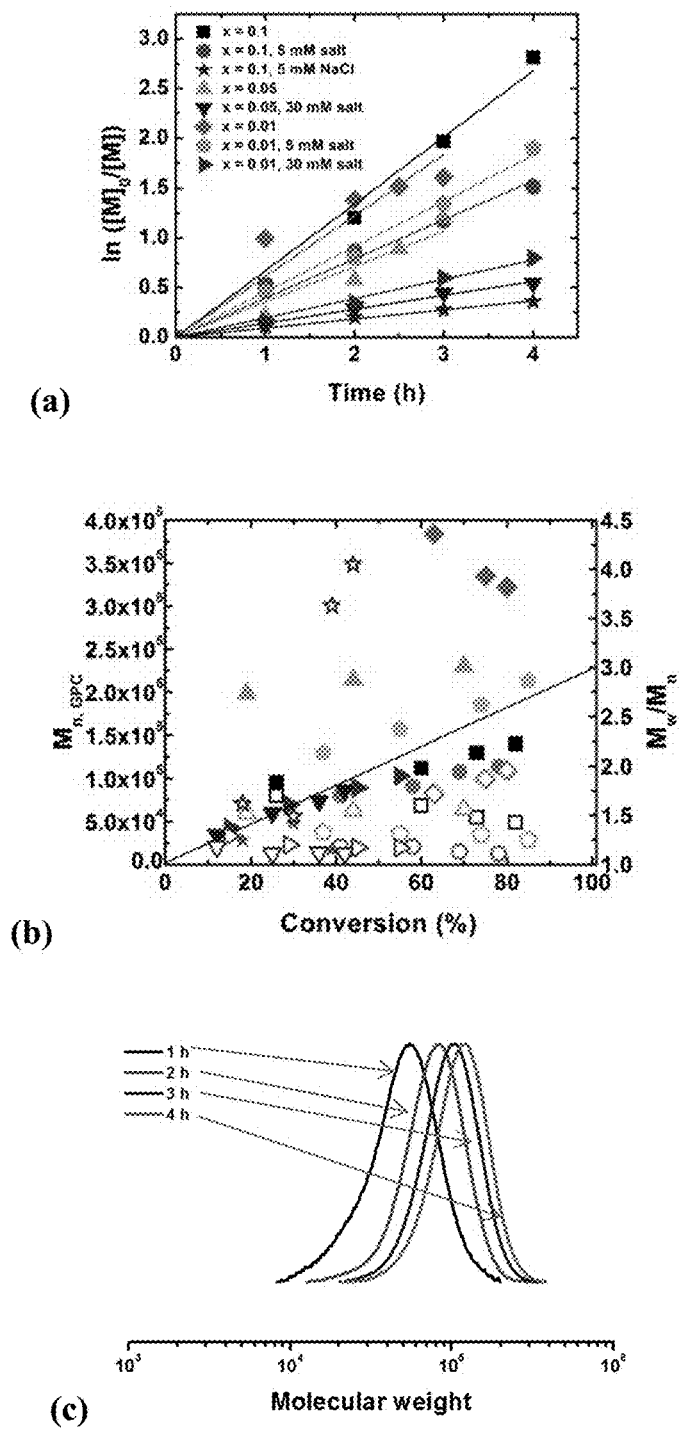

(a) First-order kinetic plot of monomer conversion versus time; and (b) M$_n$ and M$_w$/M$_n$ versus monomer conversion;

FIG. 17: (a) Kinetic and (b) GPC data for ATRP of OEOA with Ag$^0$ wire;

FIG. 18: eATRP of NIPAM. Cyclic voltammetry results Me$_6$TREN in the absence (top curve) and presence of PEO MI (lower curve), arrow indicates applied potential;

FIG. 19: Effect of salt concentration in photoinduced ATRP of OEOMA$_{500}$ in water with ppm of Cu catalyst. (a) Semilogarithmic kinetic plots (b) evolution of number-average molecular weight (M$_n$, filled symbols) and molecular weight distribution (M$_w$/M, open symbols) with conversion under conditions: [OEOMA$_{500}$]$_0$/[PEO$_{2000}$BPA]$_0$/[CuBr$_2$]$_0$/[TPMA]$_0$=450/1/x/4x in 90% water with 392 nm at 0.9 mW/cm$^2$ irradiation at room temperature; (c) GPC plots for the condition x=0.01 with 30 mM NaBr; and FIG. 20: (a) Semilogarithmic kinetic plots illustrating the effect of target degree of polymerization on the photo induced ATRP of OEOMA$_{500}$ in water with 10 ppm of Cu;

(b) Semilogarithmic kinetic plots for photo-on/off polymerization under conditions [OEOMA]$_0$/[PEOBPA]$_0$/[CuBr$_2$]$_0$/[TPMA]$_0$=200/1/0.1/0.4 with 5 mM NaBr in 90% water under 392 nm irradiation (0.9 mW/cm$^2$); and (c) UV-Vis spectra for the mixtures [OEOMA$_{500}$]$_0$/[PEOBPA]$_0$/[CuBr$_2$]$_0$/[TPMA]$_0$=450/1/9/36 or [OEOMA$_{500}$]$_0$/[PEOBPA]$_0$/[CuBr$_2$]$_0$/[TPMA]$_0$=450/1/3/12 in 90% water.

DESCRIPTION

The reader will appreciate the foregoing details, as well as others, upon considering the following detailed description of various non-limiting and non-exhaustive embodiments according to the present disclosure.

Various embodiments are described and illustrated in this specification to provide an overall understanding of the structure, function, operation, manufacture, and use of the disclosed processes and products. It is understood that the various embodiments described and illustrated in this specification are non-limiting and non-exhaustive. Thus, the invention is not limited by the description of the various non-limiting and non-exhaustive embodiments disclosed in this specification. Rather, the invention is defined solely by the claims. The features and characteristics illustrated and/or described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. Therefore, any such amendments comply with the requirements of 35 U.S.C. § 112, first paragraph, and 35 U.S.C. § 132(a). The various embodiments disclosed and described in this specification can comprise, consist of, or consist essentially of the features and characteristics as variously described herein. The initial activator regenerator used to determine the exact mechanism of activator regeneration ATRP was modeled by an added or in situ formed copper zero metal which acts as both a supplemental activator and reducing agent for the added or formed transition metal complex in the higher oxidation state. Subsequently it was determined that the mechanism clarified by this specific examination of the kinetics of the procedure can be applied to other activator regeneration procedures.

Any patent, publication, or other disclosure material that is said to be incorporated, in whole or in part, by reference herein is incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference. Any material, or portion thereof, that is said to be incorporated by reference herein, but which conflicts with existing definitions, statements, or other disclosure material set forth herein is only incorporated to the extent that no conflict arises between that incorporated material and the existing disclosure material.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112, first paragraph, and 35 U.S.C. § 132(a). Additionally, as used herein when referring to compositional elemental ranges, the term "up to" includes zero unless the particular element is present as an unavoidable impurity.

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

While the present disclosure was to some degree motivated by the excellent control attained in polymerization conducted in water with high concentrations of added catalyst complex, which claimed that the kinetics were governed by the activation of the alkyl halide by $Cu^0$ and ongoing research within CMU on the role of $Cu^0$ in an ATRP reaction [*Macromolecules*, 2013, 46, 3803-27.] which indicated that $Cu^I$ was the main activator and $Cu^0$ a supplemental activator and a reducing agent, the objective of the research program detailed herein was to determine if it was possible that an ATRP could be conducted in water with low ppm levels of catalyst.

This required a complete analysis, quantification and simulation of the kinetics of all contributing reactions and determination of the equilibrium position of the comproportionation/disproportionation reactions in aqueous media in the presence on monomers which should also take into account the kinetics of competitive reactions.

Scheme 2: All potential contributing reactions to an ATRP conducted in the presence of water.

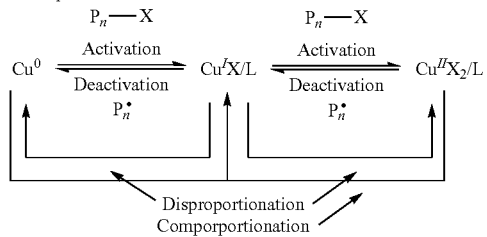

Guided by these detailed in depth mechanistic studies, simulations of the reaction conditions were developed that surprisingly allowed reaction conditions to be designed to give well-controlled polymerizations with ≤600 ppm of $Cu^{II}$ in the initial polymerization solution where the polymerization was conducted in the presence of a very low concentrations of $Cu^I$ that are generated and maintained in the modelled aqueous reaction medium by the presence of an easily removable sample of $Cu^0$.

After generating this detailed analysis of the polymerization procedure the knowledge indicated that it should be possible to conduct the supplemental activation and/or activator regeneration procedure with other transition metals in the zero oxidation state or in the presence of a chemical capable of participating in a reduction reaction such as inorganic sulfites, or alternatively by a potentiometric eATRP [PCT/US11/65578], or through a photo-induced reduction reaction [paper submitted for publication] each of which would also allow simple procedures for purification of the final polymer.

A series of model experiments were designed to elucidate and subsequently define the mechanism of an ATRP conducted in the presence of a transition metal complex, in this exemplary case the most commonly utilized transition metal for an ATRP copper, when the polymerization is conducted in water as a solvent to specifically determine whether (i) activation of dormant alkyl halides was faster by $Cu^I$ or $Cu^0$ species, and (ii) whether activation of alkyl halides by $Cu^I$ was faster than $Cu^I$ disproportionation. Except for certain specific model controlled disproportionation and comporportionation experiments which were carried out in pure water, all actual polymerization experiments were performed in a mixture of 18 wt % oligo(ethylene oxide) monomethyl ether acrylate ($M_n$=480) (OEOA) in water. This mixture was selected as an exemplary polymerization medium as it represents a commonly used polymerization medium consisting predominantly of water, but also because 10-20% of monomers such as NIPAM or OEOA have been employed for preparation of biocompatible conjugated materials [WO 2013/028756] and it is an additional exemplification of a procedure to prepare a copolymer for bio-applications. Indeed poly(N-isopropylacrylamide) (PNIPAM) is widely used in cosmetics, for biomedical applications, wastewater treatment, and oil recovery. [*Prog. Polym. Sci.* 2011, 36 (11), 1558-1628; *J Am Chem Soc* 2013, 135 (19), 7355-7363.]

However, successful ATRP of acrylamides and its derivatives is especially challenging with respect to the level of control of the polymerization when using water as the solvent. ATRP of NIPAM has a relatively low value for its ATRP equilibrium constant ($K_{ATRP}$) and displays some potential side reactions that include ligand displacement from the copper catalyst by the formed polymers, and loss of chain-end halogen (C—X) by solvolysis. [*Macromol.* 2012, 45 (10), 4015-4039] Since the X—$Cu^{II}$/L bond can easily dissociate in aqueous media, typically either high concentrations of catalyst are needed, or the presence of additional salts with halide anions is required. [*Macromol.* 2004, 37 (26), 9768-9778; *Macromol.* 2014, 47 (2), 560-570.] Hydrolysis of alkyl halides in water can be suppressed by conducting the polymerizations at lower temperatures. [*ACS Symposium Series* 2009, 1023, 127-137; *Macromol Rapid Comm* 2014, 35 (10), 965-970.] The best disclosed control over an ATRP of (meth)acrylamides was obtained using one of the most active catalytic systems, $Cu^I$Br/Me$_6$TREN, due to its intrinsically high values for $K_{ATRP}$. [*Macromol.* 1998, 31 (17), 5958-5959.] PNIPAM with narrow MWD ($M_w/M_n$=1.08) was prepared by employing a water soluble initiator, however high catalyst loadings (ca. 10,000-15,000 ppm) were used. Recently another procedure for synthesis of PNIPAM with narrow MWD ($M_w/M_n$=1.13-1.22) was reported, but it required a large amount of organic solvent, at least 50%. [*J Polym Sci Pol Chem* 2010, 48 (8), 1752-1763; *J Polym Sci Pol Phys* 2014, 52 (7), 507-516.] While NIPAM copolymers with poly(ethylene oxide) were reported, the polymerizations either took long time (24 h) to reach high conversion and yielded polymers with broad MWD ($M_w/M_n$=1.45-1.51), [*Polymer* 2005, 46 (9), 2836-2840] or required the use of high amounts of organic (co)solvent, [*Soft Matter* 2012, 8 (37), 9526-9528.] or high amounts of catalyst. [*Adv Mater* 2006, 18 (21), 2905.] Therefore polymerization conditions for N-isopropylacrylamide really needed to be examined and optimized to provide for fast reactions in aqueous media employing low catalyst concentrations, while maintaining narrow molecular weight distributions and high retention of chain end functionality.

Figure 1:
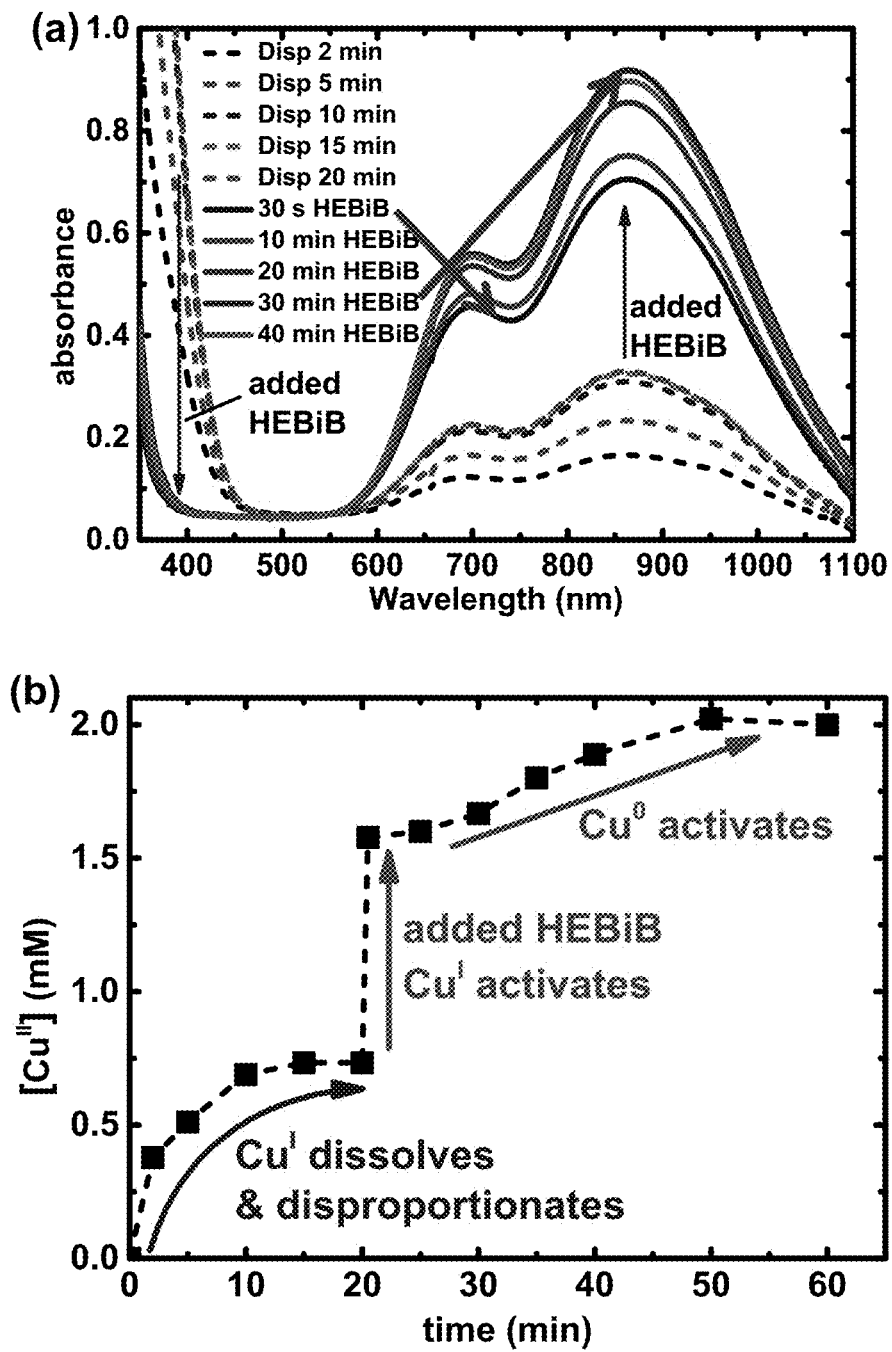
FIG. 1: (a) UV-Vis-NIR spectra of $[Cu^{I}Br]_0=2$ mM, $[Me_6TREN]_0=10$ mM in OEOA (18 wt %) in water before (dotted traces) and after (solid traces) the addition 50 mM HEBiB at 22° C. (b) Evolution of $[Cu^{II}]$ over time.

FIG. 1(*a*) shows the UV-Vis-NIR data of an aqueous solution of 2 mM of $Cu^I$Br in the presence of 10 mM Me$_6$TREN in OEOA (18 wt %) before (dotted) and after (solid) the addition of 50 mM 2-hydroxyethyl α-bromoisobutyrate (HEBiB) with continuous shaking. 10 min after adding the 10 mM Me$_6$TREN solution to the $Cu^I$Br powder, the spectrum essentially settled and the solution displayed a green color with a fine precipitate attributed to the formation of $Cu^0$ prior to the addition of HEBiB, and a blue color after the addition. As seen in FIG. 1(*a*), before the addition of HEBiB there is significant absorbance at 400-

450 nm, which can be attributed to the presence of both $Cu^I$ and $Cu^{II}$, with the majority being due to $Cu^I$, and the absorbance at 600-1100 nm, attributed to $Cu^{II}$. After adding 50 mM HEBiB, the absorbance at 860 nm, indicative of the presence of $Cu^{II}$, increased from a value of ca. 0.3 before the addition of HEBiB to ca. 0.7 within less than 30 s after the addition of HEBiB, which is the time needed to record the spectrum. As shown in FIG. 1(b) this is equivalent to a change from ca. 0.7 mM of $Cu^{II}$ before adding HEBiB to ca. 1.6 mM of $Cu^{II}$ after adding HEBiB. There was also an almost instantaneous color change from green to blue, and a significant decrease in the absorbance in the range of 350-450 nm.

Since $Cu^I$ complexes absorb strongly below 450 nm these spectra show that within 30 s of adding HEBiB, an ATRP initiator, all the $Cu^I$ is converted to $Cu^{II}$. Finally, the $Cu^{II}$ concentration increases continuously with time, and eventually stabilizes after 30 min at an absorbance of ca. 0.9. This indicates that during this time there is also slow consumption of the precipitate attributed to $Cu^0$ and there was much less precipitate present in the reaction medium 20 min after the addition of HEBiB and the solution was a light blue color, which is typical of $Cu^{II}$ complexes in water. The absorbance of ca. 0.9 corresponds to 2 mM $Cu^{II}$, hence the absorbance of ca. 0.3 before the addition of HEBiB corresponds to ca. 0.7 mM $Cu^{II}$. When one considers the disproportionation stoichiometry, this indicates that 0.7 mM of $Cu^I$ was converted to $Cu^0$, but the remaining Cu in the reaction medium must be $Cu^I$, giving a remaining soluble $Cu^I$ concentration of ca. 0.6 mM and ca. 9 mM of uncoordinated ligand.

The disproportionation reaction and apparent equilibrium constants are:

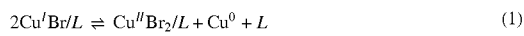

$$2Cu^I Br/L \rightleftharpoons Cu^{II} Br_2/L + Cu^0 + L \quad (1)$$

$$K_{disp}^{L,app} = \frac{[L][Cu^{II} Br_2/L]}{[Cu^I Br/L]^2} \quad (2)$$

Here, the term "apparent" is used to describe the equilibrium constant or rate coefficient based only on the total concentration of Cu in each oxidation state, without reference to specific associations between ligands, halides and the metal.

The concentrations measured in the above example give an apparent equilibrium constant for disproportionation of approximately 20, which will be shown to be consistent with other model experiments.

The $Cu^{II}$ concentration, $[Cu^{II}]$, essentially doubled after the addition of HEBiB whereas before adding HEBiB, $[Cu^I]=[Cu^{II}]$. The doubling of $[Cu^{II}]$ after adding HEBiB demonstrated that $Cu^I$ reacted very rapidly with HEBiB, generating radicals that underwent rapid radical/radical termination reactions, causing the rapid accumulation of $Cu^{II}$. The second slow increase of $Cu^{II}$, corresponds to slow activation of the remaining HEBiB by $Cu^0$ forming $Cu^I$ which also underwent rapid radical/radical termination reactions. The three stages of $Cu^{II}$ evolution are shown in FIG. 1(b).

The equilibrium constants, and measured rate coefficients, are the apparent ones, based on the total $Cu^I$, and $Cu^{II}$ species in solution, while neglecting specific associations between the metal centers, ligands and halides. [*Macromol.* 2010, 43, 9257-67] This is particularly important in water, since halides can partially dissociate from the $Cu^{II}$ species, leading to poor deactivation efficiency. [*Macromol.* 2012, 45, 4461-4468]

This process and the equilibrium constant are shown below:

$$Cu^{II}/L^{++} + Br^- \rightleftharpoons Cu^{II} Br/L^+ \quad (3)$$

$$K_{Br}^{II} = \frac{[Cu^{II} Br/L^+]}{[Cu^{II}/L^{++}][Br^-]} \quad (4)$$

where $Cu^{II}/L^{++}$ is a $Cu^{II}$ complex with ligand only, and $Cu^{II} Br/L^+$ is a $Cu^{II}$ complex coordinated by both a ligand and halide that can act as a deactivator. This association constant is $K_{Br}^{II}=4.4$ M$^{-1}$ for Br—$Cu^{II}/Me_6$TREN in water but ca. $10^5$M$^{-1}$ in other solvents.

Figure 2:
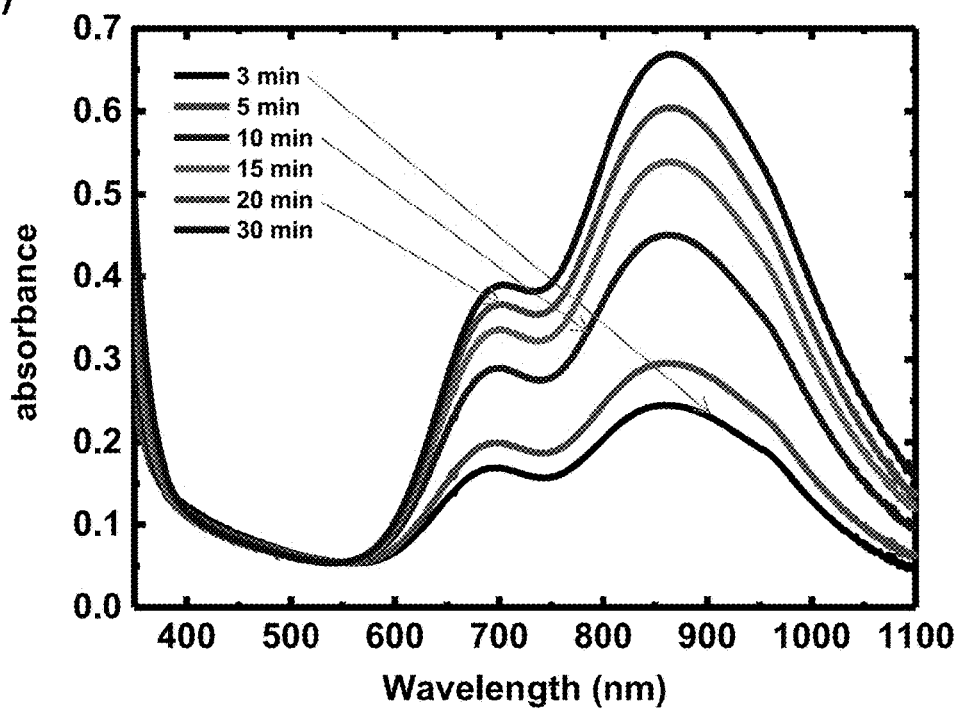
FIG. 2: (a) UV-Vis spectra of $[Cu^{I}Br]_0=2$ mM, $[Me_6TREN]_0=10$ mM, and 50 mM HEBiB in OEOA (18 wt %) in water at 22° C.

An experiment similar to that shown in FIG. 1 was performed, except that a solution containing both 10 mM Me$_6$TREN and 50 mM HEBiB was added to the initial $Cu^I$ Br solution. This experiment showed no formation of any precipitate, and the solution displayed a strong absorbance from $Cu^{II}$, and weak absorbance below 450 nm, as depicted in FIG. 2. These results indicate that $Cu^I$ can completely activate alkyl halides within 30 s, whereas 20-30 min is required for any formed "nascent" $Cu^0$ to activate alkyl halides.

Model reactions were performed (similar to those reported in the literature that were carried out in DMSO, [*Macromol.* 2013, 46, 3793-3802 and 3803-3815]) to characterize the aqueous system more precisely. First, the activation of alkyl halides by $Cu^0$ was studied. A secondary alkyl halide initiator oligo(ethylene oxide) 2-bromopropionate (OEOBrP) was synthesized to mimic the chain end of poly(OEOA)-Br. FIG. 3(a) displays the evolution of UV-Vis-NIR spectrum with time in such a typical activation experiment. The formation of $Cu^{II}$ shows that $Cu^0$ is able to activate alkyl halides. The fact that there was no precipitate indicates that the $Cu^I$ generated in situ rapidly activated a second alkyl halide, and did not instantaneously disproportionate to form nascent $Cu^0$ and $Cu^{II}$.

Activation experiments were performed with [Me$_6$TREN]=20 mM, [OEOBrP]=20 mM, and different lengths of the same diameter $Cu^0$ wire. The results are reported in FIG. 3(b) and indicate that $Cu^0$ with larger surface areas results in faster reactions. The inset of FIG. 3(b) shows that the slope of $Cu^{II}$ evolution with time, d[$Cu^I$]/dt, was a linear function of the S/V ratio, where S is surface of $Cu^0$, V is the reaction volume.

FIG. 3(c) shows how the ligand concentration affects the evolution of [$Cu^{II}$] with time. When more than 2.5 mM of ligand was used, the rate of evolution of [$Cu^{II}$] was essentially the same, i.e. within experimental error. This indicates that, similar to the case with DMSO as solvent, the activation of alkyl halides by $Cu^0$ is independent of the [Me$_6$TREN] above a certain value. This is most likely caused by coating of the $Cu^0$ surface by free ligand, as described by Eley-Rideal kinetics. [*Macromol.* 2012, 45, 7388-96] As highlighted in the literature, whenever the amount of $Cu^I$ in the system is small, as is expected for a controlled ATRP in aqueous systems, due to the high activity of $Cu^I$ with the added initiator the evolution of $Cu^{II}$ can be used to determine the rate coefficient for alkyl halide activation by $Cu^0$, $k_{a0}^{app}$, as follows:

$$\frac{d[Cu^{II}]}{dt} = k_{a0}^{app} \frac{S}{V}[RX] \quad (5)$$

where [RX] is the alkyl halide concentration, and the superscript "app" refers to the fact that total $Cu^0$ surface area, and concentrations of all $Cu^I$ and $Cu^{II}$ were used, without reference to specific association/speciation. This equation was applied to all the data shown in FIG. 3(c), and the resulting values of $k_{a0}^{app}$ show that the average value of $k_{a0}^{app}$=1.0× $10^{-5}$ cm s$^{-1}$ for [Me$_6$TREN]≥2.5 mM, which is 18 times lower than value of $1.8 \times 10^{-4}$ cm s$^{-1}$ obtained for methyl 2-bromopropionate in DMSO with Me$_6$TREN as added ligand.

These results are unexpected and establish that, contrary to literature contentions about the activity of $Cu^0$ formed by disproportionation, [Percec, V.; et al.; *J. Am. Chem. Soc.* 2006, 128, 14156-14165] $Cu^0$ is a very slow activator of alkyl halides in aqueous media, in correlation to low stability and high reactivity of the resulting $Cu^I$ species.

In order to define conditions that allowed for ppm level of catalyst in a well-controlled aqueous ATRP it was also necessary to evaluate the activation rate of alkyl halides by $Cu^I$, and compare the value to that determined for activation by $Cu^0$. The rate coefficients $k_{a1}$ and $k_{a0}$ cannot be directly compared because they have different units (one is a homogeneous reaction and the other a heterogeneous reaction). Due to concurrent disproportionation in these aqueous systems, it was not possible to directly measure the $Cu^I$ activation rate coefficient using stopped flow techniques but fortunately activation rate coefficients can also be determined using electrochemical techniques. [J. Am. Chem. Soc., 2011, 133 11944-47] The homogeneous redox catalysis approach of C. Andrieux et. al., [*J. Electroanal. Chem.* 1978, 87, 55-65; *J. Electroanal. Chem.* 1978, 87, 39-53; and *J. Electroanal. Chem.* 1980, 113, 19-40.] was employed in these measurements as they have been widely applied to the determination of rate coefficients of activation reactions between alkyl halides and various catalysts including both outer-sphere and inner-sphere reducing agents.

FIG. 4(a) shows the results of cyclic voltammetry of $Cu^{II}$/Me$_6$TREN$^{2+}$ in pure water and for a solution of 18 wt % OEOA in water. In both cases a reversible peak, representing the $Cu^{II}$/$Cu^I$ redox couple was observed. The standard reduction potentials, estimated as the mid-point between the cathodic and anodic peaks, are −0.48 V and −0.34 V vs. SCE in water and OEOA-water, respectively. As shown in FIGS. 4(b) and 4(c) addition of OEOBrP to the solution of $Cu^{II}$/Me$_6$TREN$^{2+}$ drastically modifies the voltammetric pattern of the complex; the cathodic peak increases in intensity while the anodic peak disappears. In addition, the cathodic current enhancement increases with the concentration of OEOBrP, while it decreases with increasing scan rate, FIG. 5. Similar voltammetric modifications were observed when HEBiB was used in place of OEOBrP.

This behavior is typical of electrochemical processes involving a catalytic cycle in which the electroactive species is rapidly regenerated near the electrode. The proposed reaction mechanism for the catalytic activation of RX by $Cu^I$/$L^+$ is shown in Scheme 3, where L stands for Me$_6$TREN.

Scheme 3. Mechanism of electrocatalytic activation of RX by $Cu^I$.

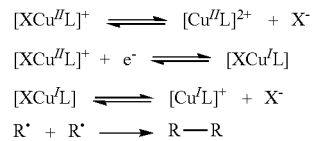

-continued

The proposed electrocatalytic mechanism involves two redox steps, one for $Cu^{II}/L^{++}$ and one for the ternary complex $Cu^{II}X/L^+$. Although in non-aqueous solvents, the standard reduction potential of $Cu^{II}X/L^+$ is more negative than that of $Cu^{II}/L^{2+}$ and two distinct reversible peak couples can be observed in cyclic voltammetry, [*Macromol.* 2009, 42, 6348-60 and 2010, 43, 9257-67] in this series of experiments only one reduction peak was observed, indicating that $E_{Cu^{II}/L^{++}-Cu^I/L^+}^0 \geq E_{Cu^{II}XL^+-Cu^IX/L}^0$. In fact, in the literature, very little shift of the cyclic voltammogram has been reported for Cu complexes in water indicating that $E_{Cu^{II}/L^{++}-Cu^I/L^+}^0 \approx E_{Cu^{II}XL^+-Cu^IX/L}^0$. [*Angew. Chem. Int. Ed.* 2011, 50, 11391-11394] In all these cases, copper(II) triflate $(Cu^{II}(OTf)_2)$ was used which only provides the $Cu^{II}/L^{2+}$ complex due to the weak binding of the triflate ion to Cu.

The rate coefficient of the activation reaction can be calculated by examining the catalytic current enhancement or degree of catalysis defined as $I_{p,c}/I_{p,d}$, where $I_{p,c}$ and $I_{p,d}$ stand for the cathodic peak current of the catalyst measured in the presence and absence of initiator, respectively. The degree of catalysis strongly depends on the rate coefficient of the activation reaction as well as on the scan rate and an excess factor γ expressing the ratio between the concentrations of initiator and catalyst, $\gamma = C_{RX}/C_{Cu^{II}/L^{2+}}$ (Andrieux et. al.).

Theoretical working curves relating $I_{p,c}/I_{p,d}$ with a kinetic parameter $\lambda = RTk_{a1}C_{Cu^{II}/L^{2+}}/Fv$ can be constructed by digital simulation of cyclic voltammetry of a catalytic system following the reaction mechanism depicted in Scheme 3. The rate coefficient $k_{a1}$ was determined by comparing the experimental $I_{p,c}/I_{p,d}$ to the simulated curve with the same γ value. Details of the procedure for the construction of the working curves and data fitting for $k_{a1}$ determination are described in the experimental section, and examples of this fitting are given in FIG. 6.

FIG. 4(d-f) shows the best fits of the experimental data for the systems OEOBrP-$Cu^{II}$/Me$_6$TREN$^{2+}$ and HEBiB-$Cu^{II}$/Me$_6$TREN$^{2+}$ on theoretical working curves. As determined from the data in FIG. 4, the activation of OEOBrP by $Cu^I$/Me$_6$TREN$^+$ occurs with the rate coefficient $k_{a1}$=2.5×10$^4$ s$^{-1}$ in a solution of 18 wt % OEOA in water. Similarly, in pure water OEOBrP is activated by $Cu^I$/Me$_6$TREN$^+$ with the rate coefficient $k_{a1}$=6.6×10$^5$ M$^{-1}$ s$^{-1}$ at 25° C., while the initiator HEBiB is activated by $Cu^I$/Me$_6$TREN$^+$ with the rate coefficients of 2.6×10$^7$ M$^{-1}$ s$^{-1}$ and 2.9×10$^6$ s$^{-1}$ in pure water and in 18 wt % OEOA in water, respectively.

The result of this analysis is highlighted in FIG. 7, which shows the narrow MWD of the formed polymer and the clean shift to higher MW as the reaction progressed, making it clear that the deactivation of radicals by Br—$Cu^{II}$/L is efficient.

The very high activity of $Cu^I$ would explain why essentially all the $Cu^I$ was rapidly converted to $Cu^{II}$ after adding HEBiB as shown in FIG. 1.

The high activity of the Cu complexes in aqueous media is confirmed in FIG. 8, which shows that the $K_{ATRP}$ of the system is at least $10^{-4}$, that is, it is several orders of magnitude greater than $K_{ATRP}$ in organic solvents. To compare the activities of $Cu^0$ and $Cu^I/Me_6TREN$ in the reaction medium it was necessary to determine the concentration of $Cu^I$ needed to match the activity of 10 cm of $Cu^0$ wire (d=1 mm) in 5 mL of solution (S/V=0.63 cm$^{-1}$).

The activation rate of 10 mM of OEOBrP is:

$$R_{a0}=k_{a0}{}^{app}S/V[\text{OEOBrP}]=6.3\times10^{-8}Ms^{-1} \quad (6)$$

but, in order to have $R_{a0}=R_{a1}$, the required concentration of $Cu^I$ needed to match the rates is:

$$[Cu^I/Me_6TREN]=R_{a1}/(k_{a1}{}^{app}[\text{OEOBrP}])=2.5\times10^{-10}M \quad (7)$$

given that the typical $Cu^I$ concentration is in the order of 1 μM this indicates that $Cu^I$ has a much higher activity than $Cu^0$ in aqueous media. Another way of stating the difference in activity, (for $k_{a0}=1\times10^{-5}$ and $k_{a1}=2.5\times10^4$) is that it would require ~400 m of $Cu^0$ wire with diameter 1 mm in 5 mL of 18 wt % OEOA in water to match reactivity of 1 μM $Cu^I/Me_6TREN$ which would indicate that the predominant activator is $Cu^I$.

In order to gain a full understanding of the mechanism it was also important to determine the kinetics of comproportionation, and disproportionation, see Scheme 2. Preferentially this can be done by studying the kinetics of comproportionation, to avoid the formation of large quantities of $Cu^0$ precipitate that can scatter light and disrupt a UV-Vis experiment during a disproportionation. As shown in the literature, there was almost complete disproportionation of the $Cu^IBr/Me_6TREN$ complex in pure water. [J. Am. Chem. Soc., 2013, 135, 7355-7363]. This was confirmed in our studies and is reported in FIG. 9 which clearly shows that there is no measurable comproportionation of $Cu^0$ and $Cu^{II}$ in pure water. Indeed when the absorbance spectrum were measured at intervals over a period of 1515 min. there was little change in the spectra and when plotted together the differences between the individual spectra result in a thicker spectrum.

However, once again, contrary to the results reported, and confirmed, for pure water, it was unexpectedly determined that in the presence of only 18 wt % OEOA monomer in water, the $Cu^{II}Br_2/Me_6TREN$ complex underwent a certain degree of comproportionation with added solid $Cu^0$. Typically, ca. 15% of the initial $Cu^{II}$ was converted to $Cu^I$. FIG. 10(a) shows a clear decrease in the absorbance of the $Cu^{II}$ complex in the range of 600-1100 nm, which is a region where the $Cu^{II}$ complex absorbs.

The surface area dependence of the comproportionation reaction was confirmed by using 3 different lengths of $Cu^0$ wire. FIG. 10(b) shows that copper metal with a higher surface area (S) leads to faster comproportionation, and the inset displays that the rate of $Cu^{II}$ consumption is proportional to the S/V ratio. The slopes of $d([Cu^{II}]/[Cu^{II}]_0)/dt$ were determined from the first 2 hours of the comproportionation reaction and the results confirm that the comproportionation rate depends on the S/V ratio. After an extended time all 3 experiments reached essentially the same equilibrium conversion of ca. 0.23 of initial $Cu^{II}$, implying the equilibrium position does not depend on the $Cu^0$ surface area, as previously reported for DMSO systems. [Macromol. 2004, 37, 9768-9778.]

The effect of $[Me_6TREN]_0$ on the kinetics and equilibrium of comproportionation was also investigated. FIG. 10(c) shows that, at least in the initial period, the kinetics of comproportionation was weakly affected by the concentration of ligand in the polymerization medium. The reaction with a 2:1 excess of ligand to added $Cu^{II}$ salt deviated from the other reactions after 30 min, presumably because of the larger influence of disproportionation, since its equilibrium conversion was only 10% of $Cu^{II}$.

As outlined in the experimental section, the kinetics and equilibrium position can be used to determine the apparent rate coefficients of comproportionation and disproportionation, in a way similar to that employed for DMSO systems. [Macromol. 2013, 46, 3793-3802.] These values are given in Table 1, with average values of $K_{disp}{}^{L,app}=22$, $k_{comp}{}^{app}=2.4\times10^{7.5}$ cm s$^{-1}$, and $k_{disp}{}^{app}=5\times10^{-4}$ cm s$^{1}$.

Kinetic simulations were performed to determine the contribution of each specific reaction to the overall rate of polymerization. These simulations were needed to accurately determine the concentrations of reagents and resulting reaction rates. The results determined from the simulations are shown in FIG. 11 and FIG. 12 for the polymerization with 30 mM of NaBr added, and the polymerization without addition of NaBr, (0 mM) respectively. Details of the kinetic simulations are outlined in the experimental section.

FIG. 11(a) shows that an aqueous polymerization of OEOA with 30 mM of NaBr added to the polymerization medium is well controlled. This is evidenced by the narrow MWD and good agreement between the simulated degree of polymerization and the degree of polymerization predicted from monomer conversion and the ratio of monomer to alkyl halide initiator, indeed the lines of the individual spectra are essentially superimposable above 10% conversion. FIG. 11(b) gives the concentrations of the various species for a simulation of OEOA polymerized with 30 mM of NaBr added to the system, which can be used to determine the rates of reaction presented in FIG. 11(c). It is important to note that the concentration of $Cu^{II}X/L^+$ is significantly higher than $[Cu^IX/L]$, greater than 2 orders of magnitude higher, indeed the $[Cu^IX/L]$ is only $10^{-6}$ M. As seen in FIG. 11(c) the three dominant reactions are propagation, activation of alkyl halides by $Cu^I$, and deactivation of alkyl halides by $Cu^{II}$. The rates of $Cu^I$ activation and $Cu^{II}$ deactivation reactions match during the whole polymerization, implying that in an ATRP equilibrium is maintained throughout the polymerization, even though disproportionation is thermodynamically favored over comproportionation.

The next class of significant reactions, occurring 3 orders of magnitude slower than activation by $Cu^I$ are the activation by $Cu^0$ and termination. Comproportionation is ca. 1 order of magnitude slower than activation of alkyl halides by $Cu^0$ while disproportionation is 7 orders of magnitude slower than activation of alkyl halides by $Cu^I$, and radical deactivation by $Cu^I$ is negligible. This is because during the controlled polymerization the concentration of $Cu^I$ is very low (ca. 1 μM) due to the very high activity of $Cu^I$ towards activating alkyl halides. This low concentration of $Cu^I$ implies that the rate of disproportionation of $Cu^I$ is low, since the rate of disproportionation is proportional to $[Cu^I]^2$ and therefore disproportionation contributes only slightly to the kinetics of the system, even though it is thermodynamically favored.

This surprising result clearly demonstrates that $Cu^I$ is the major activator, even in strongly disproportionating solvents such as 82% water. Indeed, when less than 2,000 ppm catalyst is added or will be formed, this result indicates that reaction conditions should be selected to generate a low $[Cu^I]$ in order to allow the large excess of $Cu^{II}$ to be responsible for efficient deactivation and provide control in a reaction medium with very high values for $K_{ATRP}$. Furthermore it indicates that a well-controlled ATRP can be conducted in aqueous media comprising a fraction of (co)monomers in the presence of a low concentration/surface area of copper metal, or other reducing agent, or activator regenerator, discussed in incorporated references. Indeed this indicates that while 300 ppm $Cu^{II}$ was added to the low volume of reagents used in the examples in the presence of copper metal with relatively low surface area as the volume of the reaction medium is increased even lower levels of $Cu^{II}$ could be employed as it would be simpler to add known amounts of solid copper surfaces to reduce a lower fraction of added $Cu^{II}$ and maintain an appropriate lower concentration of $Cu^{I}$ to activate the polymerization and still allow efficient deactivation by $Cu^{II}$. The same argument would hold for more polar media such as polymerization of acids.

FIG. 12 presents the simulation data from a system with no added halide salt. FIG. 12(a) illustrates that the polymerization is poorly controlled, forming polymers with high dispersities, and poor agreement between the simulated degree of polymerization and the degree of polymerization predicted from the conversion and ratio of monomer to alkyl halide. The results from FIG. 11(a) and FIG. 12(a) are consistent with the experimental data presented in FIG. 13. FIG. 12(b) provides the concentrations of the species in the polymerization medium as a function of conversion, and FIG. 12(c) presents the reaction rates determined from these concentrations.

One key difference between the system with and without added halide salt is the concentration of the deactivator complex $Cu^{II}X/L^+$. In the system with 30 mM of NaBr, the concentration of $Cu^{II}X/L^+$ is in the order of 0.1 mM, FIG. 11(b), whereas in the absence of added halide salt the concentration of $Cu^{II}X/L^+$ is in the order of 0.1-1 FIG. 12(b). The low concentration of the $Cu^{II}X/L^+$ deactivator complex results in the poor control over the polymerization, due to low deactivation rates. In fact FIG. 12(c) shows that in the absence of added salt, the rates of activation by $Cu^{I}$ and deactivation by $Cu^{II}$ are in balance but they are 2-3 orders of magnitude lower than propagation rate, and only one order of magnitude higher than rate of activation by $Cu^{0}$ thereby resulting in inefficient deactivation and hence a poorly controlled polymerization. Finally, the rate of comproportionation is 1-2 orders of magnitude lower than activation by $Cu^{0}$, and disproportionation and radical deactivation by $Cu^{I}$ are negligible since they occur over 10 orders of magnitude slower than activation by $Cu^{0}$.

The importance of considering the low halidophilicity, $K_{Br}^{II}$, in water is confirmed in by comparing the simulations with no added NaBr and $K_{Br}^{II}=10^2 M^{-1}$ in FIG. 12, which gives poor control, and the simulation provided in FIG. 14 which use $K_{Br}^{II}=10^{6.1} M^{-1}$ and gives good control. FIG. 14 b confirms that the ratio of $Cu^{I}:Cu^{II}$ for a controlled polymerization in a very polar medium is again close to 1:100 as indicated in FIG. 12 b.

Activation of alkyl halides occurs much faster than disproportionation in both DMSO and in aqueous media, as seen in the simulations reported in FIG. 11. This was also demonstrated in model experiments, exemplified by those in FIG. 3, which show that $Cu^{I}$ can be fully converted to $Cu^{II}$ in less than 30 s by activating an excess of alkyl halides, and FIG. 2 which showed no disproportionation when $Cu^{I}$ was dissolved in a mixture containing both a ligand and alkyl halide.

The most important, and surprising, conclusion from the model kinetic studies, polymerizations and simulations, is that although aqueous media does indeed promote both activation of alkyl halides and favorable thermodynamics of $Cu^{I}$ disproportionation, it is not the thermodynamics of the comproportionation/disproportionation processes that distinguish between supplemental activator and reducing agent (SARA) ATRP and prior art examples claiming single electron transfer living radical polymerization (SET-LRP), but rather the kinetics of the reactions. As disclosed herein the presented studies indicate that even in media containing over 80% water, SARA ATRP correctly describes the mechanism, since $Cu^{I}$ is the major activator of alkyl halides and activation of the alkyl halide by $Cu^{I}$ is much faster than $Cu^{I}$ disproportionation. These results indicate that in aqueous media, $Cu^{I}$ is a very powerful activator of alkyl halides, $Cu^{0}$ is a slow supplemental activator of alkyl halides, and that in the polymerization media some comproportionation of $Cu^{0}$ and $Cu^{II}$ can occur, but at a relatively slow rate, Scheme 4.

Although the rate coefficient for disproportionation was found to be relatively higher than in DMSO, the actual contribution of disproportionation is quite small, due to the very low concentration of $Cu^{I}$ that is present in a solution which actually provides a controlled polymerization, which is a result of its high activity. This is due to the scaling of alkyl halide activation as the first power of $[Cu^{I}]$, whereas disproportionation of $Cu^{I}$ scales as the second power of $[Cu^{I}]$, i.e. $[Cu^{I}]^2$. This implies that the high activity of $Cu^{I}$ drives the concentration of $Cu^{I}$ to very low values by activating alkyl halides, and leads to low rates of disproportionation since the value of $[Cu^{I}]^2$ should be even lower.

These results differ from literature conclusions promoted by SET-LRP advocates and agree well with the SARA ATRP mechanism, even in water in the presence of low concentrations of water soluble radically (co)polymerizable monomers, since $Cu^{0}$ is a slow activator of alkyl halides and the concentration of $Cu^{I}$ is very much below the equilibrium concentration required for disproportionation, ca. 10-20%. This is a manifestation of the competitive equilibria phenomenon that applies to various RDRPs, including polymerization in the presence of $Cu^{0}$.

In summary it was determined by simulations using equilibrium constants and rate coefficients determined in aqueous media that in a polymerization medium containing 18 wt % OEOA, the rate constant of $Cu^{I}$ activation of alkyl halides was $>10^2$ times higher than in DMSO. In the polymerization medium, the concentration of Cu species are defined by the ATRP equilibrium with a very low concentration of very reactive $Cu^{I}$ species (<1 μM) resulting in minimal disproportionation. Model studies showed that comproportionation occurred with the equilibrium favoring disproportionation although both reactions are relatively slow. The kinetic simulations confirm that the high activity of $Cu^{I}$ towards alkyl halide activation ensures that it is the major activator of alkyl halides. A high concentration of $Cu^{II}$ is the major deactivator of radicals, and its rate matches that of $Cu^{I}$ activation, thereby providing a controlled SARA ATRP system.

Scheme 4: Degree of contributing reactions to aqueous ATRP shown by thickness of arrows.

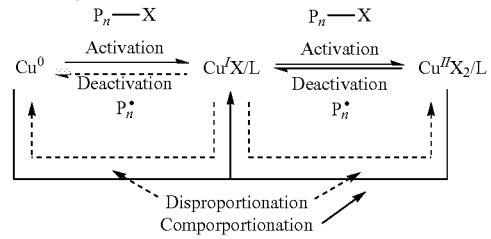

Taking all these unexpected results into consideration polymerizations were performed in aqueous media, confirming that excellent control can be attained in the presence of ≤600 ppm of soluble $Cu^{II}$, and an excess of halide salt. This concentration of soluble $Cu^{II}$ essentially provides transparent colorless solutions and represents a 15 fold reduction in soluble Cu relative to previous work employing pre-disproportionation of ca. 10,000 ppm $Cu^I$ species in water and provides industrially viable conditions for conducting an ATRP polymerization in water in the absence of additional reducing agents in addition to simplifying purification procedures if they are required for the application.

The procedure employed to determine the kinetics of the reactivation process resulted in the inventors realizing that other activator regenerator procedures they had developed should also work under the conditions defined by this modelling study. Of immediate relevance is that the utilized activator regenerator could be any of the zero valent transition metals disclosed in U.S. Pat. No. 6,541,580, preferentially $Cu^0$, $Fe^0$ for specific reduction of $Cu^{II}$ and $Fe^{III}$ respectively, while $Ag^0$ or inorganic sulfites would also be suitable for reduction of $Cu^{II}$ and $Fe^{III}$ or any other transition metal selected for the ATRP. [*Polymer Chemistry* 2013, 4, 5629-5636; *J Am Chem Soc* 2015, 137, 1428-1431.] The critical requirement is that the amount of activator regenerator should be selected to provide a suitable ratio of $Cu^I$ to $Cu^{II}$. This targeted ratio would depend on the polarity of the polymerization medium with the ratio decreasing as the polarity of the reaction medium increases.

The data provided herein makes determining the correct ratio a relatively short simple experimental procedure for a selected set of monomers at different ratios of monomer to water. Polymerization conditions can be optimized to provide for fast reactions, due to the polar nature of the polymerization medium, while employing low concentrations of catalyst.

The fact that the ratio of $Cu^I$ to $Cu^{II}$ is so low in the successful aqueous SARA ATRP determine above indicated that electrochemically controlled ATRP [*Angew. Chem. Int. Ed.;* 2011, 50, 11391-11394; *Macromolecules* 2013, 46, 4346-4353.] could also be conducted in aqueous media if an appropriate applied current was employed to generate a low fraction of $Cu^I$ activator species which is then distributed throughout the reaction medium by vigorous stirring.

Photoinduced ATRP was also successfully performed in aqueous media. Good control was obtained for the polymerization of oligo(ethylene oxide) methyl ether methacrylate (OEOMA) in the presence of $CuBr_2$ and tris(2-pyridylmethyl)amine (TPMA) ligand when irradiated with a visible light of 392 nm wavelength at 0.9 mW/cm² intensity, FIG. 20 (*c*). In this particular series of experiments the ligand acted as the activator regenerator as shown in Scheme 5, however other specific photo-responsive reducing agents discussed by Hawker [*J. Am. Chem. Soc.* 2014, 136, 16096] and Miyake [*Macromolecules* 2014, 47, 8255-8261] would also work.

Scheme 5. Photoinduced ATRP in aqueous media.

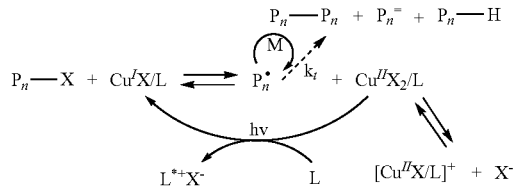

Figure 20:
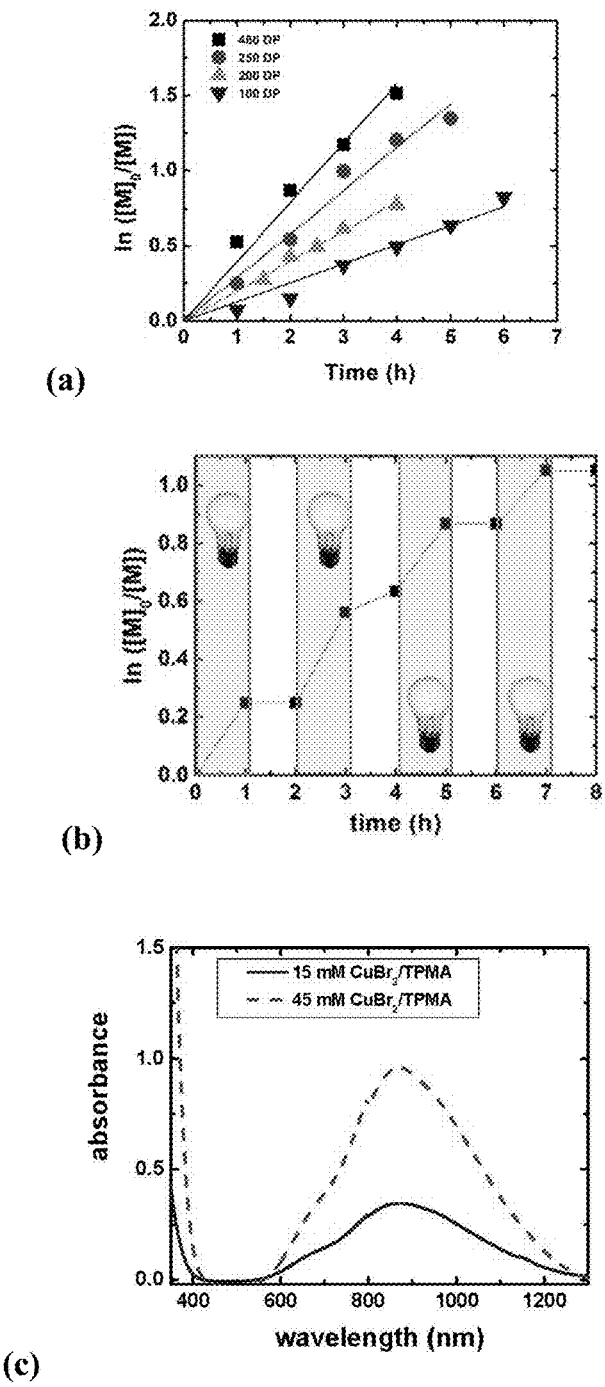

Linear semilogarithmic kinetic plots and increasing molecular weight with conversion were observed during the polymerization process, FIG. 20. It was observed that in the absence of added salt polymerizations with less than 220 ppm catalyst were not controlled due to a reduction in concentration of the deactivator due to dissociation of the halogen atom however polymers of OEOMA were synthesized with low dispersity ($M_w/M_n$=1.12) using only 22 ppm of copper catalyst in the presence of excess bromide anions in a high diluted (90% v/v) aqueous media. The effect of copper concentration, salt and targeted degrees of polymerization were investigated. The polymerization could be directly regulated by external stimulation, switching the irradiation on/off, and the retention of chain end functionality was proved through the chain extension of OEOMA polymer thereby enabling synthesis of materials for novel applications due to its low catalyst loading and absent the introduction of any other chemicals.

In one embodiment of the invention a controlled ATRP in aqueous media, preferably greater than 50% water, is conducted with the addition of ppm levels of a higher oxidation state transition metal salt in the presence of an excess of a salt comprising a (pseudo) halide counterion and in the presence of an activator regenerator thereby allowing polymerizing radically polymerizable monomers at a temperature of between about −4° C. and 110° C., preferentially between 0° C. and 50° C.

In one embodiment of the invention the controlled polymerization reaction occurs in the presence of an aqueous system comprising a partially soluble transition metal complex that participates in a reversible reduction-oxidation cycle with at least one of a site specific functional initiator and a dormant polymer chain having a radically transferable atom or group, wherein the concentration of the soluble catalyst complex is less than or equal to 2500 ppm, preferentially less than 1000 ppm and more preferentially less than 600 ppm and the reaction is conducted in the presence of a solid transition metal in the zero oxidation state which acts as the activator regenerator wherein the mole fraction of transition metal in a lower, activator oxidation state to transition metal in an higher, deactivator oxidation state is less than 1:10, and in certain conditions of high polarity reaction medium less than 1:100, and a molar excess ligand that forms the soluble complex with the transition metal catalyst wherein the formed polymer chains have a dispersity, or Mw/Mn, of less than 1.5.

The solid transition metal in the zero oxidation state can be present in the reaction medium in a physical state that is easily removed from the reaction during the polymerization to control any undesired exotherm and can be reinserted to the reaction medium after thermal control is reestablished and restart the reaction, and can be easily removed from the final reaction medium after the (co)polymerization reaction is complete.

In one embodiment of the invention SARA ATRP can be carried out in aqueous media with low concentrations of soluble catalyst. The DP of resulting (co)polymers increase linearly with monomer conversion and semilogarithmic kinetic plots are linear.

In one non-limiting example of water soluble monomers the successful formation of the block copolymers confirms the living nature of the SARA ATRP of N-isopropylacrylamide in aqueous media. Thus, conducting SARA ATRP under appropriate conditions, without pre-disproportionation of high concentrations of $Cu^I/L$ complexes, indeed in the presence of low concentrations of Cu species, $[Cu^{II}/L]_0$= or less than 500 ppm, optionally less than or equal to 300 ppm, is an efficient synthetic route for functional water-soluble derivatives of acrylates and acrylamides with controlled chain lengths, narrow molecular weight distributions and high retention of chain end functionality. The supplemental activator and reducing agent can be a transition metal in zero oxidation state including but not limited to copper, iron and silver in addition to inorganic sulfites.

In another embodiment of the invention the activator regenerator can comprise an external stimulation agent such as an electric current or a photo-stimulated reduction reaction.

EXPERIMENTAL SECTION AND DISCUSSION OF RESULTS

Materials

All chemicals were purchased from commercial suppliers, e.g., Aldrich, TCI, Alfa Aesar and used as received, unless otherwise stated. Tris(2-(dimethylamino)ethyl)amine ($Me_6TREN$) was synthesized as reported in the literature. Oligo(ethylene oxide) monomethyl ether acrylate of molecular weight 480 ($OEOA_{480}$) was passed over a column filled with basic alumina to remove inhibitor prior to use. Metallic copper ($Cu^0$, diameter 1 mm) was washed with HCl in methanol and subsequently rinsed with methanol and dried under a stream of nitrogen following literature procedures.

Instrumentation.

Gel permeation chromatography (GPC): GPC was used to determine number average molecular weight ($M_n$) and $M_w/M_n$ values. The GPC was conducted with a Waters 515 HPLC Pump and Waters 2414 Refractive Index Detector using PSS columns (Styrogel $10^2$, $10^3$, $10^5$ Å) in tetrahydrofuran (THF) as an eluent at a flow rate of 1 mL/min at 35° C. The column system was calibrated with 12 linear poly(methyl methacrylate) (PMMA, $M_n$=800~2,570,000) standards.

NMR:

Monomer conversion was measured using $^1H$ NMR spectroscopy, using a Bruker Avance 500 MHz spectrometer at room temperature.

UV-Visible Spectroscopy:

All characterizations were performed using an Agilent 8453 UV-Vis Spectrometer.

Electrochemistry:

Cyclic voltammetry was performed with an Autolab PGSTAT30 potentiostat (Eco-Chimie, Utrecht, Netherlands), controlled by a PC through Gpes program. All experiments were carried out in a thermostated three-electrode cell with a glassy carbon (GC) working electrode, a Pt counter-electrode and saturated calomel reference electrode. The supporting electrolyte was 0.1 M tetraethylammonium tetrafluoroborate. 1 mM solutions of $[Cu^{II}Me_6TREN]^{2+}$ in $H_2O$ or 18 wt % OEOA in water were prepared in situ by mixing equimolar amounts of $Cu(OTf)_2$ (OTf=trifluoromethansulfonate) and $Me_6TREN$ in the chosen solvent. The GC electrode was a 3 mm diameter disc embedded in glass, which was fabricated from a GC rod (Tokai, GC-20) and polished to a mirror finish with silicon carbide papers and diamond paste. Before every experiment it was cleaned by polishing with a 0.25 μm diamond paste followed by ultrasonic rinsing in ethanol for about 5 minutes.

Digital simulation of cyclic voltammetry was carried out with the program DigiSim 3.03b (Bioanalytical Systems)

Preparation of Stock Solutions:

Water was vigorously bubbled with nitrogen for at least 30 min prior to use and stored in a Schlenk flask. All stock solutions were prepared by adding the solid components to a Schlenk flask, sealing the Schlenk flask, followed by the evacuation and backfilling with nitrogen at least 4 times prior to addition of the liquid components followed by the addition of deoxygenated water.

Example 1 Synthesis of oligo(ethylene oxide) 2-bromopropionate

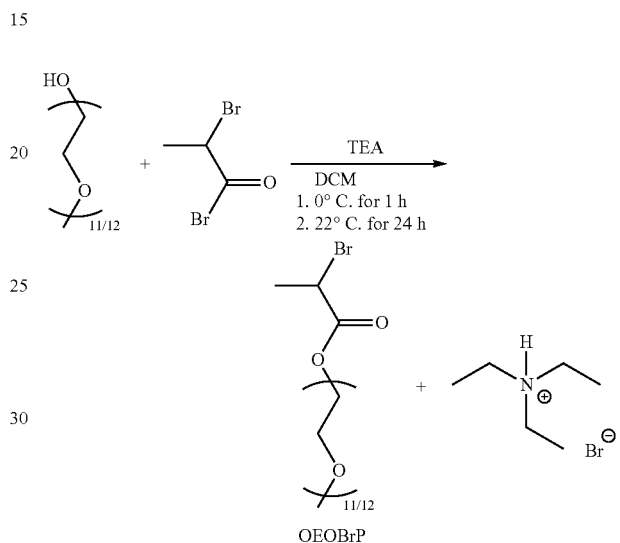

OEOBrP

Oligo(ethylene oxide) monomethyl ether with number-averaged molecular weight 550 (6.64 g, 0.012 mol) was added to a flask followed by addition of 150 mL of dichloromethane (DCM) and triethylamine (6.31 g, 0.062 mol) and the reagents were allowed to combine under stirring and the flask and contents cooled to 0° C. Subsequently, 2-bromopropionyl bromide (11.02 g, 0.51 mol) was slowly added and the reaction mixture was stirred at 0° C. for 1 h, followed by stirring at 22° C. for 24 h. The reaction mixture was washed 4 times with 100 mL of dilute hydrochloric acid, followed by 4 washes with a dilute sodium carbonate solution. The majority of the DCM was removed under reduced pressure, and the product was added drop wise to diethyl ether, followed by removal of the volatiles and dissolution of the product in a small amount dichloromethane. The product was precipitated by addition of the solution to hexanes, and the viscous liquid collected and dried under reduced pressure to give oligo(ethylene oxide) monomethyl ether 2-bromopropionate (OEOBrP) (7.23 g, 0.0105 mol, 88% yield). The purity was established to be greater than 96% by NMR.

Experiment Directed at Understanding the Kinetics

Model disproportionation experiment in water: $Cu^IBr$ (1.4 mg, 0.0098 mmol) was added to a Schlenk flask then the flask was sealed with a stopper connected to a cuvette, and evacuated and backfilled with nitrogen 4 times. A second Schlenk flask was sealed with a glass stopper and then briefly evacuated and backfilled with nitrogen 4 times. $Me_6TREN$ (13.8 mg, 0.06 mmol) was added to this flask, followed by deoxygenated water (6 mL). The mixture was homogenized by vigorous shaking. 5 mL of this 10 mM solution of Me₆TREN in water was taken and added with vigorous shaking to the reaction flask containing Cu$^I$Br. The reaction flask was shaken continuously for 45 min, except when the times when evolution of Cu$^{II}$Br₂ was monitored by UV-Vis-NIR spectroscopy.

Model Disproportionation Experiment and Activation Experiment in OEOA/Water:

Cu$^I$Br (1.4 mg, 0.0098 mmol) was added to a Schlenk flask then the flask was sealed with a stopper connected to a cuvette, and evacuated and backfilled with nitrogen 4 times. OEOA (1.08 g, 2.25 mmol) was added to a second Schlenk flask which was sealed with a glass stopper and then briefly evacuated in backfilled with nitrogen 4 times. Me₆TREN (13.8 mg, 0.06 mmol) was added to this flask, followed by deoxygenated water (5 mL). The mixture was homogenized by vigorous shaking. 5 mL of this 10 mM Me₆TREN in OEOA/water solution was taken and added with vigorous shaking to the reaction flask containing Cu$^I$Br. The reaction flask was shaken continuously for 20 min, except when the evolution of Cu$^{II}$Br₂ was monitored by UV-Vis-NIR spectroscopy. Subsequently, 2-hydroxyethyl α-bromoisobutyrate (HEBiB) (53 mg, 0.25 mmol) was added and the reaction mixture homogenized, and the UV-Vis-NIR spectrum was measured 30 s after the addition of HEBiB. The flask was then shaken for an additional 30 min, except when UV-Vis-NIR spectrum were being measured.

Model Cu$^I$Br Activation Experiment in OEOA/Water:

Cu$^I$Br (1.4 mg, 0.0098 mmol) was added to a Schlenk flask, the flask was sealed with a stopper connected to a cuvette, and evacuated and backfilled with nitrogen 4 times. OEOA (1.08 g, 2.25 mmol) was added to a second Schlenk flask which was sealed with a glass stopper and then briefly evacuated in backfilled with nitrogen 4 times. Me₆TREN (13.8 mg, 0.06 mmol) was added to this flask followed by deoxygenated water (5 mL) and HEBiB (63 mg, 0.30 mmol). The mixture was homogenized by vigorous shaking then 5 mL of this 10 mM Me₆TREN and 50 mM HEBiB in OEOA/water solution was taken and added with vigorous shaking to the flask containing the Cu$^I$Br. The reaction flask was shaken continuously for 30 min, except when the evolution of Cu$^{II}$Br₂ was monitored by UV-Vis-NIR spectroscopy.

Typical Cu$^0$ Activation Experiment:

OEOBrP (61.7 mg) and OEOA (0.75 g) were added to a clean Schlenk flask equipped with a magnetic stirrer bar, followed by addition of a piece of Cu$^0$ wire (length=10 cm, diameter=1 mm). The flask was sealed with a stopper connected to a quartz cuvette, and briefly evacuated and backfilled with nitrogen at least 4 times prior to the addition of deoxygenated water (3.2 mL). The solution was bubbled with nitrogen for 5 min. Finally, 0.5 mL of a deoxygenated stock solution containing 180 mM Me₆TREN was added and the initial UV-Vis spectrum was measured. The kinetics of the formation Cu$^{II}$Br₂/Me₆TREN were measured by UV-Vis spectrometry. Due to the presence of two different Cu$^{II}$Br₂ complexes in the monomer/water solution, a deconvolution of the raw spectrum was needed to determine the total concentration of Cu$^{II}$ species. This complex Cu$^{II}$ spectrum was quantitatively solved for the Cu$^{II}$, by monitoring the UV-Vis-NIR spectrum for a system with a fixed concentration of Cu$^{II}$ over time.

Typical Voltammetric Determination of Rate Coefficients for Alkyl Halide Activation by Cu$^I$:

Cu(OTf)₂ (5.43 mg, 15.0 mmol) and Me₆TREN (3.64 mg, 15.8 mmol) were added to an electrochemical cell complete with electrodes and stirring bar, and containing 15 mL of water (or 18 wt % OEOA in water). When the reaction was conducted in the H₂O-OEOA solution a large excess of 2,2,6,6-tetramethyl-1-piperdinyloxy (TEMPO, 150 mmol) was added. After purging the solution with argon a series of voltammograms were recorded at different scan rates in a potential range (0.1--0.7 V) around the redox potential of the copper complex. A certain amount of initiator, chosen to give a fixed value of the excess factor $\gamma = C_{RX}/C_{[Cu^{II}L]^{2+}}$ was then added and a new set of cyclic voltammograms was run using the same scan rates employed in the previous series. This last step was repeated once more with a new addition of initiator.

Typical Comproportionation Experiment:

OEOA (0.81 g) was added to a clean Schlenk flask equipped with a magnetic stirrer bar followed by addition of the Cu$^0$ wire (length=10 cm, diameter=1 mm). The flask was sealed with a stopper connected to a quartz cuvette, and briefly evacuated and backfilled with nitrogen at least 4 times. Water (3.2 mL) was then added to this flask and the solution was bubbled with nitrogen for 5 min. Finally, 0.5 mL of an aqueous stock solution containing 22.5 mM Cu$^{II}$Br₂ and 180 mM Me₆TREN was added and the initial sample was measured by UV-Vis spectrometry. The disappearance of Cu$^{II}$Br₂/Me₆TREN over time was measured by UV-Vis spectrometry. Due to the presence of two different Cu$^{II}$Br₂ complexes in the monomer/water solution, a deconvolution of the raw spectrum was needed to determine the total concentration of Cu$^{II}$ species.

Typical Polymerization Experiment, with Initial Addition of Cu$^{II}$Br₂:

OEOA₄₈₀ (1.10 g, 2.29 mmol) was added to a clean Schlenk flask equipped with a magnetic stirrer bar. The flask was sealed with a glass stopper, or a stopper connected to a quartz cuvette, and briefly evacuated and backfilled with nitrogen at least 4 times. Deoxygenated water (4.5 mL) previous bubbled with nitrogen for 60 min, 70 µL of a deoxygenated stock solution containing 66 mM Me₆TREN, Cu$^0$ (length=10 cm, diameter=1 mm), 20 µL of a deoxygenated stock solution containing 12 mM Cu$^{II}$Br₂ and NaBr (18.5 mg, 0.181 mmol) were then added to this flask. Finally, the mixture was bubbled with nitrogen for another 10 min and 0.4 mL of a deoxygenated stock solution containing 57 mM HEBiB was added. The kinetics of polymerization was measured by taking small samples periodically from the reaction mixture. Additionally, in one experiment the evolution of Cu$^{II}$Br₂ over time was monitored by UV-Vis-NIR spectroscopy. Due to the presence of two different Cu$^{II}$Br₂ complexes in the monomer/water solution, a deconvolution of the raw spectrum was needed to determine the total concentration of Cu$^{II}$ species.

Typical Polymerization Experiment, without Initial Addition of Cu$^{II}$Br₂:

OEOA₄₈₀ (1.10 g, 2.29 mmol) was added to a clean Schlenk flask equipped with a magnetic stirrer bar. The flask was sealed with a glass stopper, and briefly evacuated and backfilled with nitrogen at least 4 times then deoxygenated water (4.1 mL) previous bubbled with nitrogen for 60 min, 0.4 mL of a deoxygenated stock solution containing 11.4 mM Me₆TREN, a piece of Cu$^0$ wire (length=10 cm, diameter=1 mm) and NaBr (18.5 mg, 0.181 mmol) were added. Finally, the mixture was bubbled with nitrogen for another 10 min and 0.5 mL of a deoxygenated stock solution containing 45.7 mM HEBiB was added. The kinetics of polymerization was measured by taking small samples from the reaction mixture.

Additional Characterization

Evolution of Cu Concentration, as Measured by UV-Vis-NIR Spectroscopy:

The UV-Vis-NIR spectrum was measured in a polymerization experiment, as a function of time for polymerization reactions under the conditions: $[OEOA]_0:[HEBiB]_0:[Cu^{II}Br_2]_0:[Me_6TREN]_0=100:1:0.01:0.2$, $[OEOA]=0.41$ M, 10 cm of $Cu^0$ wire (d=1 mm) in 6 mL with 30 mM of NaBr added at 22° C. Initially the $Cu^{II}$ concentration is low, but in 45 min it reaches a much higher value, which is approximately the same time as the end of the 106 min induction period.

The Effect of Initially Added $Cu^{II}Br_2$ on the Polymerization:

The effect of initially added $Cu^{II}Br_2$ on polymerizations under the conditions: $[OEOA]_0:[HEBiB]_0:[Cu^{II}Br_2]_0:[Me_6TREN]_0=100:1:x:0.2$ (where x=0 or 0.01 for 0 or 100 ppm), $[OEOA]=0.41$ M, 10 cm of $Cu^0$ wire (d=1 mm) in 6 mL with 30 mM of NaBr added at 22° C. and graphs of the evolution of monomer conversion with time and the evolution of $M_n$ and $M_w/M_n$ with conversion displayed little difference although the final MWD of the reaction conducted in the presence of 100 ppm $CuBr_2$ was lower ~1.14.

The Effect of the Concentration of Monomer on the Polymerization:

Polymerization were conducted using either 18 wt % monomer, or 50 wt % monomer under the conditions $[OEOA]_0:[HEBiB]_0:[Cu^{II}Br_2]_0:[Me_6TREN]_0=100:1:0.01:0.2$ with 10 cm of $Cu^0$ wire (d=1 mm) gave similar results. A longer induction period was observed for the 50 wt % case, 75 min vs. 45 min, and higher $M_w/M_n$ values were also observed, 1.3 vs 1.16.

Model Activation Experiments in 18 wt % OEOA in Water:

As seen in FIG. 2 there was a slow increase in absorbance due to an increase in the concentration of $Cu^{II}$ with time. This is presumably due to slow dissolution of $Cu^IBr$ since there is no visible precipitate resulting from disproportionation and there is only weak absorbance in the region 350-450 nm, unlike that the strong absorbance due to $Cu^I$ seen in FIG. 1 before adding HEBiB.

Dependence of the Activation Rate Coefficient of OEOBrP by $Cu^0$ with $[Me_6TREN]_0$:

Values for $k_{a0}^{app}$ were obtained from activation experiments under the conditions: $[OEOBrP]_0=20$ mM, 18% OEOA in water, 10 cm $Cu^0$ wire (d=1 mm) in 4.5 mL at 22° C. with different $[Me_6TREN]_0$ and it was observed that the ligand concentration seems to only have a strong effect on the value of $k_{a0}^{app}$ below a certain minimal concentration, which seems to be 2.5 mM for $Me_6TREN$ which is qualitatively consistent with literature reports in DMSO. [Percec, V. et. al.; *J. Polym. Sci., Part A: Polym. Chem.* 2009, 47, 5629; Matyjaszewski, K.; et. al.; *Macromolecules* 2013, 46, 3803; and Nicolas, J.; et al., *Macromolecules* 2012, 45, 7388]

Determination of the Activation Rate Coefficient of OEOBrP and HEBiB by $Cu^I/Me_6TREN$ in $H_2O$ and 18% wt OEOA in $H_2O$:

Cyclic voltammetry was used to determine the activation rate coefficients of the initiators OEOBrP and HEBiB. An example of a set of CVs showing the effect of scan rate on the catalytic current enhancement is shown in FIG. 5. After measuring the peak currents of all CVs, the catalytic current enhancement $I_{p,c}/I_{p,d}$ ($I_{p,c}$ and $I_{p,d}$ are the peak currents measured for the copper complex in the presence and absence of initiator, respectively) was calculated for each scan rate, giving two sets of $I_{p,c}/I_{p,d}$ versus v values. $I_{p,c}/I_{p,d}$ depends on a kinetic parameter $\lambda=RTk_{a1}C_{[Cu^{II}L]^{2+}}/Fv$ and theoretical working curves relating it to such a parameter can be constructed by digital simulation of the voltammetric response of the catalytic system. Fitting of the experimental data to such working curves allowed determination of $k_{a1}$.

Table 1 lists the sequence of reactions occurring during cyclic voltammetry of $[Cu^{II}L]^{2+}/RX$ as well as the kinetic and thermodynamic parameters required to carry out digital simulations. The standard reduction potential of $[Cu^{II}L]^{2+}$ was measured by cyclic voltammetry, whereas the Nicholson method [*Anal. Chem.* 1965, 37, 1351] was used to determine the standard electron transfer rate coefficient $k_s$. The transfer coefficient α was assumed to be 0.5. Since a new peak couple was not observed when $Br^-$ was added to a solution of $[Cu^{II}Me_6TREN]^{2+}$, it was assumed that the two complexes have identical redox properties, in other words the two complexes had the same halidophilicities. In the literature, the $K_{ATRP}$ for the reaction between HEBiB and $Cu^I/TPMA$ in water has been reported to be 0.15. [*Angew. Chem. Int. Ed.* 2011, 50, 11391] We used that value for the simulations of cyclic voltammetry data and determination of activation rate coefficients in all aqueous systems investigated and reported in this application.

The association constant between $Br^-$ and $[Cu^{II}Me_6TREN]^{2+}$ is $K_{Br}^{II}=4.4$ $M^{-1}$ in pure water. [*Inorg. Chim. Acta* 1997, 255, 111.] Herein it was assumed that the association/dissociation equilibria are fast so that they constituted conditions of pre-equilibrium for the activation step. Therefore, a large value for $k_{Br}^{II}=k_{Br}^{I}=10^4$ $M^{-1}$ $s^{-1}$ was used. Simulations have shown that the degree of catalysis becomes independent of $k_{Br}^{II}$ and $k_{Br}^{I}$ for sufficiently large values.

The final important parameters required by the simulation program are the diffusion coefficients of the reagents $[Cu^{II}Me_6TREN]^{2+}$, OEOBrP and HEBiB. They were determined by cyclic voltammetry of the compounds, according to the following equations valid for reversible (eq. 8) and irreversible (eq. 8) systems at 25° C.:

$$I_p=(2.69\times10^5)n^{3/2}AD^{1/2}Cv^{1/2} \quad (8)$$

$$I_p=(2.99\times10^5)\alpha^{1/2}nAD^{1/2}Cv^{1/2} \quad (9)$$

where n is the number of exchanged electrons, D is the diffusion coefficient, A is the area of the electrode and α is the transfer coefficient. The values of D obtained using eq. 8 for the copper complex and eq. 9 for the initiators are reported in Table 2.

TABLE 1

Parameters for the digital simulation of cyclic voltammetry of catalytic activation of RX by $[Cu^IMe_6TREN]^+$.

| Reaction [a] | $H_2O$ | $H_2O:OEOA = 82:18$ |
|---|---|---|
| $[Cu^{II}L]^{2+} + e^- \rightleftharpoons [Cu^IL]^+$ | $E^\theta = -0.48$ V; $k_s = 10^{-2}$ cm s$^{-1}$; α = 0.5 | $E^\theta = -0.34$ V; $k_s = 1.5 \times 10^{-3}$ cm s$^{-1}$; α = 0.5 |
| $[Cu^IL]^+ + RX \rightleftharpoons [XCu^{II}L]^+ + R^*$ | $K_{ATRP} = 0.15$ [2] | $K_{ATRP} \geq 10^{-4}$ [b] |

TABLE 1-continued

Parameters for the digital simulation of cyclic voltammetry of catalytic activation of RX by [Cu$^I$Me$_6$TREN]$^+$.

| Reaction [a] | H$_2$O | H$_2$O:OEOA = 82:18 |
|---|---|---|
| [XCu$^{II}$L]$^+$ ⇌ [Cu$^{II}$L]$^{2+}$ + X$^-$ | $K_{Br}^{II}$ = 4.4 M$^{-1}$; [3] $k_{Br}^{II}$ = 10$^4$ M$^{-1}$s$^{-1}$ | $K_{Br}^{II}$ = 10$^2$ M$^{-1}$ [c] $k_{Br}^{II}$ = 10$^4$ M$^{-1}$s$^{-1}$ |
| [XCu$^{II}$L]$^+$ + e$^-$ ⇌ [XCu$^I$L] | $E^\theta$ = −0.48 V $k_s$ = 10$^{-2}$ cm s$^{-1}$; α = 0.5 | $E^\theta$ = −0.34 V $k_s$ = 1.5 × 10$^{-3}$ cm s$^{-1}$; α = 0.5 |
| [XCu$^I$L] ⇌ [Cu$^I$L]$^+$ + X$^-$ | $K_{Br}^{I}$ = 4.4 M$^{-1}$ $k_{Br}^{I}$ = 10$^4$ M$^{-1}$s$^{-1}$ | $K_{Br}^{I}$ = 10$^2$ $k_{Br}^{I}$ = 10$^4$ M$^{-1}$s$^{-1}$ |
| R* + R* → R−R | $k_{t0}$ = 2.7 × 10$^8$ M$^{-1}$s$^{-1}$ [d] | $k_{t0}$ = 2.7 × 10$^8$ M$^{-1}$s$^{-1}$ [d] |
| R* + TEMPO → R-TEMPO | | $k_{tT}$ = 10$^8$ M$^{-1}$s$^{-1}$ [4] |

[a] L = Me$_6$TREN, X = Br, RX = OEOBrP or HEBiB; T = 25° C.
[b] K$_{ATRP}$ in 18 wt % OEOA in water is expected to be lower than in water, but simulations with values as small as 10$^{-4}$ do not affect the simulation results, see FIG. 6.
[c] Estimated value, taking into consideration medium effects. In pure water, K$_{Br}^{II}$ = 4.4 M$^{-1}$, [Inorg. Chim. Acta 1997, 255, 111.] therefore the value K$_{Br}^{II}$ = 10$^2$ M$^{-1}$ was chosen to account for the lower polarity of the reaction medium.
[d] Estimated for tertiary radicals in 18% PEO-400 in H$_2$O at room temperature. [Macromol. 2009, 42, 6348-6360.]

TABLE 2

Diffusion coefficients of [Cu$^I$Me$_6$TREN]$^+$, HEBiB and OEOBrP at 25° C.

| | H$_2$O | H$_2$O-OEOA 82:18 |
|---|---|---|
| Substrate | 10$^6$ D (cm$^2$ s$^{-1}$) | 10$^6$ D (cm$^2$ s$^{-1}$) |
| [Cu$^I$Me$_6$TREN]$^+$ | 2.2 | 0.78 |
| OEOBrP | 3.1 | 0.28 |
| HEBiB | 6.0 | |

Voltammetric simulations were carried out for a large number of λ values and the results were plotted as $I_{p,c}/I_{p,d}$ versus log λ. To simplify the comparison between experimental and simulated data, the latter were first fit to appropriate functions that perfectly interpolate all data. Two equations (eqs. 10 and 11) were used, depending on whether the theoretical curve presents a maximum or a plateau and examples of the fittings are reported in FIG. 6.

$$y = y_0 + a\left[\frac{b}{1+\exp\left(\frac{x-x_{01}}{c}\right)} + \frac{1-b}{1+\exp\left(\frac{x-x_{02}}{d}\right)}\right] \quad (10)$$

$$y = y_0 + ax + bx^2 + cx^3 + dx^4 + ex^5 + fx^6 \quad (11)$$

where $y_0$, a, b, c, d, e, f, $x_{01}$ and $x_{02}$ are fitting parameters.

The procedure for the determination of $k_{a1}$ was as follows. The experiment was carried out with fixed values of γ and a set of $I_{p,c}/I_{p,d}$ versus log λ'=log(RTC$_{[Cu^{II}L]^{2+}}$/Fv) values was calculated for each γ value. The theoretical working curves were then constructed and fitted to eq. 10 or 11 to define the constants in the equation. The experimental data were finally fitted to the appropriate equation by defining y=$I_{p,c}/I_{p,d}$ and x=log λ'+log k, with k=$k_{a1}$ as the only adjustable parameter.

In the simulations of the catalytic system in 18 wt % OEOA in water K$_{ATRP}$ is not known but is expected to be much lower than value of 0.15 observed in pure water. To take this possibility into consideration a series of simulations with different K$_{ATRP}$ values were carried out and the results are reported in FIG. 8. As clearly shown in the figure the theoretical curves calculated with K$_{ATRP}$≥10$^{-4}$ are indistinguishable in the range of experimental values and fitting of experimental data to any one of them gives the same $k_{a1}$ value. The degree of catalysis decreases only when K$_{ATRP}$≤10$^{-5}$ are used which clearly shows that knowledge of K$_{ATRP}$ is not critical to the application of this method provided that the equilibrium constant is greater than a threshold value.

Evolution of UV-Vis-NIR Spectrum of Cu$^{II}$Br$_2$/Me$_6$TREN in Pure Water:

As seen in FIG. 9, there is no change in the UV-Vis-NIR spectrum for Cu$^{II}$Br$_2$/Me$_6$TREN over time, indicating that no comproportionation is occurring in pure water. This is in stark contrast to the case in OEOA (18 wt %) in water.

Disproportionation Equilibrium Constants, Comproportionation and Disproportionation Rate Coefficients:

As highlighted in the literature, [Macromol. 2013, 46, 3793] when comproportionation experiments are performed, the comproportionation rate coefficient, corrected for the S/V ratio, can be determined from the slope of Cu$^{II}$ evolution and the $K_{disp}^L$ value using the following equation:

$$k_{comp}^{app} = \frac{1}{t}\frac{V}{S}\int_0^{conv}\frac{r-1-c}{(1+c)(r-1-c)-K_{disp}^L(2c)^2}dc \quad (12)$$

where t is the time, r is the ratio of ligand to initial Cu$^{II}$, c is the integrand conversion up until that point which reached value cony. In this work, a discrete integration was performed and the integral is plotted against time. The slope of this integral is $k_{comp}^{app}$, and $k_{disp}^{app}$ is determined from the $K_{disp}^L$ value.

$$K_{disp}^L = \frac{[L]_{eq}[Cu^{II}Br_2/L]_{eq}}{[Cu^I Br/L]_{eq}^2} = \frac{k_{disp}^{app}}{k_{comp}^{app}} \quad (13)$$

Each comproportionation experiment was subject to this treatment, and the values of the comproportionation and disproportionation coefficients are given in Table 3.

TABLE 3

Conditions and disproportionation/comproportionation rate coefficients and equilibrium constant for disproportionation of 2.5 mM of $[Cu^{II}Br_2]_0$ with an excess $Me_6TREN$ in 18% OEOA at 22° C.

| Entry | Length $Cu^0$/cm (wire d = 1 mm) | S/V (cm$^{-1}$) | Ratio $[Cu^{II}]_0/[Me_6TREN]_0$ | $K_{disp}^L$ | $k_{comp}^{app}$ (cm s$^{-1}$) | $k_{disp}^{app}$ (cm s$^{-1}$) |
|---|---|---|---|---|---|---|
| 1 | 20 | 1.40 | 8 | 22 | $2.3 \times 10^{-5}$ | $5.1 \times 10^{-4}$ |
| 2 | 5 | 0.35 | 8 | 22 | $2.5 \times 10^{-5}$ | $5.5 \times 10^{-4}$ |
| 3 | 10 | 0.70 | 8 | 27 | $2.7 \times 10^{-5}$ | $7.3 \times 10^{-4}$ |
| 4 | 10 | 0.70 | 4 | 18 | $2.5 \times 10^{-5}$ | $4.5 \times 10^{-4}$ |
| 5 | 10 | 0.70 | 2.1 | 23 | $2 \times 10^{-5}$ | $4 \times 10^{-4}$ |

Kinetic Simulation of RDRP of $OEOA_{480}$ in the Presence of $Cu^0$:

PREDICI (version 6.3.2) was used for all kinetic modeling. Table 4 below presents the kinetic model used and all rate coefficients.

TABLE 4

Kinetic Model and Rate Coefficients for Modeling RDRP in the presence of $Cu^0$ at 22° C.

| Reaction [a] | Rate constant [b] |
|---|---|
| $R^\bullet + M \xrightarrow{k_{add}} P_1^\bullet$ | $k_{add} = 1.1 \times 10^3$ M$^{-1}$ s$^{-1}$ ref A |
| $P_n^\bullet + M \xrightarrow{k_p} P_{n+1}^\bullet$ | $k_p = 1.73 \times 10^4$ M$^{-1}$ s$^{-1}$ [c] ref B |
| $P_n^\bullet + P_m^\bullet \xrightarrow{k_{tc}} P_n + P_m$ | $k_{tc} = 1 \times 10^7$ M$^{-1}$ s$^{-1}$ [c] ref C |
| $P_n^\bullet + P_m^\bullet \xrightarrow{k_{td}} P_n^= + P_m - H$ | $k_{td} = 0$ M$^{-1}$ s$^{-1}$ ref D |
| $P_n^\bullet + R^\bullet \xrightarrow{k_{tR}} P_n - R$ | $k_{tR} = 5 \times 10^7$ M$^{-1}$ s$^{-1}$ [d] |
| $R^\bullet + R^\bullet \xrightarrow{k_{t0}} R - R$ | $k_{t0} = 2.7 \times 10^8$ M$^{-1}$ s$^{-1}$ [e] |
| $Cu^0 + Cu^{II}X_2/L + L \xrightarrow{k_{comp}^{app}} Cu^IX/L + Cu^IX/L$ | $k_{comp}^{app} = 2.4 \times 10^{-5}$ cm s$^{-1}$ $k_{comp}^{over} = 1.3 \times 10^{-5}$ s$^{-1}$ this work |
| $Cu^IX/L + Cu^IX/L \xrightarrow{k_{disp}^{app}} Cu^0 + Cu^{II}X_2/L + L$ | $k_{disp}^{app} = 5 \times 10^{-4}$ cm s$^{-1}$ $k_{disp}^{over} = 2.6 \times 10^{-4}$ s$^{-1}$ this work |
| $Cu^I/L^+ + Cu^I/L^+ \xrightarrow{k_{disp}^{app}} Cu^0 + Cu^{II}/L^{++} + L$ | $k_{disp}^{app} = 5 \times 10^{-4}$ cm s$^{-1}$ $k_{disp}^{over} = 2.6 \times 10^{-4}$ s$^{-1}$ this work |
| $Cu^IX/L + Cu^I/L^+ \xrightarrow{k_{disp,cross}^{app}} Cu^0 + Cu^{II}X/L + L$ | $k_{disp,cross}^{app} = 10^{-3}$ cm s$^{-1}$ $k_{disp,cross}^{over} = 5.2 \times 10^{-4}$ [f], this work |
| $Cu^0 + R - X + L \xrightarrow{k_{a0i}^{app}} Cu^IX/L + R^\bullet$ | $k_{a0i}^{app} = 5.6 \times 10^{-5}$ cm s$^{-1}$ $k_{a0i}^{over} = 3 \times 10^{-5}$ s$^{-1}$ this work |
| $Cu^IX/L + R^\bullet \xrightarrow{k_{d0i}^{app}} Cu^0 + R - X + L$ | $k_{d0i}^{app} = 8 \times 10^{-3}$ cm s$^{-1}$ $k_{d0i}^{over} = 4 \times 10^{-3}$ s$^{-1}$ this work |
| $Cu^0 + P_n - X + L \xrightarrow{k_{a0}^{app}} Cu^IX/L + P_n^\bullet$ | $k_{a0}^{app} = 5 \times 10^{-6}$ cm s$^{-1}$ $k_{a0}^{over} = 2.6 \times 10^{-6}$ s$^{-1}$ this work |
| $Cu^IX/L + P_n^\bullet \xrightarrow{k_{d0}^{app}} Cu^0 + P_n - X + L$ | $k_{d0}^{app} = 8 \times 10^{-2}$ cm s$^{-1}$ $k_{d0}^{over} = 4 \times 10^{-2}$ s$^{-1}$ this work |
| $Cu^I/L^+ + R - X \xrightarrow{k_{a1i}} Cu^{II}X/L^+ + R^\bullet$ | $k_{a1i}^{app} = 2.9 \times 10^6$ M$^{-1}$ s$^{-1}$ [g], this work |
| $Cu^{II}X/L^+ + R^\bullet \xrightarrow{k_{d1i}} Cu^I/L^+ + R - X$ | $k_{d1i}^{app} = 5 \times 10^7$ M$^{-1}$ s$^{-1}$ [h] |

TABLE 4-continued

Kinetic Model and Rate Coefficients for Modeling RDRP in the presence of $Cu^0$ at 22° C.

| Reaction [a] | Rate constant [b] |
|---|---|
| $Cu^I/L^+ + P_n - X \xrightarrow{k_{a1}} Cu^{II}X/L^+ + P_n^\bullet$ | $k^{app}_{a1} = 2.5 \times 10^4 \, M^{-1} \, s^{-1}$ [g, this work] |
| $Cu^{II}X/L^+ + P_n^\bullet \xrightarrow{k_{d1}} Cu^I/L^+ + P_n - X$ | $k^{app}_{d1} = 2 \times 10^7 \, M^{-1} \, s^{-1}$ [i] |
| $Cu^I/L^+ + X^- \underset{}{\overset{K^I_{Br}}{\rightleftharpoons}} Cu^I X/L$ | $K^I_{Br} = 10^2 \, M^{-1}$ [j] |
| $Cu^{II}/L^{++} + X^- \underset{}{\overset{K^{II}_{Br}}{\rightleftharpoons}} Cu^{II}X/L^+$ | $K^{II}_{Br} = 10^2 \, M^{-1}$ [j] |

[a] L = $Me_6TREN$, X = Br, R — X = HEBiB, reaction medium is 18 wt % OEOA in $H_2O$.
[b] $k^{over} = k^{app} \times S/V$, where $S = 3.16 \, cm^2$ and $V = 6 \, mL$. The overall rate coefficients are input to the simulation, since they give the rate of activation by $Cu^0$, comproportionation, etc., for the exact surface area of $Cu^0$ and reaction volume used.
[c] Value for Dodecyl Acrylate
[d] Geometric mean of $k_{tc}$ and $k_{t0}$
[e] Estimated for tertiary radicals in 18% PEO-400 in $H_2O$ at room temp. [Braunecker, W.A.; et al.; Macromolecules 2009, 42, 6348.]
[f] The expression for rate of disproportionation, when all $Cu^I$ species are considered collectively, requires doubling of cross-disproportionation reaction rate constant, since only the total formation of $Cu^I$ was measured, not the formation of specific complexes. Therefore as shown in the equation below, a doubling of the cross-disproportionation rate coefficient is necessary.

$$\left(R_{disp} = \frac{k^{app}_{disp}}{[L]}([Cu^IX/L] + [Cu^I/L])^2 = \frac{k^{app}_{disp}}{[L]}[Cu^IX/L]^2 + 2\frac{k^{app}_{disp}}{[L]}[Cu^IX/L][Cu^I/L] + \frac{k^{app}_{disp}}{[L]}[Cu^I/L]^2\right),$$

where $2 \times k^{app}_{disp} = k^{app}_{disp,cross}$
[g] Only the $Cu^I/L$ complex is involved in activation reactions, based on literature data [De Paoli, et al.; Chem. Commun. 2011, 47, 3580.]
[h] Typical value of the deactivation rate coefficient
[i] Value taken to be the same as for the small molecule initiator.
[j] Estimated value, taking into consideration medium effect. In pure water, $K^{II}_{Br} = 4.4 \, M^{-1}$, therefore the value $K^{II}_{Br} = 10^2 \, M^{-1}$ was chosen to account for the lower polarity of the reaction medium. [Angew. Chem. Int. Ed. 2001, 40, 1340.; Macromol. Chem. Phys. 1998, 199, 1721; Macromol. Chem. Phys. 2002, 203, 1065; The chemistry of free radical polymerization; 2nd Ed. ed.; Elsevier: Amsterdam, 2006; De Paoli, P.; Isse, A. A.; Bortolamei, N.; Gennaro, A. Chem. Commun. 2011, 47, 3580.]

All simulations were conducted as has been outlined in the literature. [Macromol. 2013, 46, 3816.] In the model, R—X and R. represent the small molecule initiators and radicals, whereas $P_n$-X and $P_n$. represent polymeric dormant chains and radicals, respectively. $Cu^{II}X_2/L$ represents entire population of $Cu^{II}$ species. The notation $k^{app}$ is used for apparent kinetic rate coefficients, which are the rate coefficients based on the total concentration of Cu species in a given oxidation state and do not take into consideration binding with halide and ligand. The only exceptions are the deactivation of radicals by $Cu^{II}$ species and activation of alkyl halides by $Cu^I$ species, which can only occur by reaction with the $Cu^{II}X/L^+$ and $Cu^I/L^+$ complexes, respectively. These rapidly equilibrate with the $Cu^{II}/L^{++}$ and $Cu^IX/L$ complexes, respectively. When simulating the heterogeneous reactions, overall rate coefficients ($k^{over}$) were calculated, taking into account the apparent rate constants ($k^{app}$) and the $Cu^0$ surface area and reaction volume ($k^{over}=k^{app}\times S/V$). For all simulations the only source of $Cu^0$ is the wire surface area. All the rate coefficients take into account the exemplary polymerization media, 18 wt % OEOA in $H_2O$. The comproportionation, disproportionation, $Cu^0$, and $Cu^I$ activation by $P_n$-X rate coefficients were evaluated in this work. Rate coefficient of activation of R—X (R=HEBiB and OEOBrP respectively) by $Cu^0$ was scaled based on experiments previously conducted in pure $H_2O$, FIG. 15a and Fig. b, to account for the reaction medium effect generating a value of $k_{a0}^{app}=4.5\times10^{-5} \, cm \, s^{-1}$ and $k_{a0}^{app}=4\times10^{-6} \, cm \, s^{-1}$ for OEOBrP respectively.

The value of rate coefficient of activation of R—X by $Cu^0$ was calculated in the following manner:

$$\frac{k^{app}_{a0,H_2O}}{k^{app}_{a0i,H_2O}} = \frac{k^{app}_{a0,18\%OEOA}}{k^{app}_{a0i,18\%OEOA}} \quad (14)$$

$$k^{app}_{a0i,18\%OEOA} = 5.6 \times 10^{-5} \, cm \, s^{-1}$$

Rate coefficients of deactivation by $Cu^I$ ($k_{d0}$ and $k_{d0i}$) were calculated based on principle of microscopic reversibility [Onsager, L. Phys. Rev. 1931, 37, 405] from the following equations:

$$k^{app}_{d0} = \frac{k^{app}_{a0} k^{app}_{d1} k^{app}_{disp}}{k^{app}_{a1} k^{app}_{comp}} \quad (15)$$

$$k^{app}_{d0i} = \frac{k^{app}_{a0i} k^{app}_{d1i} k^{app}_{disp}}{k^{app}_{a1i} k^{app}_{comp}}$$

All the polymer populations, including the dormant species ($P_n$-X), propagating species ($P_n$.) and dead chains (T) were used for calculation of the number average degree of polymerization ($DP_n$) and molecular weight distribution (MWD), $M_w/M_n$.

FIG. 13 shows the effect of adding no salt, but having a value of $K_{Br}^{II}=10^{6.1}M^{-1}$, which is the value observed in acetonitrile. [Macromol. 2010, 43, 9257.] In this case there is good control, even with no added salt, due to the high halidophilicity.

Taking all this information into consideration an example was conducted with the following ratio of reagents: [OEOA]:[HEBiB]:[$Me_6TREN$]:[$CuBr_2$]=100:1:0.2:0.01 with 30 mM NaBr and the final analysis indicated an increase in soluble transition metal complexes from 100 to 600 ppm Cu which means 500 ppm Cu were generated indicating that 5% excess ligand was consumed in relation to added initiator (HEBiB), I.e. 25% of the added ligand was consumed during formation of additional soluble transition metal complexes.

Furthermore the calculations indicate that the rate of copolymerization could be controlled by a controlled rate of addition of the ligand to the reaction.

Extension of Range of Monomers to NIPAM:

a range of polymerization parameters was examined, such as targeted degree of polymerization (DP) and surface area of copper. Results of block copolymerization are summarized in Table 5.

$$R_p = k_p[M][P\cdot] = k_p[M]K_{ATRP}\frac{[P-X][Cu^I/L]}{[X-Cu^{II}/L]},$$

and followed the first order with respect to P-X concentration. Values of $k_p^{app}$ increased approximately linearly with $[I]_0$, FIG. 16 a, R2=0.966. MW evolutions were well-matched with the theoretical values (FIG. 16 b) and maintained narrow MWD when targeting DPs of 10, 100 and 200 with copper wire with S/V=0.16 cm$^{-1}$, 0.34 cm$^{-1}$, 1.20 cm$^{-1}$ and 2.06 cm$^{-1}$ respectively. Significantly higher $k_p^{app}$ and

TABLE 5

Summary of PNIPAM and PEO-b-PNIPAM synthesis by SARA ATRP and eATRP.

| entry | time (h) | [NIPAM]/[I]/ [Cu$^{II}$Br$_2$/2Me$_6$TREN] | S/V (cm$^{-1}$)$^a$ | $k_p^{app}$ (h$^{-1}$)$^b$ | conv (%)$^b$ | $M_{n,\,theo}$ (×10$^{-3}$)$^c$ | $M_n^{app}$ (×10$^{-3}$)$^b$ | $M_w/M_n^d$ |
|---|---|---|---|---|---|---|---|---|
| 1 | 2 | 10/1$^e$/0.005 | 0.68 | 1.017 | 90 | 1.2 | 1.2 | 1.07 |
| 2 | 12 | 100/1$^e$/0.05 | 0.68 | 0.303 | 81 | 9.3 | 9.8 | 1.15 |
| 3 | 21 | 200/1$^e$/0.1 | 0.68 | 0.137 | 52 | 12.0 | 11.7 | 1.29 |
| 4 | 21 | 200/1$^f$/0.1 | 0.16 | 0.077 | 43 | 11.8 | 11.1 | 1.28 |
| 5 | 21 | 200/1$^f$/0.1 | 0.34 | 0.096 | 49 | 13.2 | 11.8 | 1.28 |
| 6 | 21 | 200/1$^f$/0.1 | 1.20 | 0.229 | 70 | 17.9 | 19.5 | 1.24 |
| 7 | 21 | 200/1$^f$/0.1 | 2.06 | 0.302 | 75 | 19.0 | 21.2 | 1.19 |
| 8 | 1 | 200/1$^f$/0.1 | — | 3.885 | 95 | 23.6 | 24.5 | 1.18 |

SARA ATRP: entries 1-7; eATRP: entry 8. General reaction conditions: T = 0° C.; V$_{tot}$ = 8 mL (in H$_2$O/DMF = 9/1 by v/v) (except entry 4-8, V$_{tot}$ = 33 mL); [I]$_0$ = 4.1 mM (except entry 1: [I]$_0$ = 82.0 mM and entry 2: [I]$_0$ = 8.2 mM); [NIPAM]$_0$ = 0.8M; Supporting electrolyte concentration (tetraethylammonium bromide, TEABr) = 0.1M.
$^a$Ratio of surface area (S) of Cu$^0$ to total volume of reaction mixture (V);
$^b$Monomer conversion, apparent M$_n$ and k$_p$ were determined by $^1$H NMR;
$^c$M$_{n,\,theo}$ = ([M]$_0$/[I]$_0$) × conversion × M$_{monomer}$ + M$_{initiator}$;
$^d$MWD was determined by DMF GPC with PEO standards;
$^e$I = hydroxyethyl α-bromoisobutyrate (HEBiB);
$^f$I = poly(ethylene oxide) macroinitiators, PEO MI.

Reaction conditions for runs whose kinetics are provided in FIG. 17: [NIPAM]$_0$=0.8 M, ■ [NIPAM]/[HEBiB]= 10/1, ▼ [NIPAM]/[HEBiB]=100/1 or ✶ [NIPAM]/[HE-BiB]=200/1, [Cu$^{II}$Br$_2$]$_0$=0.41 mM (500 ppm), [Me$_6$TREN]$_0$=0.82 mM, T=0° C., [TEABr]$_0$=0.1 M, Cu$^0$ powder (S/V=0.68 cm$^{-1}$), V$_{tot}$=8 mL.

Well controlled polymers were synthesized using aqueous SARA ATRP in the presence of Cu$^0$ (powder; S/V=0.68 cm$^{-1}$) with 500 ppm of Cu$^{II}$/L, in the presence of an excess of bromide salt, [TEABr]$_0$=0.1 M. This concentration of Cu/L species generates essentially transparent, colorless solutions and represents a 5-100 fold reduction in Cu/L relative to previous reports of ca. 2,500-50,000 ppm Cu$^I$/L used for pre-disproportionation in water.

Effect of Targeted Degree of Polymerization:

The effect of initial molar ratio of NIPAM monomer to initiator on the homopolymerization was investigated in the presence of Cu$^{II}$Br$_2$/Me$_6$TREN catalyst complex as reported in Table 5, entries 1-3, FIGS. 16 a and b. Well controlled polymers were synthesized using aqueous SARA ATRP in the presence of Cu$^0$ (powder; S/V=0.68 cm$^{-1}$) with 500 ppm of Cu$^{II}$/L, in the presence of an excess of bromide salt, [TEABr]$_0$=0.1 M. This concentration of Cu/L species generates essentially transparent, colorless solutions and represents a 5-100 fold reduction in Cu/L relative to previous reports of ca. 2,500-50,000 ppm Cu$^I$/L used for in situ formation of Cu$^0$ and Cu$^{II}$ through pre-disproportionation in water. [J Am Chem Soc 2013, 135 (19), 7355-7363, Polym Chem-Uk 2015, 6 (3), 406-417.] Polymerizations were performed at three different ratios of [M]$_0$/[I]$_0$=10, 100 and 200, targeting different DP. The apparent propagation constant ($k_p^{app}$) was measured at initial time periods. The rate of polymerization (R$_p$), defined as monomer conversion of >90% were obtained for polymerizations carried out at higher concentration of initiator (e.g., [M]$_0$/[I]$_0$=10). Polymerizations were faster than at lower concentration of [I]$_0$, compare $k_p^{app}$; Table 5, entries 1 vs. 2-3.

Influence of the Surface Area of Cu to Solution Volume Ratio (S/V):

Since Cu$^0$ was added to the reaction in the form of a powder (Table 5, entries 4-5) or a sponge (Table 5, entries 6-7) it still predominantly acts as a supplemental, rather than major activator of alkyl halides, [Polym Chem-Uk 2014, 5 (15), 4396-4417] four separate experiments were conducted with varying amounts of Cu$^0$ surface area to solution volume ratio, S/V=0.16, 0.34, 1.20, and 2.06 cm$^{-1}$, respectively (FIG. 19 a, b). FIG. 18 illustrates the polymerization kinetics and molecular weight evolution with conversion. As the surface area of Cu$^0$ was decreased, S/V from 2.06 cm$^1$ to 0.16 cm$^{-1}$; Table 5, entries 4-7, the rate of polymerization similarly declined, $k_p^{app}$ from 0.302 h$^{-1}$ to 0.077 h$^{-1}$, compare $k_p^{app}$; Table 5, entries 4-7, suggesting the involvement of Cu$^0$ in the rate-determining step of the reaction, following equation:

$$R_a = k_p^{app}\left(\frac{S}{V}\right)[I].$$

Molecular weights increased linearly with conversion, FIG. 19 b, and were nearly identical to theoretical values. Molecular weight distributions were independent of copper surface area and remained low, with MWD=1.19 at 75% monomer conversion (S/V=2.06 cm$^{-1}$). Since reaction rate depends on the $Cu^0$ surface area to reaction volume ratio (S/V) and not on absolute amount of copper used, reaction rate could be feasibly increased by either increasing the surface area of metallic copper or decreasing total reaction volume. A linear relationship between the $k_p^{app}$ and the square root of (S/V) was observed. [*Macromol.* 2009, 42 (7), 2379-2386]

Use of Silver as Activator Regenerator:

The initial Ag as activator regenerator ATRP in water was polymerization of $OEOA_{480}$ with HEBiB as an initiator. Reaction Conditions: $[OEOA]_0:[HEBiB]_0:[Cu^{II}Br_2]_0:[TPMA]_0=65:1.0:0.04:0.08$ (615 ppm $Cu^{II}$), 5.0 cm $Ag^0$ wire (d=2 mm), in water, $[OEOA]_0=1.14$ M, 50° C. The reaction was well controlled with a linear increase in MW with conversion and narrow MWD (PDI~1.10 at 60% conversion). Results are shown in FIG. 17 and show linear kinetics and MW close to theoretical values.

Electrochemically Mediated ATRP of NIPAM.

A series of experiments explored eATRP of NIPAM under standard polymerization conditions; $Cu^{II}Br_2/Me_6TREN$, DP=200, and T=0° C. $E_{1/2}$ values for $Cu^{II}Br_2/Me_6TREN$ complex were measured in the absence and presence of a PEO MI. The CV response of $X—Cu^{II}/L$ drastically changed when the initiator was added; the cathodic peak approximately doubled in height while the anodic one decreased, clearly indicating that $Cu^I/L$ rapidly reacted with PEO MI, FIG. 18. The applied potential ($E_{app}$) was selected as $E_{app}=E_{pc}-120$ mV and polymerization was carried out under potentiostatic conditions. Reaction conditions: [NIPAM]/[PEO MI]/[$Cu^{II}Br_2/Me_6TREN$]=200/1/0.1, $[NIPAM]_0=0.8$ M, T=0° C., $[TEABr]_0=0.1$ M, $V_{tot}=33$ mL, and $E_{app}=E_{pc}-120$ mV (vs. Ag/AgI/I$^-$). Polymerization was up to 40 times faster (compare $k_p^{app}$; Table 1, entries 4-7 vs. 8) than for SARA ATRP with $Cu^0$. The MWD of the second block can be determined using the following equation: $Y_{PEO-PNIPAM}=w_{PEO}^2 Y_{PEO} w_{PNIPAM}^2 Y_{PNIPAM}$, where w is weight fraction of each block and $Y=Đ-1$. The weight fraction of PNIPAM was 0.84 (Table 1, entry 8) based on monomer consumption. According to this equation, the calculated MWD of PNIPAM block was 1.25, indicating that well-defined polymers were synthesized by eATRP under optimized conditions. In addition, clean shift towards higher molecular weights was observed on GPC demonstrating efficient chain extension of PEO-MI to a block copolymer.

Photoinduced Polymerization of $OEOMA_{500}$.

A number of reactions with varied conditions were carried out for the photoinduced ATRP of $OEOMA_{500}$ in water. Conditions used for the standard polymerization reaction of OEOMA at low concentration of Cu with excess salt were carried out under these typical conditions: $OEOMA_{500}$ (1.15 ml, 2.5 mmol), PEOBPA (11 mg, 5.55 μmol), $CuBr_2$ (0.55 μmol), TPMA (2.2 μmol) and NaBr (0.055 mmol) were mixed in a 25 ml Schlenk flask and then dissolved in water (10.35 mL). For even lower concentrations of Cu, a stock solution was prepared in water by adding 1.23 mg of Cu in 10 ml of deionized water. The mixture was then homogenized and deoxygenated by bubbling with nitrogen for 45 mins. It was then placed inside a violet LED lamp (0.9 mW/cm$^2$, 392 nm wavelength) and samples were taken throughout the course of the reaction for GPC and NMR measurements. The samples for NMR were prepared by dissolving the polymer in $D_2O$. The GPC was prepared by dissolving the polymer in THF and adding a drop of toluene in it as standard. The sample was dried by passing it through a filter of anhydrous sodium carbonate and then copper was removed by passing through a filter of neutral alumina before measuring the GPC.

TABLE 6

Results for photoinduced aqueous ATRP of $OEOMA_{500}$ with different Cu concentrations.[a]

| Entry | Conditions | Cu concentration (ppm) | Time (h) | Conversion (%)[b] | $M_{n, th}$[c] | $M_{n, GPC}$[d] | $M_w/M_n$[d] |
|---|---|---|---|---|---|---|---|
| 1 | x = 9 | 20000 | 4 | 60 | 137000 | 97000 | 1.07 |
| 2 | x = 3 | 6600 | 6 | 54 | 123500 | 101000 | 1.20 |
| 3 | x = 1 | 2200 | 6 | 69 | 157250 | 125000 | 1.26 |
| 4 | x = 0.1 | 220 | 4 | 94 | 213000 | 142000 | 1.26 |
| 5 | x = 0.1 with 5 mM NaBr | 220 | 4 | 78 | 177000 | 114000 | 1.11 |
| 6 | x = 0.1 with 5 mM NaCl | 220 | 6 | 44 | 101000 | 16000 | 4.05 |
| 7 | x = 0.05 | 110 | 3 | 70 | 160000 | 230000 | 1.56 |
| 8 | x = 0.01 | 22 | 3 | 80 | 182000 | 322000 | 1.96 |
| 9 | x = 0.01 with 5 mM NaBr | 22 | 4 | 85 | 193000 | 213000 | 1.25 |
| 10 | x = 0.01 with 30 mM NaBr | 22 | 4 | 55 | 126000 | 103000 | 1.17 |

[a] Reaction conditions: $[OEOMA_{500}]_0/[PEO_{2000}BPA]_0/[CuBr_2]_0/[TPMA]_0 = 450/1/x/4x$ in 90% (v/v) water with irradiation by 392 nm at 0.9 mW/cm$^2$ at room temperature;
[b] determined by $^1$H NMR;
[c] calculated on the basis of conversion (i.e. $M_{n, th} = M_{PEOBPA} + [OEOMA_{500}]_0/[PEO_{2000}BPA]_0 \times$ conversion $\times M_{monomer}$);
[d] determined by GPC in THF, based on linear PMMA as calibration standard.

PhotoATRP was extended in aqueous media using low ppm of Cu/tris(2-pyridylmethyl)amine (TPMA) catalyst. This system features low catalyst concentrations as low as 22 ppm molar with respect to monomer under benign conditions (irradiation with visible light at room temperature in aqueous media), so they can be widely adapted to biological applications.

Photoinduced ATRP in water was first attempted to polymerize oligo (ethylene oxide) methyl ether methacrylate (OEOMA, $M_n$=500) using poly(ethylene oxide)-bromophenylacetate ($PEO_{2000}$-BPA) as macroinitiators under visible light irradiation (392 nm at 0.9 mW/cm$^2$). TPMA was used as ligands since they give stable $Cu^I$ complexes without any significant disproportionation in water.

The effect of Cu concentration was originally investigated, and results are summarized in Table 6. The polymerization at high concentration of Cu (20,000 ppm) gave a linear semilogarithmic kinetic plot versus conversion. Excellent control over the reaction was obtained. The experimental molecular weights were in good agreement with the theoretical values with dispersities as low as 1.07 (entry 1, Table 6). Photoinduced ATRP with 6600 ppm, 2200 and 220 ppm of Cu (x=3, 1 and 0.1) still provided well-defined polymers ($M_w/M_n$=1.20-1.26, entries 2-4, Table 6). The reaction with further lower loading of Cu catalyst (110 and 22 ppm) gave polymers with much higher $M_n$ compared to theoretical $M_n$ as well as broad distribution ($M_w/M_n$=1.56 and 1.96, entries 7 and 8, Table 1, respectively). It is worth pointing out that the molecular weight was decreased with increasing conversion at only 22 ppm Cu catalyst used, indicating a non-controlled free radical polymerization. This could attribute to the low deactivator concentration resulting from dissociation of halogen atom from the $CuBr_2$/TPMA complex, which is one of the major challenges associated with aqueous ATRP especially with low Cu concentration. The addition of excess of halide salt shifts the equilibrium towards deactivator complex Br—$Cu^{II}$ Br/TPMA, promoting efficient deactivation, Scheme 5.

Therefore, photoinduced aqueous ATRP were investigated at low Cu concentration along with the addition of halide salts. The results are summarized in Table 1 and FIG. 19a with addition of 5 mM NaBr, the rate of polymerization decreased whereas the control over the molecular weight, FIG. 19b, and dispersity improved (entries 4 and 8 vs 5 and 9, Table 6). The reaction using 22 ppm Cu catalyst with 30 mM salt in photoinduced ATRP gave the best result, reaching 55% conversion at 4 h and forming a polymer with $M_n$=103000, $M_w/M_n$=1.17 (entry 10, Table 6). FIG. 19(c) shows the GPC plots for the polymers formed under these conditions.

A similar reaction using 220 ppm Cu catalyst with 5 mM NaCl gave polymer with a bimodal distribution ($M_n$=16000, $M_w/M_n$=4.05, entry 6, Table 1), indicating a poor control in presence of chloride ions.

Table 7 and FIG. 20 summarize the results of photoinduced ATRP in water for different targeted $DP_T$ of $OEOMA_{500}$ and $OEOMA_{300}$ and the additional control available from photo-induced ATRP. In all experiments, the monomer concentration was kept constant and the concentration of initiator, while the concentration of Cu and ligand were varied with respect to the target DP. Polymerization of $OEOMA_{500}$ with targeted $DP_T$=250 reached 70% conversion after 4 h of irradiation and provided polymer with $M_n$=79,200 and $M_w/M_n$=1.21 (entry 2, Table 6). Compared to previous conditions with targeted $DP_T$=450, the polymerization was slightly slower due to higher concentration of $CuBr_2$. With lower $DP_T$ targeted, the conversion reached 59% and 39% for $DP_T$=200 and 100 after 4 h, respectively (entries 3 and 4, Table 6). Similarly, ATRP of $OEOMA_{300}$ with different targeted $DP_T$=450, 200, and 100 provided all well-defined polymers with predictable $M_n$ and narrow $M_w/M_n$ values ranging from 1.10 to 1.18 (entries 5-7, Table 6). Irradiation is required for the initiation and regeneration of $Cu^I$ in the solution in photoinduced ATRP reactions. The major advantage of these systems is the feasibility of stopping or restarting the reaction at any time simply by turning the light off or on. The experiment with "on-off" light switching cycles showed almost no conversion after removal of the light source and a clear progress after re-exposure to the light, FIG. 19b. A slight increase in conversion in 3 h till 4 h can be the result of some residual amount of $Cu^I$ present in the system. Additionally, an efficient control was achieved with low dispersities and molecular weight agreeing well with the theoretical values.

TABLE 7

Results for photoinduced ATRP of OEOMA with various $DP_T$ in aqueous media.[a]

| Entry | $DP_T$ | Time (h) | Conversion (%)[b] | $M_{n, th}$[c] | $M_{n, GPC}$[d] | $M_w/M_n$[d] |
|---|---|---|---|---|---|---|
| 1 | 450 | 4 | 72 | 164000 | 147000 | 1.21 |
| 2 | 250 | 4 | 70 | 90000 | 79200 | 1.21 |
| 3 | 200 | 4 | 59 | 61000 | 56300 | 1.16 |
| 4 | 100 | 4 | 39 | 21500 | 17500 | 1.16 |
| 5 | 450[e] | 4 | 61 | 84000 | 84800[f] | 1.18[f] |
| 6 | 200[e] | 4 | 47 | 30000 | 31900[f] | 1.10[f] |
| 7 | 100[e] | 4 | 40 | 14000 | 17100[f] | 1.10[f] |

[a]Reaction conditions: [$OEOMA_{500}$]$_0$/[$PEO_{2000}BPA$]$_0$/[$CuBr_2$]$_0$/[TPMA]$_0$ = $DP_T$/1/0.1/0.4 in 90% water with 5 mM NaBr at room temperature with irradiation by 392 nm 0.9 mW/cm$^2$;
[b]determined by $^1$H NMR;
[c]calculated on the basis of conversion (i.e. $M_{n, th}$ = $M_{PEOBPA}$ + DP × conversion × $M_{monomer}$);
[d]determined by GPC in THF, based on linear PMMA as calibration standard;
[e]$OEOMA_{300}$ as monomer;
[f]determined by GPC in water, based on linear PEG as calibration standard.

Chain Extension of Polymer of $OEOMA_{500}$ with $OEOMA_{300}$:

To confirm the utility of this photoinduced ATRP in aqueous media, chain extension of the homopolymer of $OEOMA_{500}$ was conducted with $OEOMA_{300}$. $OEOMA_{500}$ was polymerized under standard conditions to form the macroinitiator. $OEOMA_{500}$ (1.15 ml, 2.5 mmol), PEOBPA (11 mg, 5.55 mmol), $CuBr_2$ (0.55 mmol), TPMA (2.2 mmol) and NaBr (0.055 mmol) were mixed in a 25 ml Schlenk flask and dissolved in water (10.35 mL). The mixture was deoxygenated by bubbling with nitrogen for 45 mins. It was then placed inside the LED lamp and was allowed to polymerize for 6 hours with conversion around 90% providing the POEOMA500 macroinitiator, $M_n$=115,000 and $M_w/M_n$=1.13, $OEOMA_{300}$ was deoxygenated in a separate flask by bubbling with nitrogen for 40 mins and (1 ml, 2.5 mmol) was then added to the same mixture for chain extension. The mixture was then irradiated for one more hour and the polymerization reached 12% conversion giving P($OEOMA_{500}$)-b-P($OEOMA_{300}$) $M_n$=139,000 and $M_w/M_n$=1.2. These experiments show that a well-controlled photoATRP can be conducted when the initial concentration of a catalyst complex is as low as 22 ppm.

The procedures disclosed herein allow one to conclude that in contrast to prior art procedures employing pre-reaction disproportionation of a high concentration of $Cu^I$/L catalyst complex, in excess of 10,000 ppm, prior to the addition of monomer (SET LRP) a very well-controlled polymerization can be conducted in the presence of a low concentration of $Cu^{II}$/L complex, preferentially lower than 500 ppm, starting with a solution of comonomers in polar media that in the initial exemplary procedure is activated by the addition of solid $Cu^0$, exemplified herein by copper wire, that participates in a comproportionation reaction to form a very low concentration of $Cu^I$, approximately 1% of the added $Cu^{II}$, for a reaction conducted in an initial solution of 18% monomers in aqueous media, that is the actual activator of the polymerization.

As disclosed herein by developing a full understanding of the kinetics of the reactions associated with $Cu^I$ complexes in a polymerization conducted in polar media it is now possible to conduct the reaction with low ppm levels of added copper complexes in the presence of an added chemical or a physical activator regenerator.

It will be understood that the present description illustrates those aspects of the invention relevant to a clear understanding of the invention. Certain aspects that would be apparent to those of ordinary skill in the art and that, therefore, would not facilitate a better understanding of the invention have not been presented in order to simplify the present description. Although only a limited number of embodiments of the present invention are necessarily described herein, one of ordinary skill in the art will, upon considering the foregoing description, recognize that many modifications and variations of the invention may be employed. All such variations and modifications of the invention are intended to be covered by the foregoing description and the following claims.

What is claimed is:

1. An atom transfer radical polymerization (ATRP) process comprising:
   polymerizing one or more soluble radically (co)polymerizable monomer(s) in the presence of an aqueous polymerization medium, wherein the aqueous polymerization medium comprises:
   a molar excess of a ligand compared to a concentration of transition metal salt;
   wherein the transition metal salt interacts with the ligand to form a stable soluble transition metal complex;
   wherein the stable soluble transition metal complex participates in a reversible reduction-oxidation cycle with an added functional ATRP initiator that comprises one or more radically transferable atoms or groups and a dormant polymer chain, which also comprises a radically transferable atom or group;
   wherein the polymerizing occurs at a temperature in a range of about −10° C. to 110° C. in the presence of an aqueous system comprising a concentration of the stable soluble transition metal complex in a higher oxidation state of less than or equal to 2500 ppm;
   wherein the polymerizing is carried out in the presence of an activator regenerator, the amount of which is selected to only reduce less than 10% mole fraction of the stable soluble transition metal complex in a higher oxidation state to a stable soluble transition metal complex in a lower activator oxidation state by in situ reduction through reaction with the activator regenerator;
   wherein polymer chains formed by the polymerizing have a predetermined molecular weight and a polydispersity, Mw/Mn, of less than 1.25; and
   wherein the activator regenerator comprises a photochemical procedure.

2. The process of claim 1, wherein the activator regenerator further comprises an electrochemical procedure.

3. The process of claim 1, wherein the aqueous polymerization medium comprises greater than 50% by weight water.

4. The process of claim 1, wherein the added transition metal salt has the same counterion as the stable soluble transition metal complex.

5. The process of claim 1, wherein the added transition metal salt has a different counterion to that initially present on the stable soluble transition metal complex thereby allowing a halogen exchange reaction to occur when the added functional ATRP initiator is a (macro)initiator.

6. The process of claim 1, wherein the mole fraction of the stable soluble transition metal complex in a lower activator oxidation state to stable soluble transition metal transition metal complex in a higher oxidation state is less than 5%.

7. The process of claim 6, wherein the mole fraction of the stable soluble transition metal complex in a lower activator oxidation state to stable soluble transition metal complex in a higher oxidation state is less than 2%.

8. The process of claim 1, wherein the molar ratio of the ligand to transition metal salt is greater than 1:2.

9. The process of claim 1, wherein the temperature is in a range of 0° C. to 50° C.

10. The process of claim 9, wherein the concentration of the stable soluble transition metal complex in a higher oxidation state is less than 1000 ppm.

11. The process of claim 9, wherein the concentration of the stable soluble transition metal complex in a higher oxidation state is less than 600 ppm.

12. The process of claim 1, wherein the concentration of the stable soluble transition metal complex in a higher oxidation state is less than 1000 ppm.

13. The process of claim 1, wherein the concentration of the stable soluble transition metal complex in a higher oxidation state is less than 600 ppm.

14. The process of claim 1 conducted with ppm levels of the transition metal salt, a salt comprising a (pseudo) halide counterion, and one or more pieces of a zero-valent transition metal in contact with the reaction medium as a readily removable solid;
   wherein the concentration of initial the stable soluble transition metal complex in a higher oxidation state is less than 1000 ppm.

15. The process of claim 14, wherein the concentration of the stable soluble transition metal complex in a higher oxidation state is less than 600 ppm.

16. The process of claim 14, wherein the concentration of stable soluble transition metal complex in a higher oxidation state is less than 250 ppm.

17. The process of claim 14, wherein the concentration of stable soluble transition metal complex in a higher oxidation state is less than 100 ppm.

18. The process of claim 14, wherein the aqueous polymerization medium comprises greater than 75% by weight water.

19. The process of claim 14, wherein the stable soluble transition metal complex comprises one or more of copper or iron.

20. The process of claim 14, wherein the temperature is in a range of 0° C. to 50° C.

21. An atom transfer radical polymerization (ATRP) process comprising:
   polymerizing one or more soluble radically (co)polymerizable monomer(s) in the presence of an aqueous polymerization medium, wherein the aqueous polymerization medium comprises:
   a molar excess of a ligand compared to a concentration of transition metal salt;
   wherein the transition metal salt interacts with the ligand to form a stable soluble transition metal complex;
   wherein the stable soluble transition metal complex participates in a reversible reduction-oxidation cycle with an functional ATRP initiator that comprises one or more radically transferable atoms or groups and a dormant polymer chain, which also comprises a radically transferable atom or group;
   wherein the polymerizing occurs at a temperature in a range of about −10° C. to 110° C. in the presence of an aqueous system comprising a concentration of the stable soluble transition metal complex in a higher oxidation state of less than or equal to 2500 ppm;
   wherein the polymerizing is carried out in the presence of an activator regenerator, the amount of which is selected to only reduce less than 10% mole fraction of the stable soluble transition metal complex in a higher oxidation state to a soluble transition metal complex in a lower activator oxidation state by in situ reduction through reaction with the activator regenerator;

wherein polymer chains formed by the polymerizing have a predetermined molecular weight and a polydispersity, Mw/Mn, of less than 1.25; and wherein the activator regenerator comprises silver.

* * * * *